US008839532B2

(12) United States Patent
Huffa et al.

(10) Patent No.: US 8,839,532 B2
(45) Date of Patent: Sep. 23, 2014

(54) ARTICLE OF FOOTWEAR INCORPORATING A KNITTED COMPONENT

(75) Inventors: Bruce Huffa, Encino, CA (US); Bhupesh Dua, Portland, OR (US); Benjamin A. Shaffer, Portland, OR (US)

(73) Assignee: NIKE, Inc., Beaverton, OR (US)

(*) Notice: Subject to any disclaimer, the term of this patent is extended or adjusted under 35 U.S.C. 154(b) by 343 days.

(21) Appl. No.: 13/048,514

(22) Filed: Mar. 15, 2011

(65) Prior Publication Data

US 2012/0233882 A1   Sep. 20, 2012

(51) Int. Cl.
| *A43B 1/00* | (2006.01) |
| *D04B 1/12* | (2006.01) |
| *A43B 3/00* | (2006.01) |
| *A43B 23/02* | (2006.01) |
| *A43B 1/04* | (2006.01) |
| *A43C 1/00* | (2006.01) |
| *D04B 15/56* | (2006.01) |

(52) U.S. Cl.
CPC . *A43C 1/00* (2013.01); *D04B 1/123* (2013.01); *A43B 3/0078* (2013.01); *A43B 23/0205* (2013.01); *A43B 1/04* (2013.01); *A43B 23/0265* (2013.01); *A43B 23/0255* (2013.01); *A43B 23/025* (2013.01); *D04B 15/56* (2013.01)
USPC .............................................. 36/45; 36/25 R

(58) Field of Classification Search
USPC ................... 36/25, 45, 50.1, 47, 57
See application file for complete search history.

(56) References Cited

U.S. PATENT DOCUMENTS

| 601,192 | A |   | 3/1898 | Woodside |
| 930,180 | A | * | 8/1909 | Horn ............................... 66/171 |
| 1,215,198 | A |   | 2/1917 | Rothstein |
| 1,597,934 | A |   | 8/1926 | Stimpson |
| 1,888,172 | A |   | 11/1932 | Joha |
| 1,902,780 | A |   | 3/1933 | Holden et al. |
| 1,910,251 | A |   | 5/1933 | Joha |
| 2,001,293 | A |   | 5/1935 | Wilson |

(Continued)

FOREIGN PATENT DOCUMENTS

| DE | 870963 C | 3/1953 |
| DE | 1084173 | 6/1960 |

(Continued)

OTHER PUBLICATIONS

Declaration of Dr. Edward C. Frederick from the US Patent and Trademark Office Inter Partes Review of US Patent No. 7,347,011 (178 pp).

(Continued)

*Primary Examiner* — Clinton T Ostrup
*Assistant Examiner* — Catherine M Ferreira
(74) *Attorney, Agent, or Firm* — Plumsea Law Group, LLC

(57) ABSTRACT

An article of footwear may include an upper incorporating a knitted component. An inlaid strand extends through the knitted component. A combination feeder may be utilized to inlay the strand within the knitted component. As an example, the combination feeder may include a feeder arm that reciprocates between a retracted position and an extended position. In manufacturing the knitted component, the feeder inlays the strand when the feeder arm is in the extended position, and the strand is absent from the knitted component when the feeder arm is in the retracted position.

39 Claims, 46 Drawing Sheets

(56) References Cited

U.S. PATENT DOCUMENTS

| | | | |
|---|---|---|---|
| 2,009,361 A * | 7/1935 | Lawson | 66/169 R |
| 2,033,096 A * | 3/1936 | Drumheller | 66/190 |
| 2,047,724 A | 7/1936 | Zuckerman | |
| 2,111,472 A * | 3/1938 | Horn | 66/189 |
| 2,147,197 A | 2/1939 | Glidden | |
| 2,314,098 A | 3/1943 | McDonald | |
| 2,330,199 A | 9/1943 | Basch | |
| 2,343,390 A | 3/1944 | Ushakoff | |
| 2,400,692 A | 5/1946 | Herbert | |
| 2,440,393 A | 4/1948 | Clark | |
| 2,569,764 A | 10/1951 | Jonas | |
| 2,586,045 A | 2/1952 | Hoza | |
| 2,608,078 A | 8/1952 | Anderson | |
| 2,641,004 A | 6/1953 | Whiting et al. | |
| 2,675,631 A | 4/1954 | Doughty | |
| 2,994,322 A | 8/1961 | Cullen et al. | |
| 3,583,081 A | 6/1971 | Hayashi | |
| 3,694,940 A | 10/1972 | Stohr | |
| 3,704,474 A | 12/1972 | Winkler | |
| 3,766,566 A | 10/1973 | Tadokoro | |
| 3,778,856 A | 12/1973 | Christie et al. | |
| 3,952,427 A | 4/1976 | Von den Benken et al. | |
| 3,972,086 A | 8/1976 | Belli et al. | |
| 4,027,402 A | 6/1977 | Liu et al. | |
| 4,031,586 A | 6/1977 | Von Den Benken et al. | |
| 4,211,806 A | 7/1980 | Civardi et al. | |
| 4,232,458 A | 11/1980 | Bartels | |
| 4,255,949 A | 3/1981 | Thorneburg | |
| 4,258,480 A | 3/1981 | Famolare, Jr. | |
| 4,317,292 A | 3/1982 | Melton | |
| 4,373,361 A | 2/1983 | Thorneburg | |
| 4,447,967 A | 5/1984 | Zaino | |
| 4,465,448 A | 8/1984 | Aldridge | |
| 4,607,439 A | 8/1986 | Sogabe et al. | |
| 4,737,396 A | 4/1988 | Kamat | |
| 4,750,339 A | 6/1988 | Simpson et al. | |
| 4,756,098 A | 7/1988 | Boggia | |
| 4,785,558 A | 11/1988 | Shiomura | |
| 4,813,158 A | 3/1989 | Brown | |
| 5,031,423 A | 7/1991 | Ikenaga | |
| 5,095,720 A | 3/1992 | Tibbals, Jr. | |
| 5,117,567 A | 6/1992 | Berger | |
| 5,152,025 A | 10/1992 | Hirmas | |
| 5,192,601 A | 3/1993 | Neisler | |
| 5,345,638 A | 9/1994 | Nishida | |
| 5,353,524 A | 10/1994 | Brier | |
| 5,371,957 A | 12/1994 | Gaudio | |
| 5,461,884 A | 10/1995 | McCartney et al. | |
| 5,511,323 A | 4/1996 | Dahlgren | |
| 5,572,860 A | 11/1996 | Mitsumoto et al. | |
| 5,575,090 A | 11/1996 | Condini | |
| 5,623,840 A | 4/1997 | Roell | |
| 5,729,918 A | 3/1998 | Smets | |
| 5,735,145 A | 4/1998 | Pernick | |
| 5,746,013 A | 5/1998 | Fay, Sr. | |
| 5,765,296 A | 6/1998 | Ludemann et al. | |
| 5,884,419 A | 3/1999 | Davidowitz et al. | |
| 5,996,189 A | 12/1999 | Wang | |
| 6,029,376 A | 2/2000 | Cass | |
| 6,032,387 A | 3/2000 | Johnson | |
| 6,052,921 A | 4/2000 | Oreck | |
| 6,088,936 A | 7/2000 | Bahl | |
| 6,151,802 A | 11/2000 | Reynolds | |
| 6,170,175 B1 | 1/2001 | Funk | |
| 6,308,438 B1 | 10/2001 | Throneburg et al. | |
| 6,333,105 B1 | 12/2001 | Tanaka et al. | |
| 6,401,364 B1 | 6/2002 | Burt | |
| 6,558,784 B1 | 5/2003 | Norton et al. | |
| 6,588,237 B2 | 7/2003 | Cole et al. | |
| 6,754,983 B2 | 6/2004 | Hatfield et al. | |
| 6,910,288 B2 | 6/2005 | Dua | |
| 6,922,917 B2 | 8/2005 | Kerns et al. | |
| 6,931,762 B1 | 8/2005 | Dua | |
| D517,297 S | 3/2006 | Jones et al. | |
| 7,051,460 B2 | 5/2006 | Orei et al. | |
| 7,056,402 B2 | 6/2006 | Koerwien et al. | |
| 7,347,011 B2 | 3/2008 | Dua et al. | |
| 7,441,348 B1 | 10/2008 | Dawson | |
| 7,543,397 B2 | 6/2009 | Kilgore et al. | |
| 7,568,298 B2 | 8/2009 | Kerns | |
| D599,986 S * | 9/2009 | Reiss | D2/947 |
| 7,682,219 B2 | 3/2010 | Falla | |
| D632,879 S * | 2/2011 | Merkazy et al. | D2/953 |
| 8,122,616 B2 * | 2/2012 | Meschter et al. | 36/45 |
| 8,132,340 B2 * | 3/2012 | Meschter | 36/45 |
| 8,266,827 B2 * | 9/2012 | Dojan et al. | 36/45 |
| 8,490,299 B2 | 7/2013 | Dua et al. | |
| 2002/0078599 A1 | 6/2002 | Delgorgue et al. | |
| 2002/0148258 A1 | 10/2002 | Cole et al. | |
| 2003/0126762 A1 | 7/2003 | Tseng | |
| 2003/0191427 A1 | 10/2003 | Jay et al. | |
| 2004/0118018 A1 | 6/2004 | Dua | |
| 2004/0181972 A1 | 9/2004 | Csorba | |
| 2005/0115284 A1 | 6/2005 | Dua | |
| 2005/0193592 A1 | 9/2005 | Dua et al. | |
| 2005/0273988 A1 | 12/2005 | Christy | |
| 2005/0284000 A1 | 12/2005 | Kerns | |
| 2006/0059715 A1 | 3/2006 | Aveni | |
| 2006/0162187 A1 | 7/2006 | Byrnes et al. | |
| 2007/0022627 A1 | 2/2007 | Sokolowski et al. | |
| 2007/0180730 A1 * | 8/2007 | Greene et al. | 36/3 A |
| 2007/0294920 A1 | 12/2007 | Baychar | |
| 2008/0017294 A1 | 1/2008 | Bailey et al. | |
| 2008/0078102 A1 | 4/2008 | Kilgore et al. | |
| 2008/0110048 A1 | 5/2008 | Dua et al. | |
| 2008/0189830 A1 | 8/2008 | Egglesfield | |
| 2008/0313939 A1 | 12/2008 | Ardill | |
| 2009/0068908 A1 | 3/2009 | Hinchcliff | |
| 2010/0051132 A1 | 3/2010 | Glenn | |
| 2010/0154256 A1 * | 6/2010 | Dua | 36/25 R |
| 2010/0170651 A1 | 7/2010 | Scherb et al. | |
| 2010/0251491 A1 | 10/2010 | Dojan et al. | |
| 2010/0251564 A1 | 10/2010 | Meschter | |
| 2011/0030244 A1 | 2/2011 | Motawi et al. | |
| 2011/0078921 A1 | 4/2011 | Greene et al. | |
| 2012/0023778 A1 | 2/2012 | Dojan et al. | |
| 2012/0234052 A1 | 9/2012 | Huffa et al. | |
| 2012/0255201 A1 | 10/2012 | Little | |
| 2012/0279260 A1 * | 11/2012 | Dua et al. | 66/171 |

FOREIGN PATENT DOCUMENTS

| | | |
|---|---|---|
| DE | 19738433 | 4/1998 |
| DE | 19728848 | 1/1999 |
| EP | 0448714 | 10/1991 |
| EP | 0728860 | 8/1996 |
| EP | 0758693 | 2/1997 |
| EP | 0279950 A2 | 8/1998 |
| EP | 0898002 A2 | 2/1999 |
| EP | 1233091 | 8/2002 |
| EP | 1437057 | 7/2004 |
| EP | 1563752 A1 | 8/2005 |
| EP | 1602762 A1 | 12/2005 |
| EP | 1972706 | 9/2008 |
| FR | 2171172 | 9/1973 |
| GB | 538865 | 8/1941 |
| GB | 2018837 A | 10/1979 |
| GB | 1603487 | 11/1981 |
| JP | H06113905 | 4/1994 |
| JP | H08109553 | 4/1996 |
| JP | H11302943 | 11/1999 |
| NL | 7304678 | 10/1974 |
| WO | 9003744 | 4/1990 |
| WO | 0032861 | 6/2000 |
| WO | 0231247 | 4/2002 |

OTHER PUBLICATIONS

David J. Spencer, Knitting Technology: A Comprehensive Handbook and Practical Guide (Third ed., Woodhead Publishing Ltd. 2001) (413 pp).

Excerpt of Hannelore Eberle et al., Clothing Technology (Third English ed., Beuth-Verlag GmnH 2002) (book cover and back; pp. 2-3, 83).

(56) References Cited

OTHER PUBLICATIONS

International Preliminary Report on Patentability mailed Sep. 26, 2013 in International Application No. PCT/US2012/028534.
International Search Report and Written Opinion in connection with PCT/US2009/056795 mailed Apr. 20, 2010.
International Preliminary Report on Patentability mailed Sep. 26, 2013 in International Application No. PCT/US2012/028576.
International Search Report and Written Opinion in PCT Application No. PCT/US2012/028576, mailed on Oct. 1, 2012.
International Search Report and Written Opinion in PCT application No. PCT/US20123/028559, mailed on Oct. 19, 2012.
International Search Report and Written Opinion in PCT Application No. PCT/US2012/028534, mailed on Oct. 17, 2012.
International Search Report and Written Opinion mailed Apr. 15, 2014 in International Application No. PCT/US2013/071363.
Extended European Search Report dated Jan. 29, 2014 in European Patent Application No. 13195204.

* cited by examiner

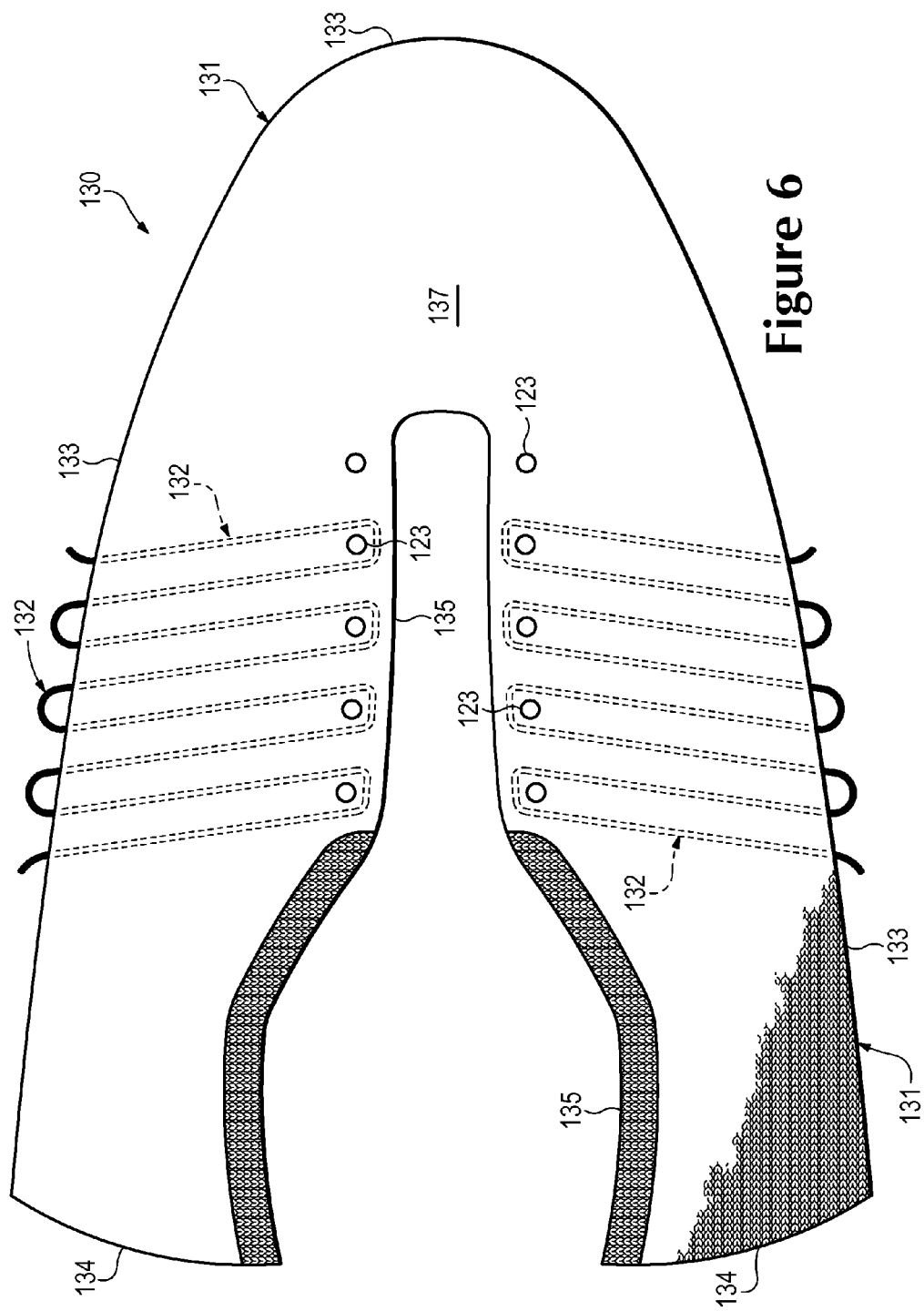

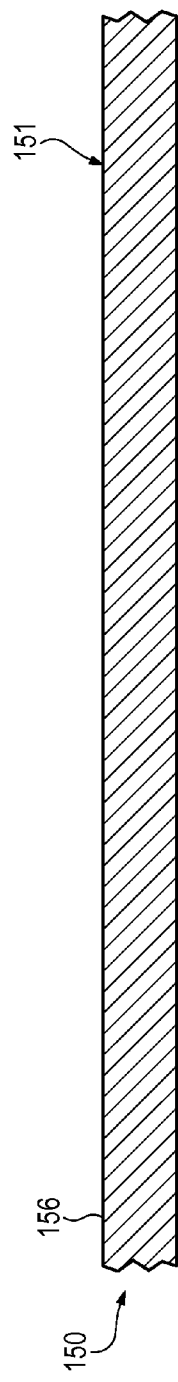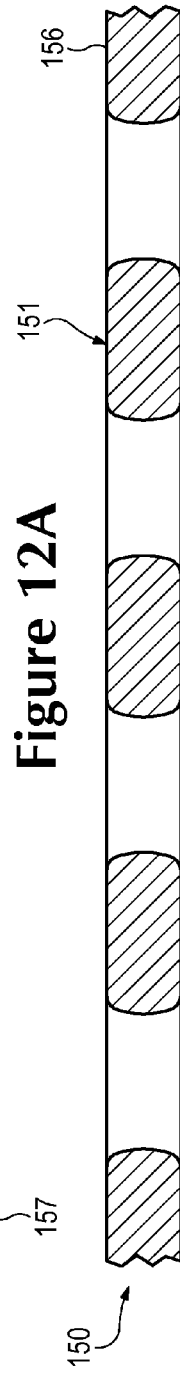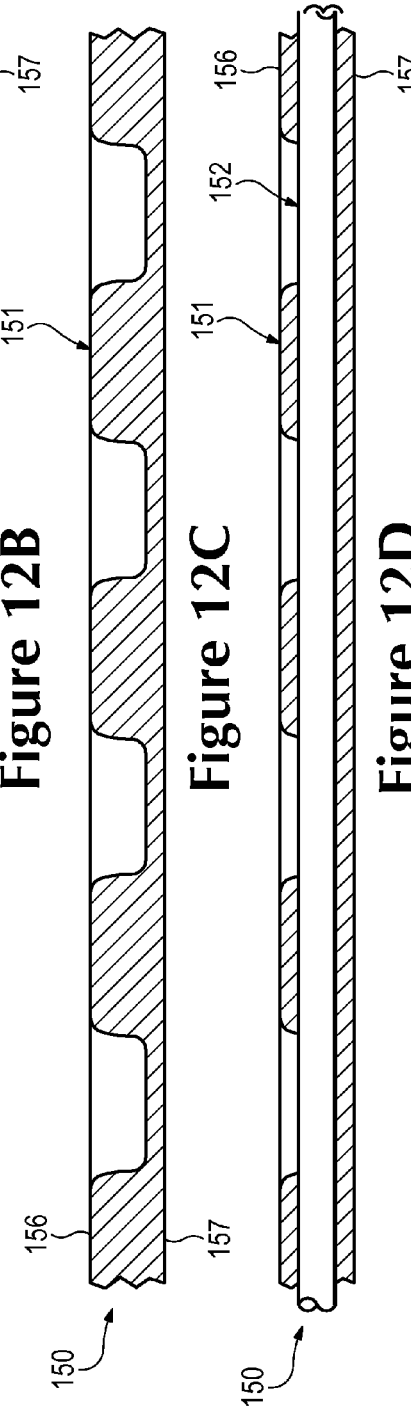

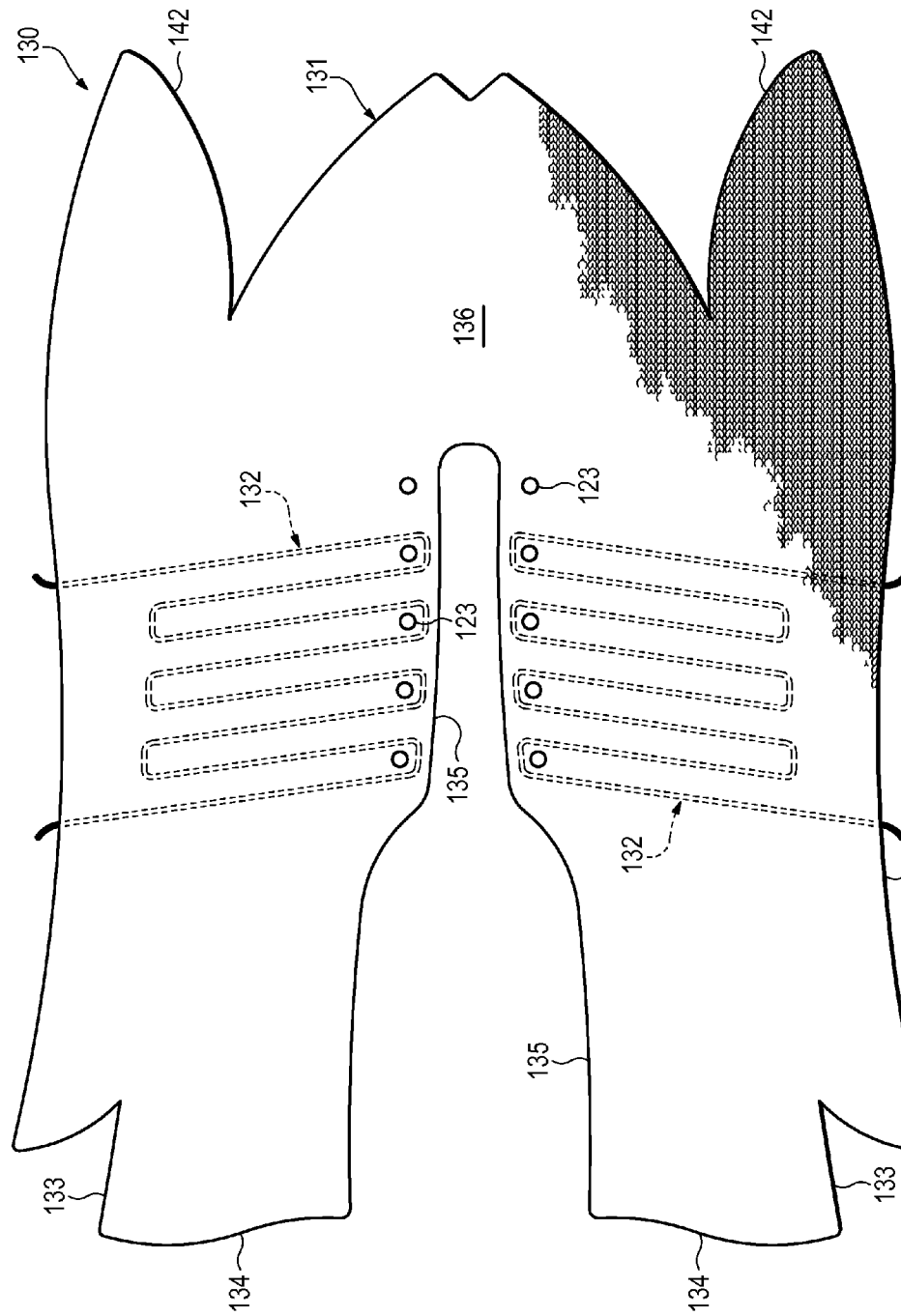

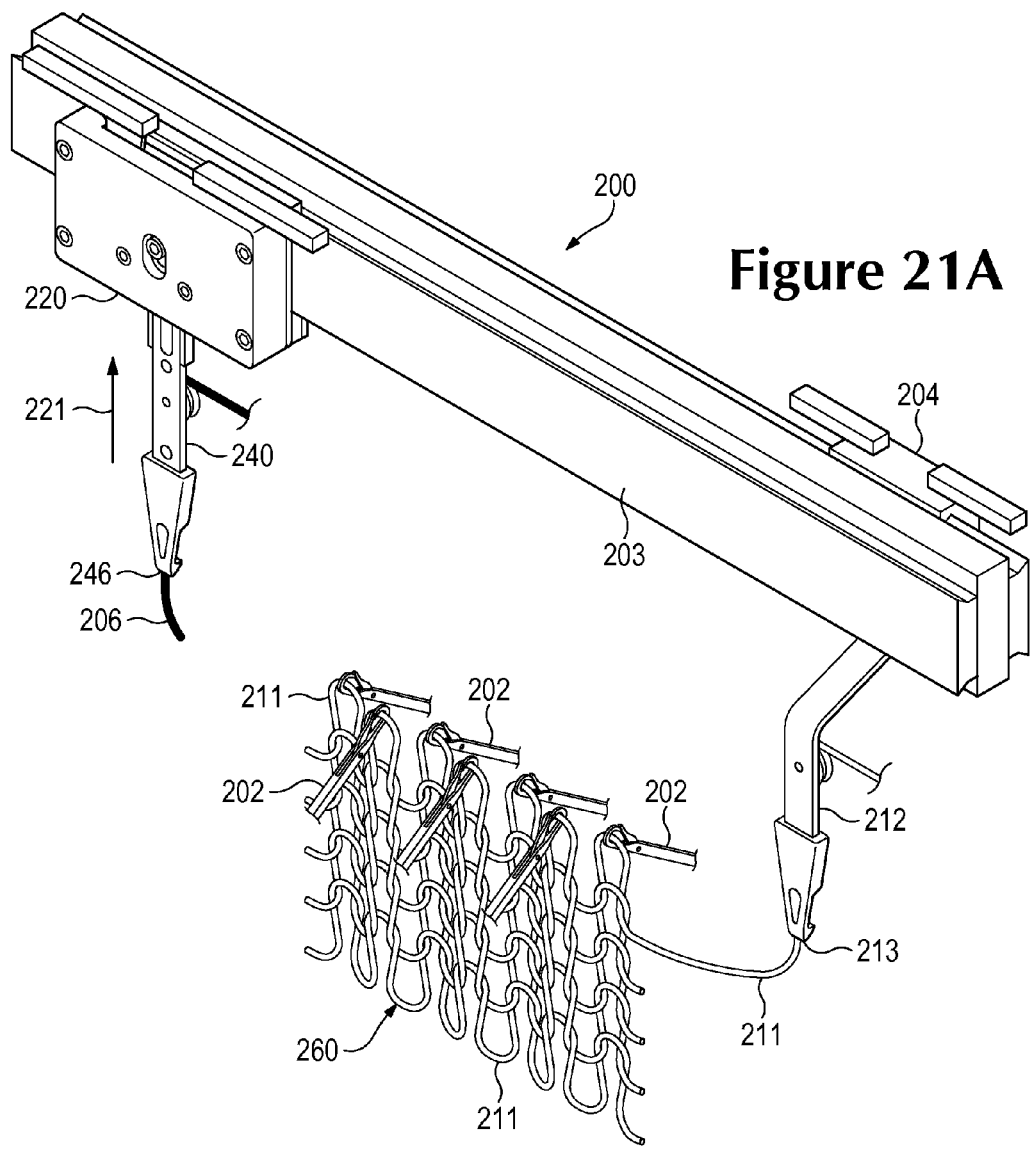

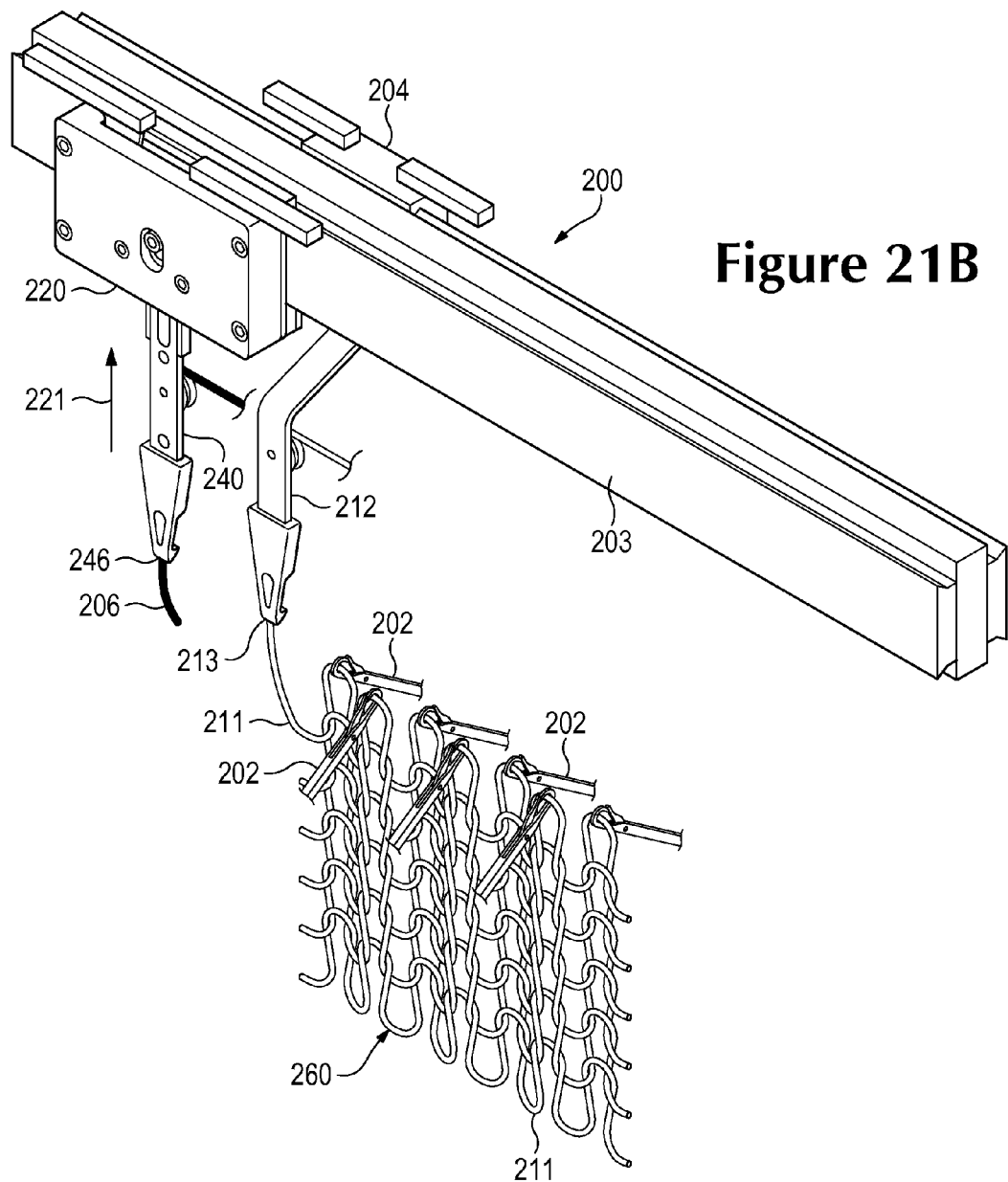

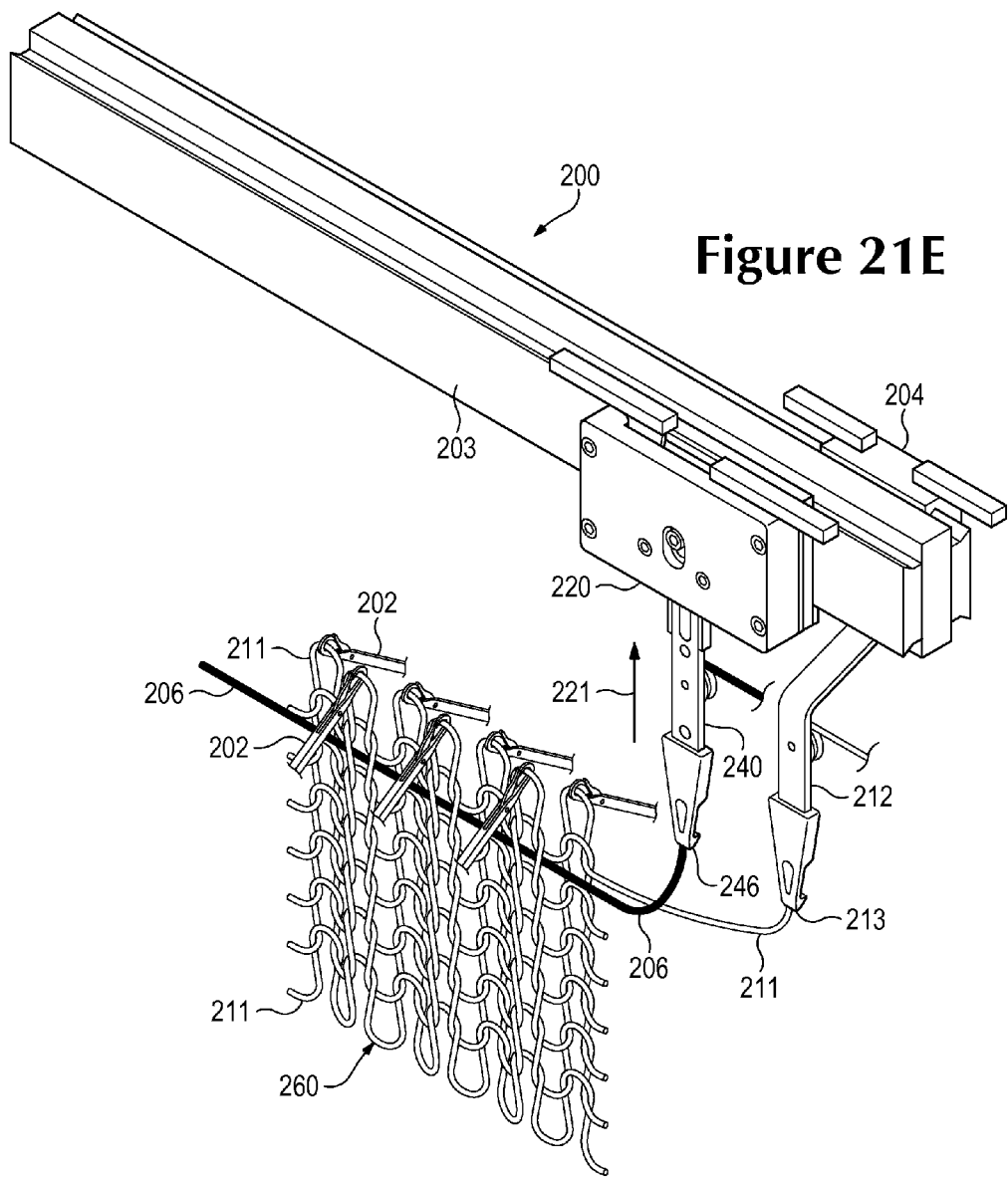

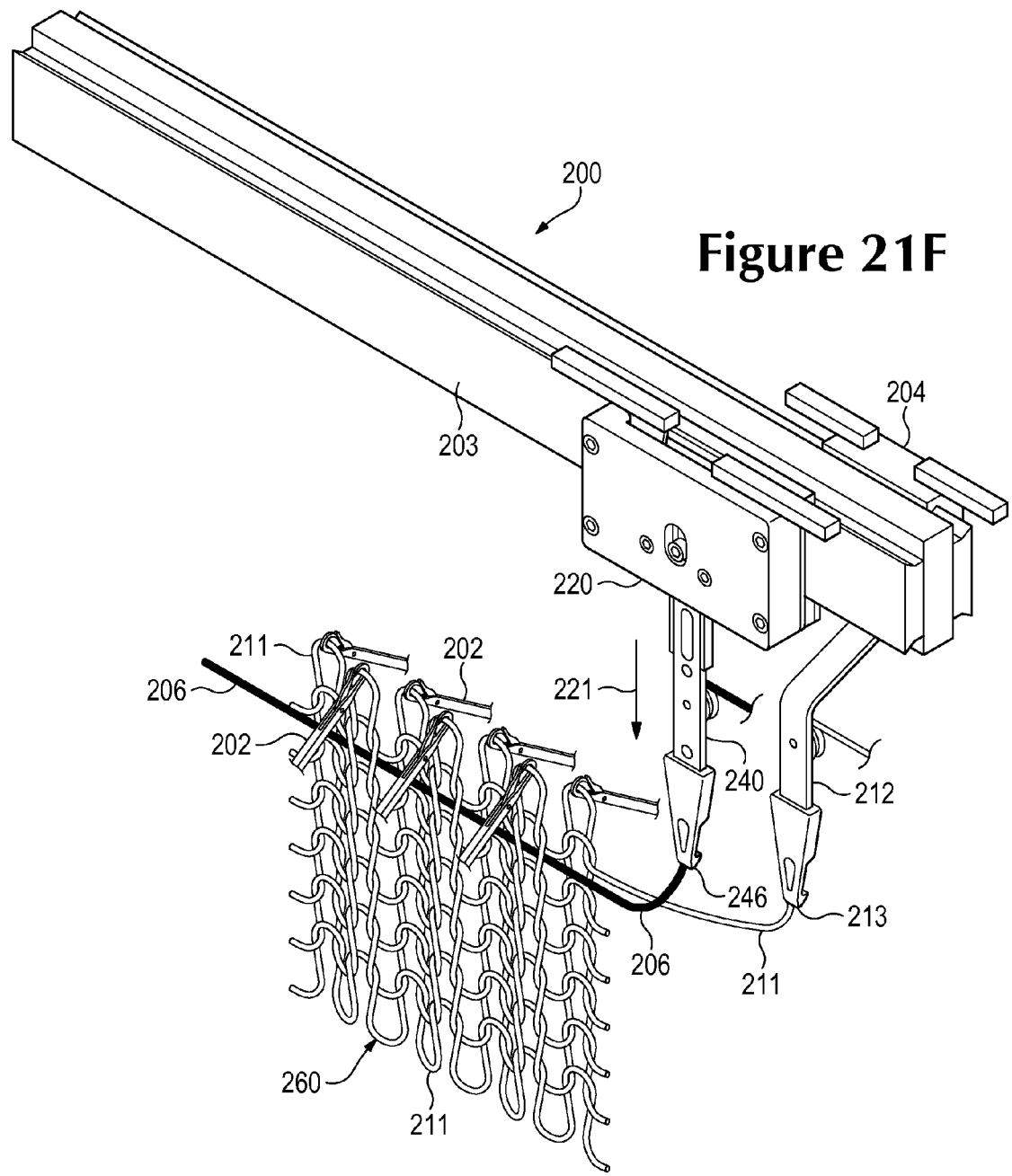

ARTICLE OF FOOTWEAR INCORPORATING A KNITTED COMPONENT

BACKGROUND

Conventional articles of footwear generally include two primary elements, an upper and a sole structure. The upper is secured to the sole structure and forms a void on the interior of the footwear for comfortably and securely receiving a foot. The sole structure is secured to a lower area of the upper, thereby being positioned between the upper and the ground. In athletic footwear, for example, the sole structure may include a midsole and an outsole. The midsole often includes a polymer foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole structure formed from a durable and wear-resistant material, such as rubber. The sole structure may also include a sockliner positioned within the void and proximal a lower surface of the foot to enhance footwear comfort.

The upper generally extends over the instep and toe areas of the foot, along the medial and lateral sides of the foot, under the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

A variety of material elements (e.g., textiles, polymer foam, polymer sheets, leather, synthetic leather) are conventionally utilized in manufacturing the upper. In athletic footwear, for example, the upper may have multiple layers that each include a variety of joined material elements. As examples, the material elements may be selected to impart stretch-resistance, wear-resistance, flexibility, air-permeability, compressibility, comfort, and moisture-wicking to different areas of the upper. In order to impart the different properties to different areas of the upper, material elements are often cut to desired shapes and then joined together, usually with stitching or adhesive bonding. Moreover, the material elements are often joined in a layered configuration to impart multiple properties to the same areas. As the number and type of material elements incorporated into the upper increases, the time and expense associated with transporting, stocking, cutting, and joining the material elements may also increase. Waste material from cutting and stitching processes also accumulates to a greater degree as the number and type of material elements incorporated into the upper increases. Moreover, uppers with a greater number of material elements may be more difficult to recycle than uppers formed from fewer types and numbers of material elements. By decreasing the number of material elements utilized in the upper, therefore, waste may be decreased while increasing the manufacturing efficiency and recyclability of the upper.

SUMMARY

An article of footwear is disclosed below as having an upper and a sole structure secured to the upper. A knitted component of the upper includes a fusible yarn and a non-fusible yarn that are knitted together to form a plurality of intermeshed loops defining courses and wales. The knitted component also includes an inlaid strand extending along at least one of the courses.

The discussion below also discloses an article of footwear having an upper that includes a knit element, an inlaid strand, and a lace. The knit element defines a portion of an exterior surface of the upper and an opposite interior surface of the upper, with the interior surface defining a void for receiving a foot. The knit element extends from a throat area of the upper to a lower area of the upper, and the knit element defines a plurality of apertures located within the throat area. The inlaid strand extends through the knit element from the throat area to the lower area. The inlaid strand also extends at least partially around the apertures in the throat area, and the inlaid strand is located between the exterior surface and the interior surface in the throat area. The lace extends through the apertures.

Additionally, an article of footwear is disclosed below as having an upper that includes a first knitted layer, a second knitted layer, and a plurality of floating yarns. The first knitted layer forms at least a portion of an exterior surface of the upper. The second knitted layer is formed of unitary knit construction with the first knitted layer, and the second knitted layer is positioned adjacent to the first knitted layer and at least partially coextensive with the first knitted layer to define a tube between the first knitted layer and the second knitted layer. The floating yarns are located within the tube and extend in a direction that is substantially parallel to the first knitted layer and the second knitted layer. Moreover, the first knitted layer and the second knitted layer are at least partially formed from a yarn that stretches at least one hundred percent.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 6 is a bottom plan view of the first knitted component.

FIGS. 12A-12E are cross-sectional views of the second knitted component, as defined by section lines 12A-12E in FIG. 9.

FIGS. 14A-14C are top plan views corresponding with FIG. 5 and depicting further configurations of the first knitted component.

FIGS. 21A-21I are schematic perspective views of a knitting process utilizing the combination feeder and a conventional feeder.

DETAILED DESCRIPTION

Figure 1:
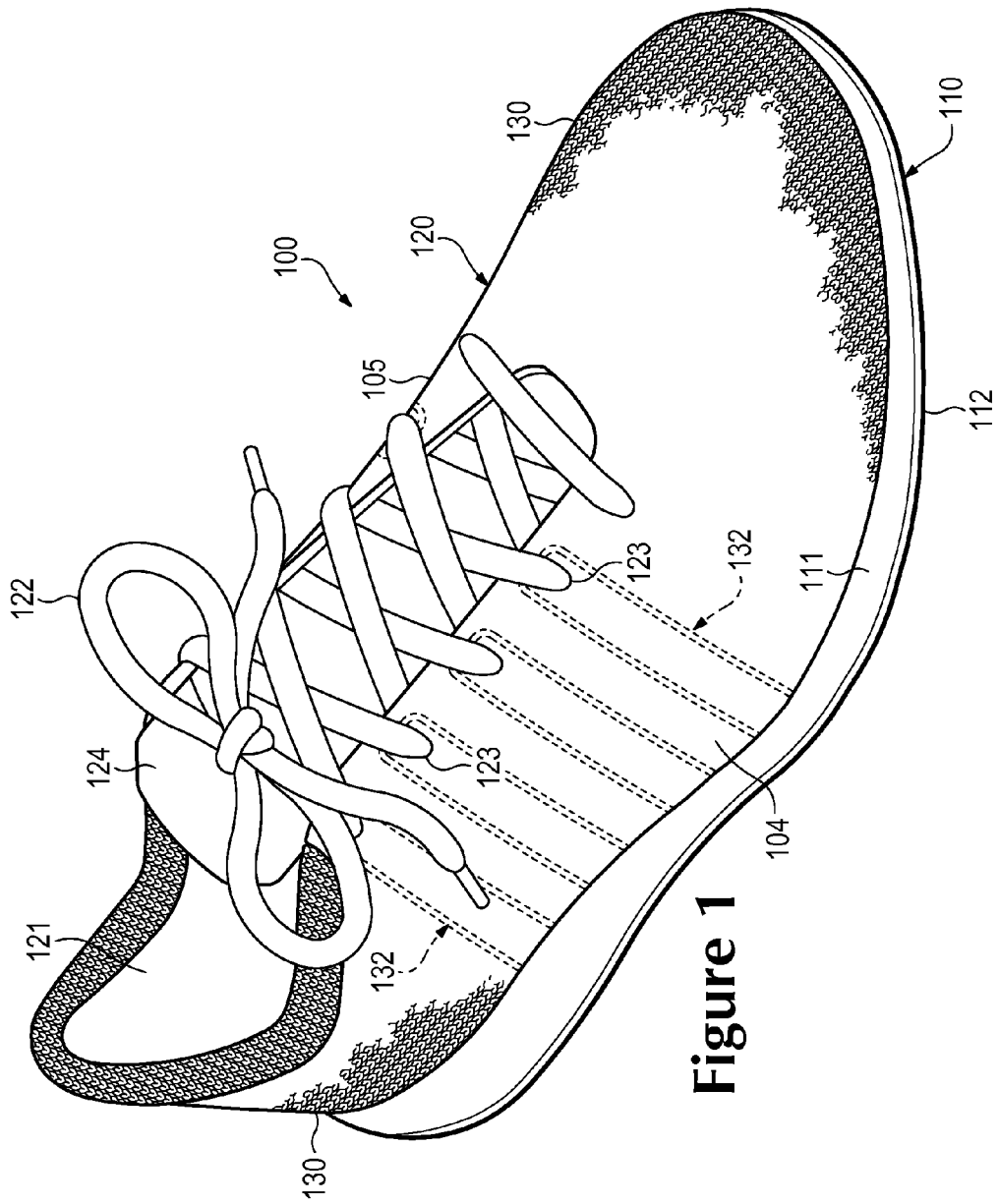
FIG. 1 is a perspective view of an article of footwear.
Figure 2:
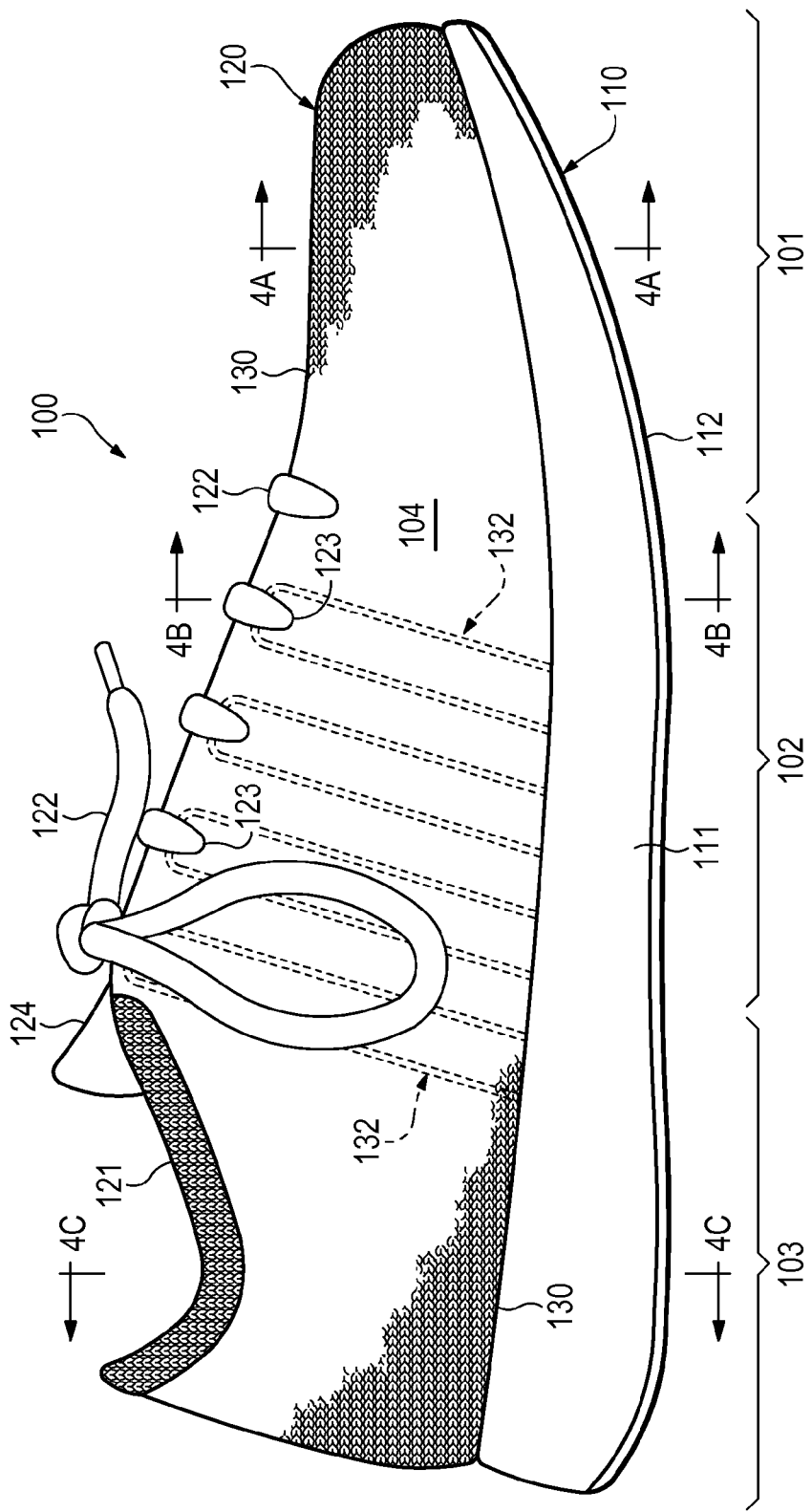
FIG. 2 is a lateral side elevational view of the article of footwear.
Figure 3:
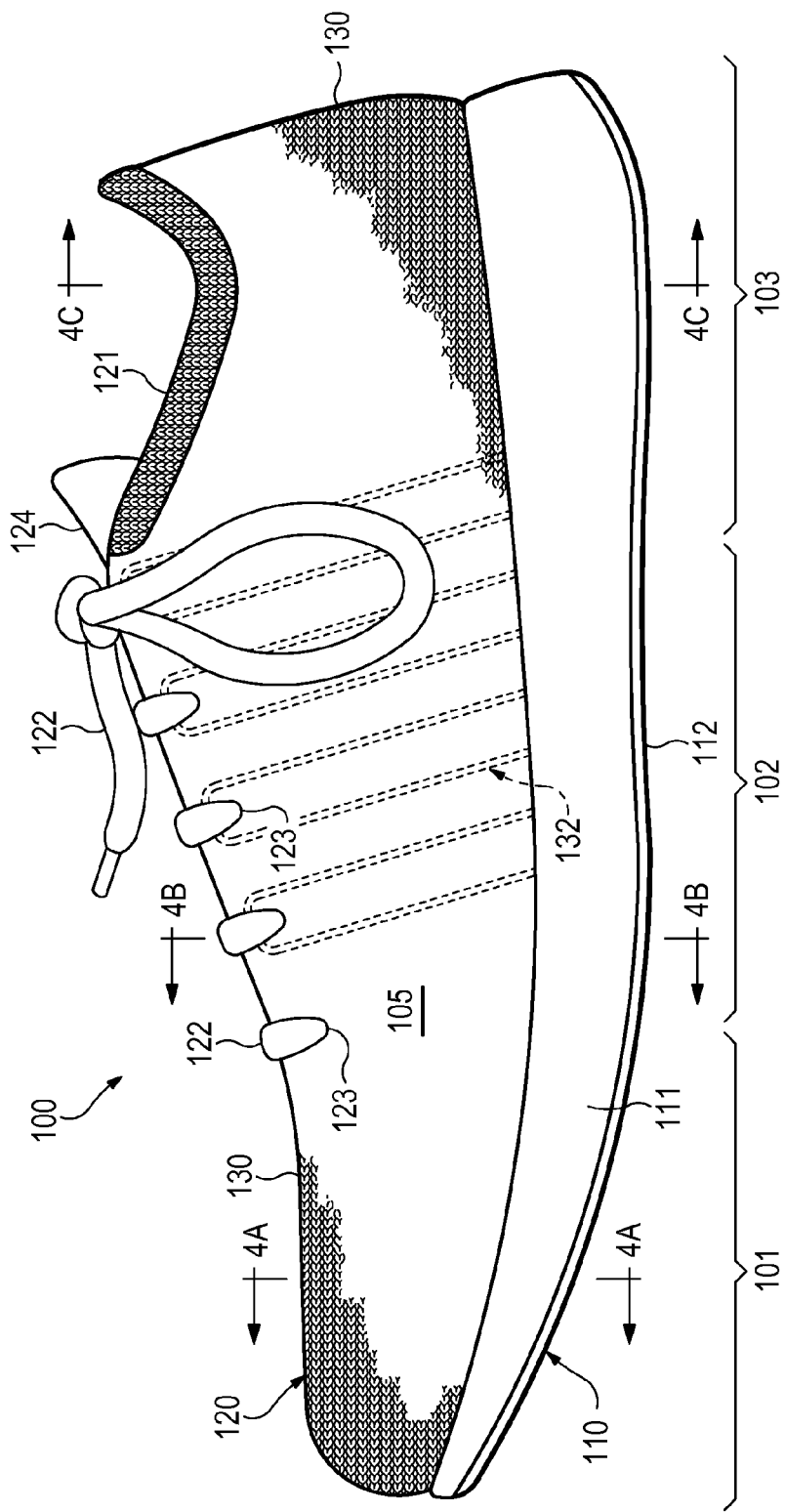
FIG. 3 is a medial side elevational view of the article of footwear.

The following discussion and accompanying figures disclose a variety of concepts relating to knitted components and the manufacture of knitted components. Although the knitted components may be utilized in a variety of products, an article of footwear that incorporates one of the knitted components is disclosed below as an example. In addition to footwear, the knitted components may be utilized in other types of apparel (e.g., shirts, pants, socks, jackets, undergarments), athletic equipment (e.g., golf bags, baseball and football gloves, soccer ball restriction structures), containers (e.g., backpacks, bags), and upholstery for furniture (e.g., chairs, couches, car seats). The knitted components may also be utilized in bed coverings (e.g., sheets, blankets), table coverings, towels, flags, tents, sails, and parachutes. The knitted components may be utilized as technical textiles for industrial purposes, including structures for automotive and aerospace applications, filter materials, medical textiles (e.g. bandages, swabs, implants), geotextiles for reinforcing embankments, agrotextiles for crop protection, and industrial apparel that protects or insulates against heat and radiation. Accordingly, the knitted components and other concepts disclosed herein may be incorporated into a variety of products for both personal and industrial purposes.

Footwear Configuration

An article of footwear 100 is depicted in FIGS. 1-4C as including a sole structure 110 and an upper 120. Although footwear 100 is illustrated as having a general configuration suitable for running, concepts associated with footwear 100 may also be applied to a variety of other athletic footwear types, including baseball shoes, basketball shoes, cycling shoes, football shoes, tennis shoes, soccer shoes, training shoes, walking shoes, and hiking boots, for example. The concepts may also be applied to footwear types that are generally considered to be non-athletic, including dress shoes, loafers, sandals, and work boots. Accordingly, the concepts disclosed with respect to footwear 100 apply to a wide variety of footwear types.

For reference purposes, footwear 100 may be divided into three general regions: a forefoot region 101, a midfoot region 102, and a heel region 103. Forefoot region 101 generally includes portions of footwear 100 corresponding with the toes and the joints connecting the metatarsals with the phalanges. Midfoot region 102 generally includes portions of footwear 100 corresponding with an arch area of the foot. Heel region 103 generally corresponds with rear portions of the foot, including the calcaneus bone. Footwear 100 also includes a lateral side 104 and a medial side 105, which extend through each of regions 101-103 and correspond with opposite sides of footwear 100. More particularly, lateral side 104 corresponds with an outside area of the foot (i.e. the surface that faces away from the other foot), and medial side 105 corresponds with an inside area of the foot (i.e., the surface that faces toward the other foot). Regions 101-103 and sides 104-105 are not intended to demarcate precise areas of footwear 100. Rather, regions 101-103 and sides 104-105 are intended to represent general areas of footwear 100 to aid in the following discussion. In addition to footwear 100, regions 101-103 and sides 104-105 may also be applied to sole structure 110, upper 120, and individual elements thereof.

Sole structure 110 is secured to upper 120 and extends between the foot and the ground when footwear 100 is worn. The primary elements of sole structure 110 are a midsole 111, an outsole 112, and a sockliner 113. Midsole 111 is secured to a lower surface of upper 120 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 111 may incorporate plates, moderators, fluid-filled chambers, lasting elements, or motion control members that further attenuate forces, enhance stability, or influence the motions of the foot, or midsole 21 may be primarily formed from a fluid-filled chamber. Outsole 112 is secured to a lower surface of midsole 111 and may be formed from a wear-resistant rubber material that is textured to impart traction. Sockliner 113 is located within upper 120 and is positioned to extend under a lower surface of the foot to enhance the comfort of footwear 100. Although this configuration for sole structure 110 provides an example of a sole structure that may be used in connection with upper 120, a variety of other conventional or nonconventional configurations for sole structure 110 may also be utilized. Accordingly, the features of sole structure 110 or any sole structure utilized with upper 120 may vary considerably.

Upper 120 defines a void within footwear 100 for receiving and securing a foot relative to sole structure 110. The void is shaped to accommodate the foot and extends along a lateral side of the foot, along a medial side of the foot, over the foot, around the heel, and under the foot. Access to the void is provided by an ankle opening 121 located in at least heel region 103. A lace 122 extends through various lace apertures 123 in upper 120 and permits the wearer to modify dimensions of upper 120 to accommodate proportions of the foot. More particularly, lace 122 permits the wearer to tighten upper 120 around the foot, and lace 122 permits the wearer to loosen upper 120 to facilitate entry and removal of the foot from the void (i.e., through ankle opening 121). In addition, upper 120 includes a tongue 124 that extends under lace 122 and lace apertures 123 to enhance the comfort of footwear 100. In further configurations, upper 120 may include additional elements, such as (a) a heel counter in heel region 103 that enhances stability, (b) a toe guard in forefoot region 101 that is formed of a wear-resistant material, and (c) logos, trademarks, and placards with care instructions and material information.

Figure 4A:
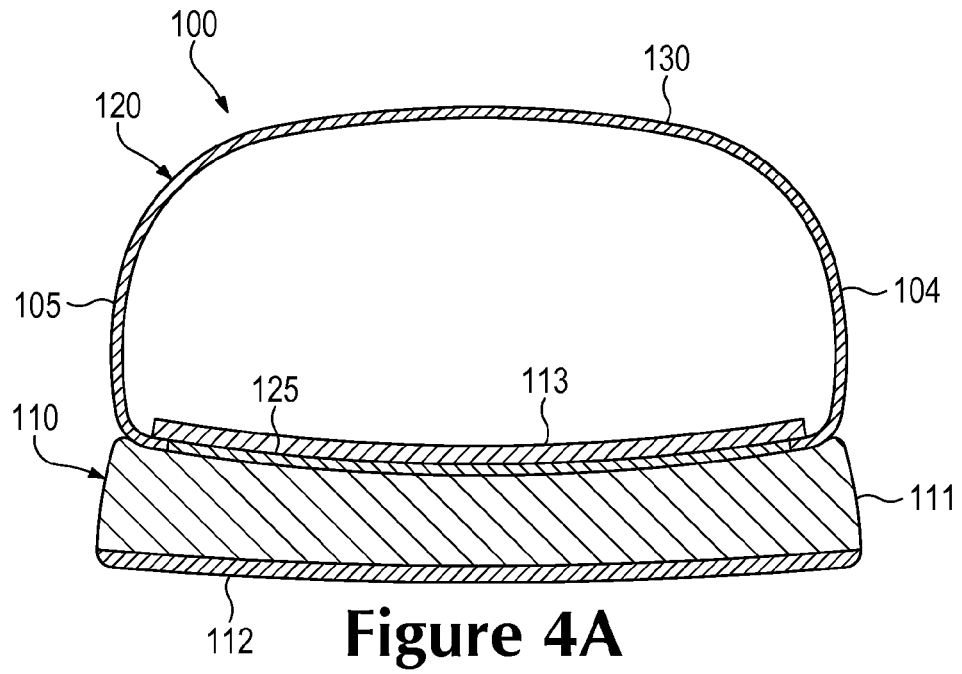
FIGS. 4A-4C are cross-sectional views of the article of footwear, as defined by section lines 4A-4C in FIGS. 2 and 3.
Figure 4B:
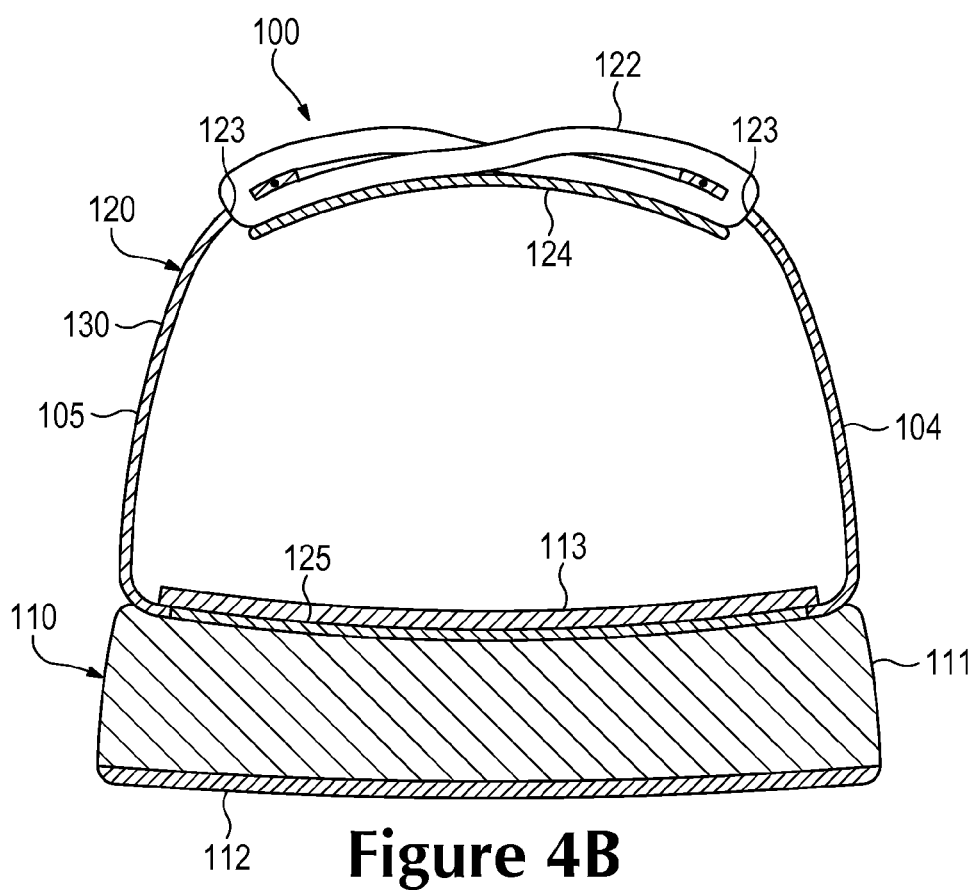
Figure 4C:
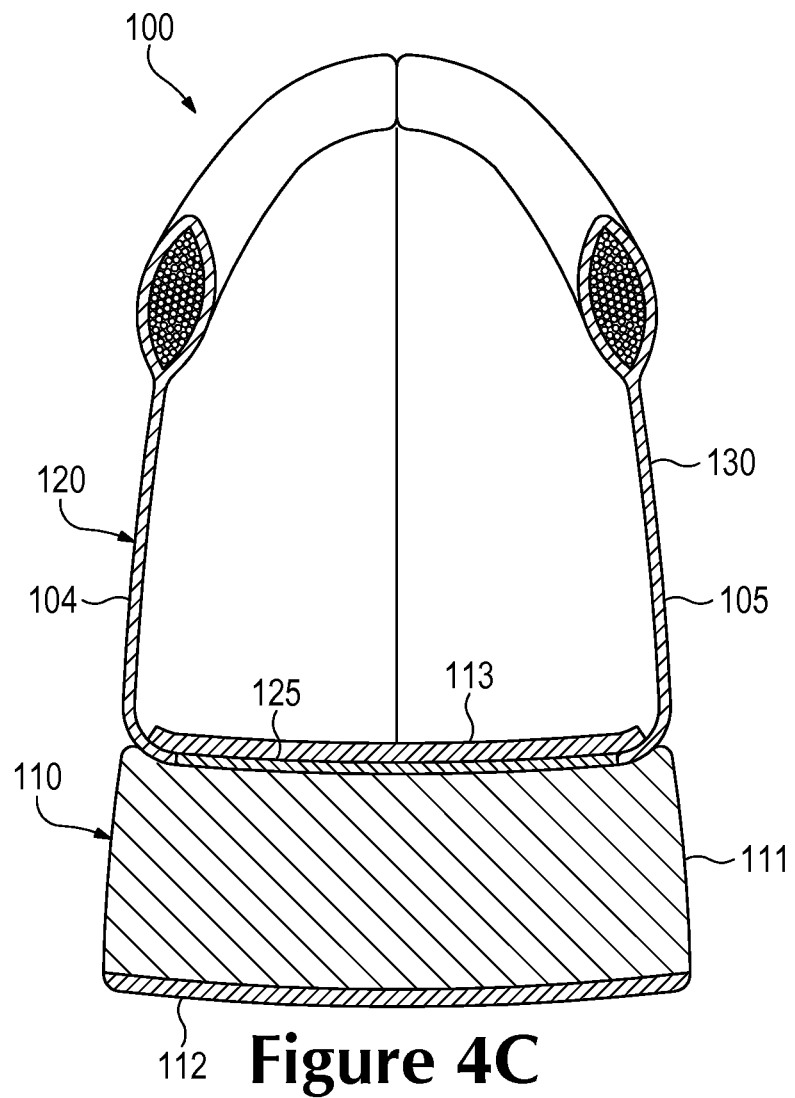

Many conventional footwear uppers are formed from multiple material elements (e.g., textiles, polymer foam, polymer sheets, leather, synthetic leather) that are joined through stitching or bonding, for example. In contrast, a majority of upper 120 is formed from a knitted component 130, which extends through each of regions 101-103, along both lateral side 104 and medial side 105, over forefoot region 101, and around heel region 103. In addition, knitted component 130 forms portions of both an exterior surface and an opposite interior surface of upper 120. As such, knitted component 130 defines at least a portion of the void within upper 120. In some configurations, knitted component 130 may also extend under the foot. Referring to FIGS. 4A-4C, however, a strobel sock 125 is secured to knitted component 130 and an upper surface of midsole 111, thereby forming a portion of upper 120 that extends under sockliner 113.

Knitted Component Configuration

Figure 5:
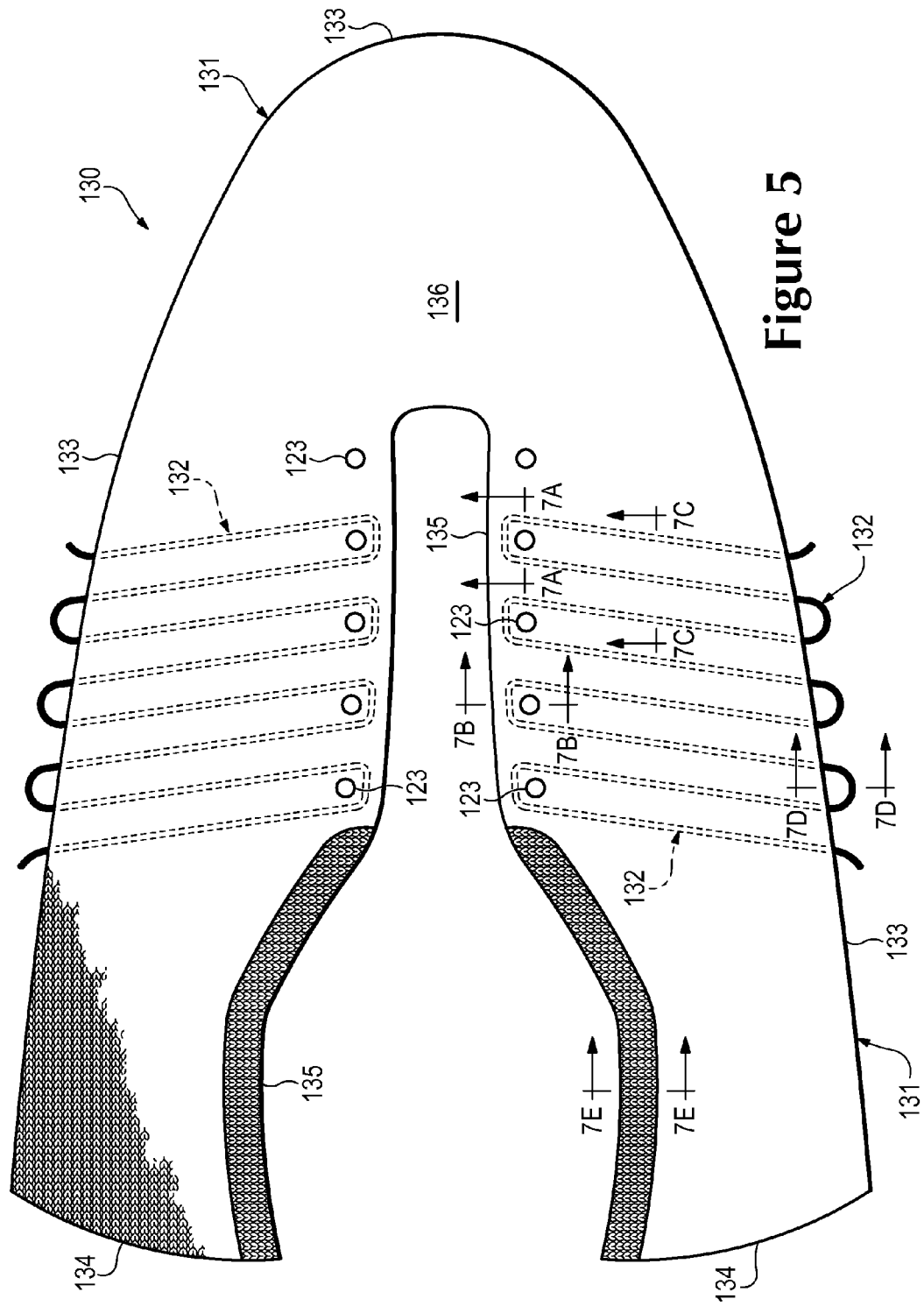
FIG. 5 is a top plan view of a first knitted component that forms a portion of an upper of the article of footwear.

Knitted component 130 is depicted separate from a remainder of footwear 100 in FIGS. 5 and 6. Knitted component 130 is formed of unitary knit construction. As utilized herein, a knitted component (e.g., knitted component 130) is defined as being formed of "unitary knit construction" when formed as a one-piece element through a knitting process. That is, the knitting process substantially forms the various features and structures of knitted component 130 without the need for significant additional manufacturing steps or processes. Although portions of knitted component 130 may be joined to each other (e.g., edges of knitted component 130 being joined together) following the knitting process, knitted component 130 remains formed of unitary knit construction because it is formed as a one-piece knit element. Moreover, knitted component 130 remains formed of unitary knit construction when other elements (e.g., lace 122, tongue 124, logos, trademarks, placards with care instructions and material information) are added following the knitting process.

The primary elements of knitted component 130 are a knit element 131 and an inlaid strand 132. Knit element 131 is formed from at least one yarn that is manipulated (e.g., with a knitting machine) to form a plurality of intermeshed loops that define a variety of courses and wales. That is, knit element 131 has the structure of a knit textile. Inlaid strand 132 extends through knit element 131 and passes between the various loops within knit element 131. Although inlaid strand 132 generally extends along courses within knit element 131, inlaid strand 132 may also extend along wales within knit element 131. Advantages of inlaid strand 132 include providing support, stability, and structure. For example, inlaid strand 132 assists with securing upper 120 around the foot, limits deformation in areas of upper 120 (e.g., imparts stretch-resistance) and operates in connection with lace 122 to enhance the fit of footwear 100.

Knit element 131 has a generally U-shaped configuration that is outlined by a perimeter edge 133, a pair of heel edges 134, and an inner edge 135. When incorporated into footwear 100, perimeter edge 133 lays against the upper surface of midsole 111 and is joined to strobel sock 125. Heel edges 134 are joined to each other and extend vertically in heel region 103. In some configurations of footwear 100, a material element may cover a seam between heel edges 134 to reinforce the seam and enhance the aesthetic appeal of footwear 100. Inner edge 135 forms ankle opening 121 and extends forward to an area where lace 122, lace apertures 123, and tongue 124 are located. In addition, knit element 131 has a first surface 136 and an opposite second surface 137. First surface 136 forms a portion of the exterior surface of upper 120, whereas second surface 137 forms a portion of the interior surface of upper 120, thereby defining at least a portion of the void within upper 120.

Inlaid strand 132, as noted above, extends through knit element 131 and passes between the various loops within knit element 131. More particularly, inlaid strand 132 is located within the knit structure of knit element 131, which may have the configuration of a single textile layer in the area of inlaid strand 132, and between surfaces 136 and 137, as depicted in FIGS. 7A-7D. When knitted component 130 is incorporated into footwear 100, therefore, inlaid strand 132 is located between the exterior surface and the interior surface of upper 120. In some configurations, portions of inlaid strand 132 may be visible or exposed on one or both of surfaces 136 and 137. For example, inlaid strand 132 may lay against one of surfaces 136 and 137, or knit element 131 may form indentations or apertures through which inlaid strand passes. An advantage of having inlaid strand 132 located between surfaces 136 and 137 is that knit element 131 protects inlaid strand 132 from abrasion and snagging.

Referring to FIGS. 5 and 6, inlaid strand 132 repeatedly extends from perimeter edge 133 toward inner edge 135 and adjacent to a side of one lace aperture 123, at least partially around the lace aperture 123 to an opposite side, and back to perimeter edge 133. When knitted component 130 is incorporated into footwear 100, knit element 131 extends from a throat area of upper 120 (i.e., where lace 122, lace apertures 123, and tongue 124 are located) to a lower area of upper 120 (i.e., where knit element 131 joins with sole structure 110. In this configuration, inlaid strand 132 also extends from the throat area to the lower area. More particularly, inlaid strand repeatedly passes through knit element 131 from the throat area to the lower area.

Although knit element 131 may be formed in a variety of ways, courses of the knit structure generally extend in the same direction as inlaid strands 132. That is, courses may extend in the direction extending between the throat area and the lower area. As such, a majority of inlaid strand 132 extends along the courses within knit element 131. In areas adjacent to lace apertures 123, however, inlaid strand 132 may also extend along wales within knit element 131. More particularly, sections of inlaid strand 132 that are parallel to inner edge 135 may extend along the wales.

As discussed above, inlaid strand 132 passes back and forth through knit element 131. Referring to FIGS. 5 and 6, inlaid strand 132 also repeatedly exits knit element 131 at perimeter edge 133 and then re-enters knit element 131 at another location of perimeter edge 133, thereby forming loops along perimeter edge 133. An advantage to this configuration is that each section of inlaid strand 132 that extends between the throat area and the lower area may be independently tensioned, loosened, or otherwise adjusted during the manufacturing process of footwear 100. That is, prior to securing sole structure 110 to upper 120, sections of inlaid strand 132 may be independently adjusted to the proper tension.

In comparison with knit element 131, inlaid strand 132 may exhibit greater stretch-resistance. That is, inlaid strand 132 may stretch less than knit element 131. Given that numerous sections of inlaid strand 132 extend from the throat area of upper 120 to the lower area of upper 120, inlaid strand 132 imparts stretch-resistance to the portion of upper 120 between the throat area and the lower area. Moreover, placing tension upon lace 122 may impart tension to inlaid strand 132, thereby inducing the portion of upper 120 between the throat area and the lower area to lay against the foot. As such, inlaid strand 132 operates in connection with lace 122 to enhance the fit of footwear 100.

Knit element 131 may incorporate various types of yarn that impart different properties to separate areas of upper 120. That is, one area of knit element 131 may be formed from a first type of yarn that imparts a first set of properties, and another area of knit element 131 may be formed from a second type of yarn that imparts a second set of properties. In this configuration, properties may vary throughout upper 120 by selecting specific yarns for different areas of knit element 131. The properties that a particular type of yarn will impart to an area of knit element 131 partially depend upon the materials that form the various filaments and fibers within the yarn. Cotton, for example, provides a soft hand, natural aesthetics, and biodegradability. Elastane and stretch polyester each provide substantial stretch and recovery, with stretch polyester also providing recyclability. Rayon provides high luster and moisture absorption. Wool also provides high moisture absorption, in addition to insulating properties and biodegradability. Nylon is a durable and abrasion-resistant material with relatively high strength. Polyester is a hydrophobic material that also provides relatively high durability. In addition to materials, other aspects of the yarns selected for knit element 131 may affect the properties of upper 120. For example, a yarn forming knit element 131 may be a monofilament yarn or a multifilament yarn. The yarn may also include separate filaments that are each formed of different materials. In addition, the yarn may include filaments that are each formed of two or more different materials, such as a bicomponent yarn with filaments having a sheath-core configuration or two halves formed of different materials. Different degrees of twist and crimping, as well as different deniers, may also affect the properties of upper 120. Accordingly, both the materials forming the yarn and other aspects of the yarn may be selected to impart a variety of properties to separate areas of upper 120.

As with the yarns forming knit element 131, the configuration of inlaid strand 132 may also vary significantly. In addition to yarn, inlaid strand 132 may have the configurations of a filament (e.g., a monofilament), thread, rope, webbing, cable, or chain, for example. In comparison with the yarns forming knit element 131, the thickness of inlaid strand 132 may be greater. In some configurations, inlaid strand 132 may have a significantly greater thickness than the yarns of knit element 131. Although the cross-sectional shape of inlaid strand 132 may be round, triangular, square, rectangular, elliptical, or irregular shapes may also be utilized. Moreover, the materials forming inlaid strand 132 may include any of the materials for the yarn within knit element 131, such as cotton, elastane, polyester, rayon, wool, and nylon. As noted above, inlaid strand 132 may exhibit greater stretch-resistance than knit element 131. As such, suitable materials for inlaid strands 132 may include a variety of engineering filaments that are utilized for high tensile strength applications, including glass, aramids (e.g., para-aramid and meta-aramid), ultra-high molecular weight polyethylene, and liquid crystal polymer. As another example, a braided polyester thread may also be utilized as inlaid strand 132.

Figure 8A:
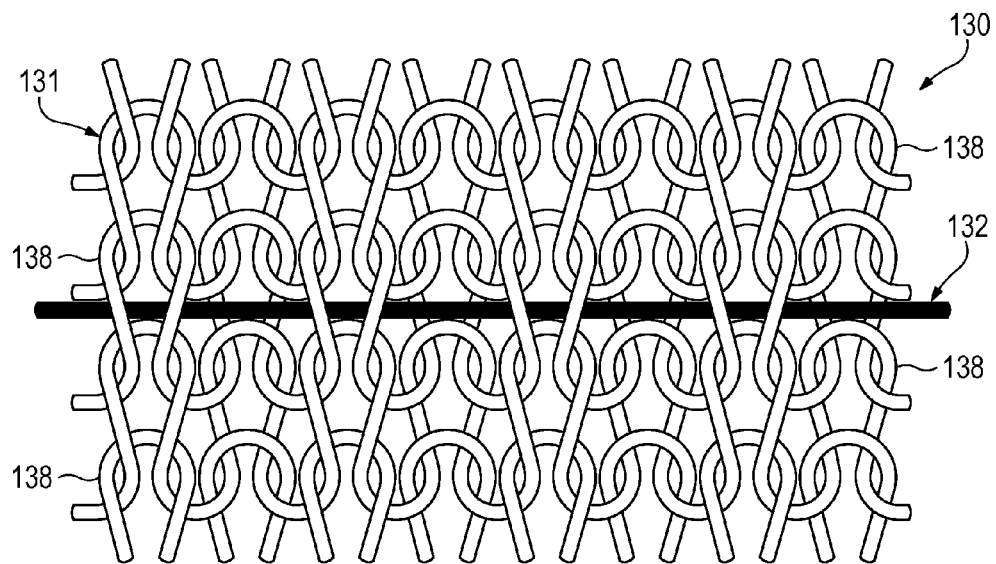
FIGS. 8A and 8B are plan views showing knit structures of the first knitted component.

An example of a suitable configuration for a portion of knitted component 130 is depicted in FIG. 8A. In this configuration, knit element 131 includes a yarn 138 that forms a plurality of intermeshed loops defining multiple horizontal courses and vertical wales. Inlaid strand 132 extends along one of the courses and alternates between being located (a) behind loops formed from yarn 138 and (b) in front of loops formed from yarn 138. In effect, inlaid strand 132 weaves through the structure formed by knit element 131. Although yarn 138 forms each of the courses in this configuration, additional yarns may form one or more of the courses or may form a portion of one or more of the courses.

Figure 8B:
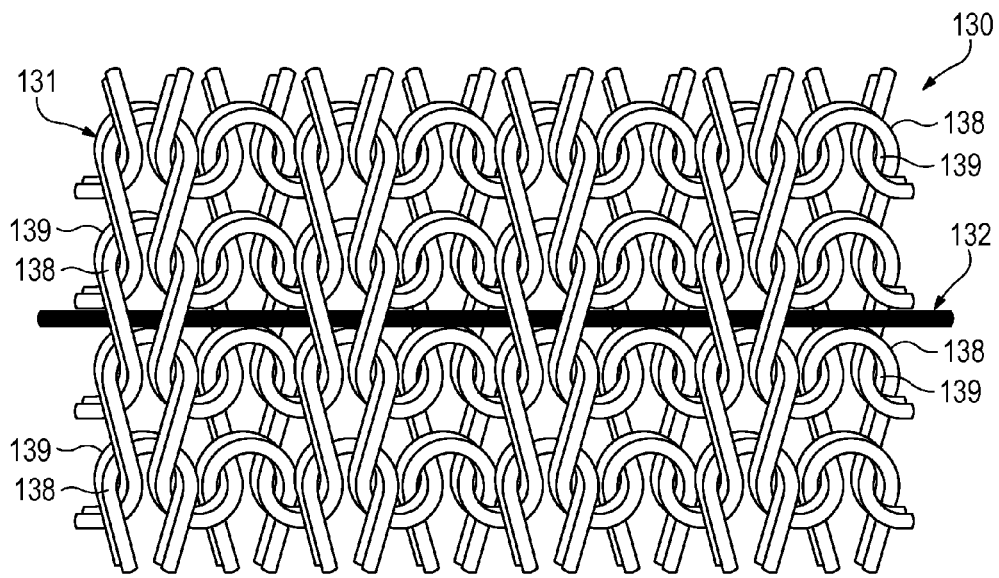

Another example of a suitable configuration for a portion of knitted component 130 is depicted in FIG. 8B. In this configuration, knit element 131 includes yarn 138 and another yarn 139. Yarns 138 and 139 are plated and cooperatively form a plurality of intermeshed loops defining multiple horizontal courses and vertical wales. That is, yarns 138 and 139 run parallel to each other. As with the configuration in FIG. 8A, inlaid strand 132 extends along one of the courses and alternates between being located (a) behind loops formed from yarns 138 and 139 and (b) in front of loops formed from yarns 138 and 139. An advantage of this configuration is that the properties of each of yarns 138 and 139 may be present in this area of knitted component 130. For example, yarns 138 and 139 may have different colors, with the color of yarn 138 being primarily present on a face of the various stitches in knit element 131 and the color of yarn 139 being primarily present on a reverse of the various stitches in knit element 131. As another example, yarn 139 may be formed from a yarn that is softer and more comfortable against the foot than yarn 138, with yarn 138 being primarily present on first surface 136 and yarn 139 being primarily present on second surface 137.

Continuing with the configuration of FIG. 8B, yarn 138 may be formed from at least one of a thermoset polymer material and natural fibers (e.g., cotton, wool, silk), whereas yarn 139 may be formed from a thermoplastic polymer material. In general, a thermoplastic polymer material melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, thermoplastic polymer materials are often used to join two objects or elements together. In this case, yarn 139 may be utilized to join (a) one portion of yarn 138 to another portion of yarn 138, (b) yarn 138 and inlaid strand 132 to each other, or (c) another element (e.g., logos, trademarks, and placards with care instructions and material information) to knitted component 130, for example. As such, yarn 139 may be considered a fusible yarn given that it may be used to fuse or otherwise join portions of knitted component 130 to each other. Moreover, yarn 138 may be considered a non-fusible yarn given that it is not formed from materials that are generally capable of fusing or otherwise joining portions of knitted component 130 to each other. That is, yarn 138 may be a non-fusible yarn, whereas yarn 139 may be a fusible yarn. In some configurations of knitted component 130, yarn 138 (i.e., the non-fusible yarn) may be substantially formed from a thermoset polyester material and yarn 139 (i.e., the fusible yarn) may be at least partially formed from a thermoplastic polyester material.

The use of plated yarns may impart advantages to knitted component 130. When yarn 139 is heated and fused to yarn 138 and inlaid strand 132, this process may have the effect of stiffening or rigidifying the structure of knitted component 130. Moreover, joining (a) one portion of yarn 138 to another portion of yarn 138 or (b) yarn 138 and inlaid strand 132 to each other has the effect of securing or locking the relative positions of yarn 138 and inlaid strand 132, thereby imparting stretch-resistance and stiffness. That is, portions of yarn 138 may not slide relative to each other when fused with yarn 139, thereby preventing warping or permanent stretching of knit element 131 due to relative movement of the knit structure.

Another benefit relates to limiting unraveling if a portion of knitted component 130 becomes damaged or one of yarns 138 is severed. Also, inlaid strand 132 may not slide relative to knit element 131, thereby preventing portions of inlaid strand 132 from pulling outward from knit element 131. Accordingly, areas of knitted component 130 may benefit from the use of both fusible and non-fusible yarns within knit element 131.

Figure 7A:
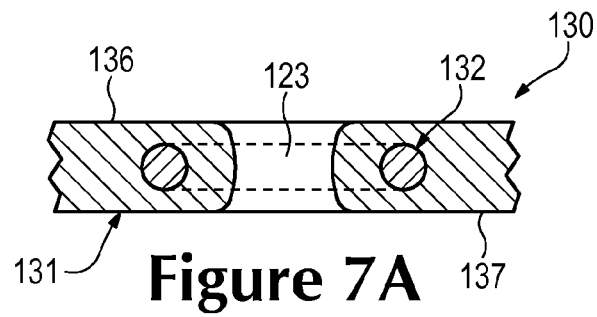
FIGS. 7A-7E are cross-sectional views of the first knitted component, as defined by section lines 7A-7E in FIG. 5.
Figure 7B:
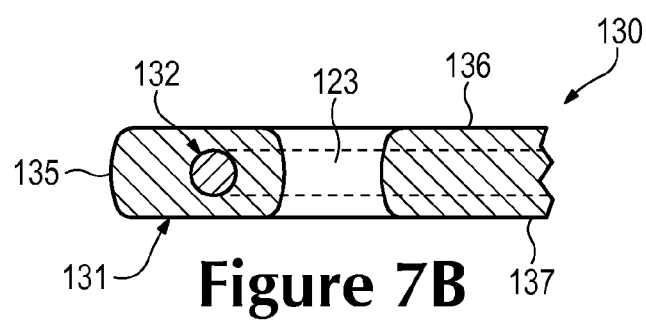
Figure 7C:
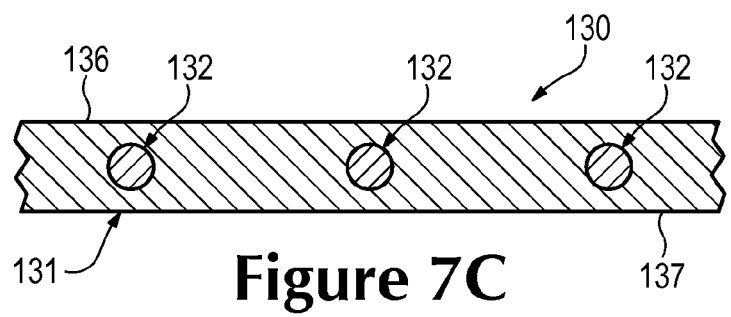
Figure 7D:
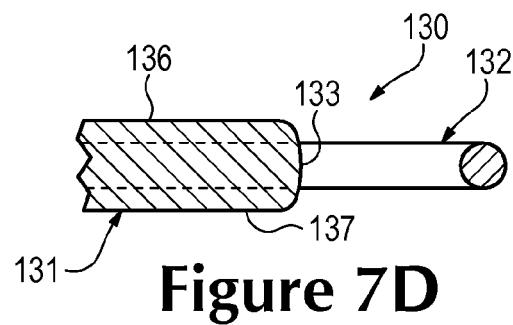
Figure 7E:
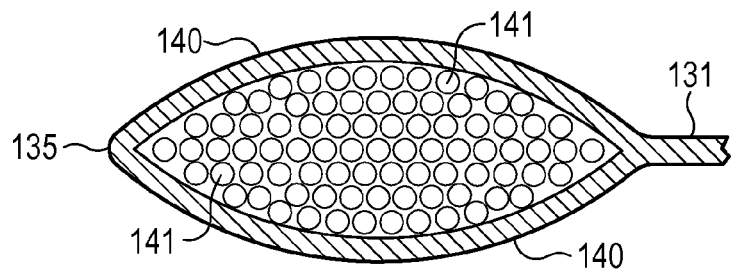

Another aspect of knitted component 130 relates to a padded area adjacent to ankle opening 121 and extending at least partially around ankle opening 121. Referring to FIG. 7E, the padded area is formed by two overlapping and at least partially coextensive knitted layers 140, which may be formed of unitary knit construction, and a plurality of floating yarns 141 extending between knitted layers 140. Although the sides or edges of knitted layers 140 are secured to each other, a central area is generally unsecured. As such, knitted layers 140 effectively form a tube or tubular structure, and floating yarns 141 may be located or inlaid between knitted layers 140 to pass through the tubular structure. That is, floating yarns 141 extend between knitted layers 140, are generally parallel to surfaces of knitted layers 140, and also pass through and fill an interior volume between knitted layers 140. Whereas a majority of knit element 131 is formed from yarns that are mechanically-manipulated to form intermeshed loops, floating yarns 141 are generally free or otherwise inlaid within the interior volume between knitted layers 140. As an additional matter, knitted layers 140 may be at least partially formed from a stretch yarn. An advantage of this configuration is that knitted layers will effectively compress floating yarns 141 and provide an elastic aspect to the padded area adjacent to ankle opening 121. That is, the stretch yarn within knitted layers 140 may be placed in tension during the knitting process that forms knitted component 130, thereby inducing knitted layers 140 to compress floating yarns 141. Although the degree of stretch in the stretch yarn may vary significantly, the stretch yarn may stretch at least one-hundred percent in many configurations of knitted component 130.

The presence of floating yarns 141 imparts a compressible aspect to the padded area adjacent to ankle opening 121, thereby enhancing the comfort of footwear 100 in the area of ankle opening 121. Many conventional articles of footwear incorporate polymer foam elements or other compressible materials into areas adjacent to an ankle opening. In contrast with the conventional articles of footwear, portions of knitted component 130 formed of unitary knit construction with a remainder of knitted component 130 may form the padded area adjacent to ankle opening 121. In further configurations of footwear 100, similar padded areas may be located in other areas of knitted component 130. For example, similar padded areas may be located as an area corresponding with joints between the metatarsals and proximal phalanges to impart padding to the joints. As an alternative, a terry loop structure may also be utilized to impart some degree of padding to areas of upper 120.

Based upon the above discussion, knit component 130 imparts a variety of features to upper 120. Moreover, knit component 130 provides a variety of advantages over some conventional upper configurations. As noted above, conventional footwear uppers are formed from multiple material elements (e.g., textiles, polymer foam, polymer sheets, leather, synthetic leather) that are joined through stitching or bonding, for example. As the number and type of material elements incorporated into an upper increases, the time and expense associated with transporting, stocking, cutting, and joining the material elements may also increase. Waste material from cutting and stitching processes also accumulates to a greater degree as the number and type of material elements incorporated into the upper increases. Moreover, uppers with a greater number of material elements may be more difficult to recycle than uppers formed from fewer types and numbers of material elements. By decreasing the number of material elements utilized in the upper, therefore, waste may be decreased while increasing the manufacturing efficiency and recyclability of the upper. To this end, knitted component 130 forms a substantial portion of upper 120, while increasing manufacturing efficiency, decreasing waste, and simplifying recyclability.

Further Knitted Component Configurations

Figure 9:
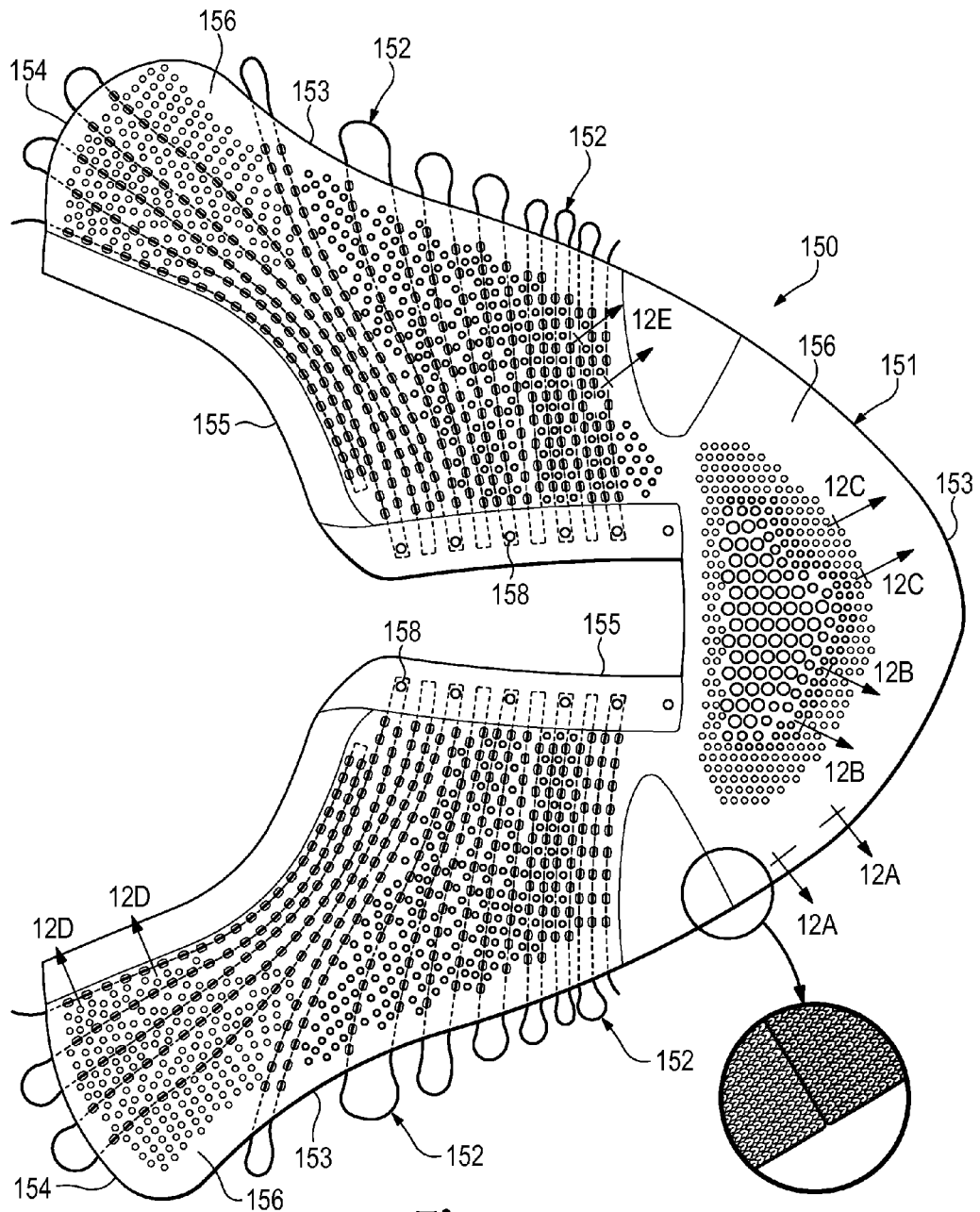
FIG. 9 is a top plan view of a second knitted component that may form a portion of the upper of the article of footwear.
Figure 10:
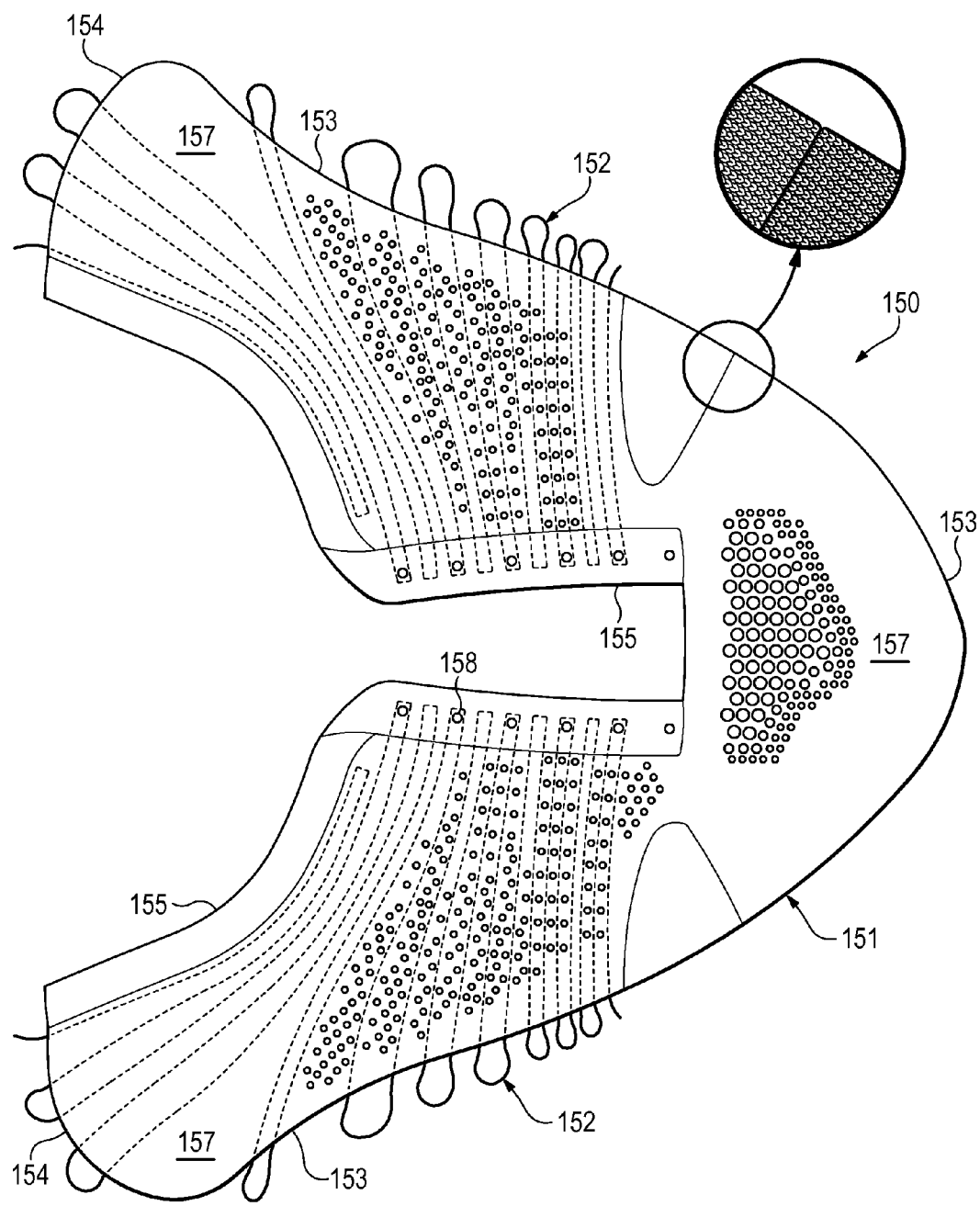
FIG. 10 is a bottom plan view of the second knitted component.

A knitted component 150 is depicted in FIGS. 9 and 10 and may be utilized in place of knitted component 130 in footwear 100. The primary elements of knitted component 150 are a knit element 151 and an inlaid strand 152. Knit element 151 is formed from at least one yarn that is manipulated (e.g., with a knitting machine) to form a plurality of intermeshed loops that define a variety of courses and wales. That is, knit element 151 has the structure of a knit textile. Inlaid strand 152 extends through knit element 151 and passes between the various loops within knit element 151. Although inlaid strand 152 generally extends along courses within knit element 151, inlaid strand 152 may also extend along wales within knit element 151. As with inlaid strand 132, inlaid strand 152 imparts stretch-resistance and, when incorporated into footwear 100, operates in connection with lace 122 to enhance the fit of footwear 100.

Knit element 151 has a generally U-shaped configuration that is outlined by a perimeter edge 153, a pair of heel edges 154, and an inner edge 155. In addition, knit element 151 has a first surface 156 and an opposite second surface 157. First surface 156 may form a portion of the exterior surface of upper 120, whereas second surface 157 may form a portion of the interior surface of upper 120, thereby defining at least a portion of the void within upper 120. In many configurations, knit element 151 may have the configuration of a single textile layer in the area of inlaid strand 152. That is, knit element 151 may be a single textile layer between surfaces 156 and 157. In addition, knit element 151 defines a plurality of lace apertures 158.

Similar to inlaid strand 132, inlaid strand 152 repeatedly extends from perimeter edge 153 toward inner edge 155, at least partially around one of lace apertures 158, and back to perimeter edge 153. In contrast with inlaid strand 132, however, some portions of inlaid strand 152 angle rearwards and extend to heel edges 154. More particularly, the portions of inlaid strand 152 associated with the most rearward lace apertures 158 extend from one of heel edges 154 toward inner edge 155, at least partially around one of the most rearward lace apertures 158, and back to one of heel edges 154. Additionally, some portions of inlaid strand 152 do not extend around one of lace apertures 158. More particularly, some sections of inlaid strand 152 extend toward inner edge 155, turn in areas adjacent to one of lace apertures 158, and extend back toward perimeter edge 153 or one of heel edges 154.

Although knit element 151 may be formed in a variety of ways, courses of the knit structure generally extend in the same direction as inlaid strands 152. In areas adjacent to lace apertures 158, however, inlaid strand 152 may also extend along wales within knit element 151. More particularly, sections of inlaid strand 152 that are parallel to inner edge 155 may extend along wales.

In comparison with knit element 151, inlaid strand 152 may exhibit greater stretch-resistance. That is, inlaid strand 152 may stretch less than knit element 151. Given that numerous sections of inlaid strand 152 extend through knit element 151, inlaid strand 152 may impart stretch-resistance to portions of upper 120 between the throat area and the lower area. Moreover, placing tension upon lace 122 may impart tension to inlaid strand 152, thereby inducing the portions of upper 120 between the throat area and the lower area to lay against the foot. Additionally, given that numerous sections of inlaid strand 152 extend toward heel edges 154, inlaid strand 152 may impart stretch-resistance to portions of upper 120 in heel region 103. Moreover, placing tension upon lace 122 may induce the portions of upper 120 in heel region 103 to lay against the foot. As such, inlaid strand 152 operates in connection with lace 122 to enhance the fit of footwear 100.

Knit element 151 may incorporate any of the various types of yarn discussed above for knit element 131. Inlaid strand 152 may also be formed from any of the configurations and materials discussed above for inlaid strand 132. Additionally, the various knit configurations discussed relative to FIGS. 8A and 8B may also be utilized in knitted component 150. More particularly, knit element 151 may have areas formed from a single yarn, two plated yarns, or a fusible yarn and a non-fusible yarn, with the fusible yarn joining (a) one portion of the non-fusible yarn to another portion of the non-fusible yarn or (b) the non-fusible yarn and inlaid strand 152 to each other.

Figure 11:
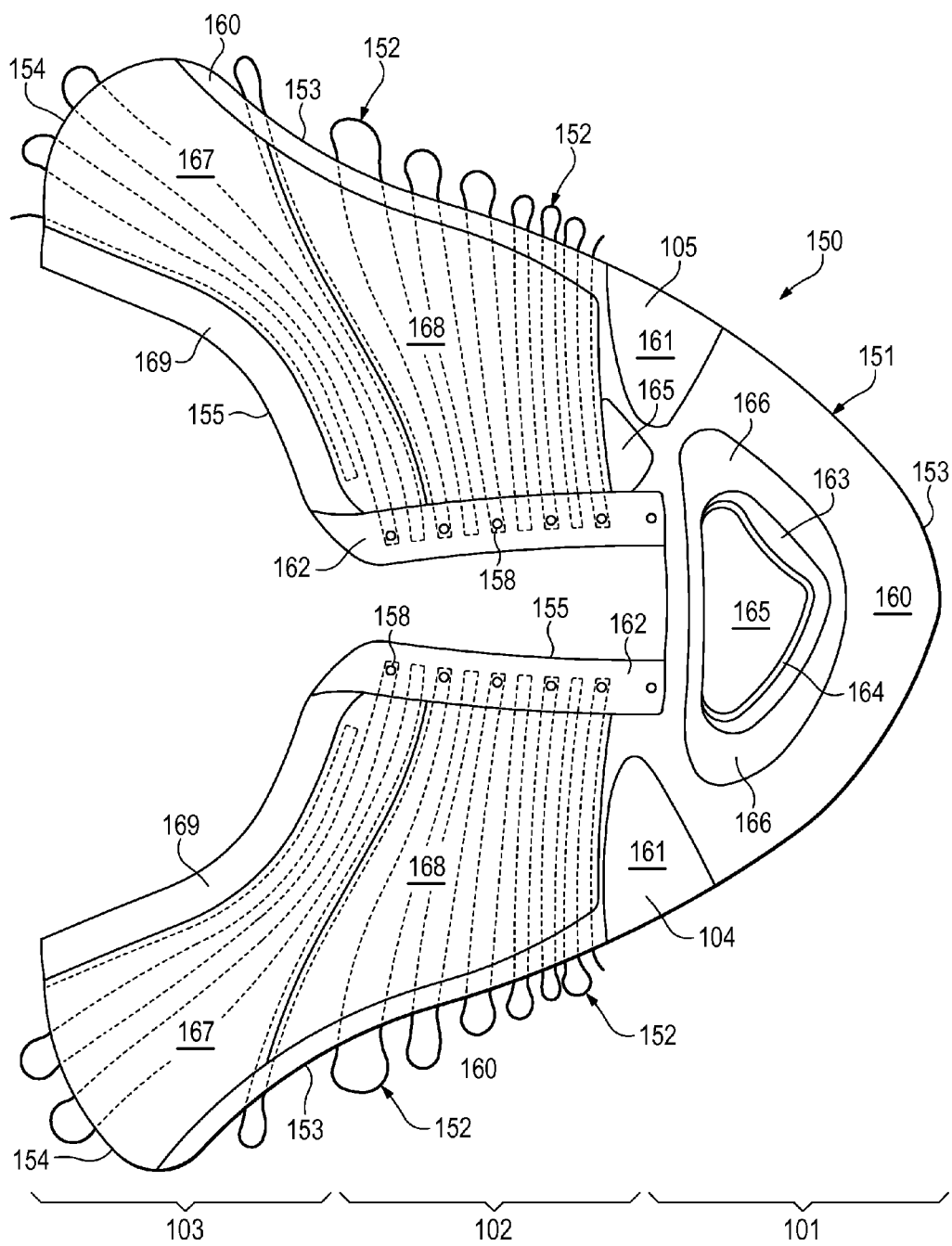
FIG. 11 is a schematic top plan view of the second knitted component showing knit zones.

A majority of knit element 131 is depicted as being formed from a relatively untextured textile and a common or single knit structure (e.g., a tubular knit structure). In contrast, knit element 151 incorporates various knit structures that impart specific properties and advantages to different areas of knitted component 150. Moreover, by combining various yarn types with the knit structures, knitted component 150 may impart a range of properties to different areas of upper 120. Referring to FIG. 11, a schematic view of knitted component 150 shows various zones 160-169 having different knit structures, each of which will now be discussed in detail. For purposes of reference, each of regions 101-103 and sides 104 and 105 are shown in FIG. 11 to provide a reference for the locations of knit zones 160-169 when knitted component 150 is incorporated into footwear 100.

Figure 13A:
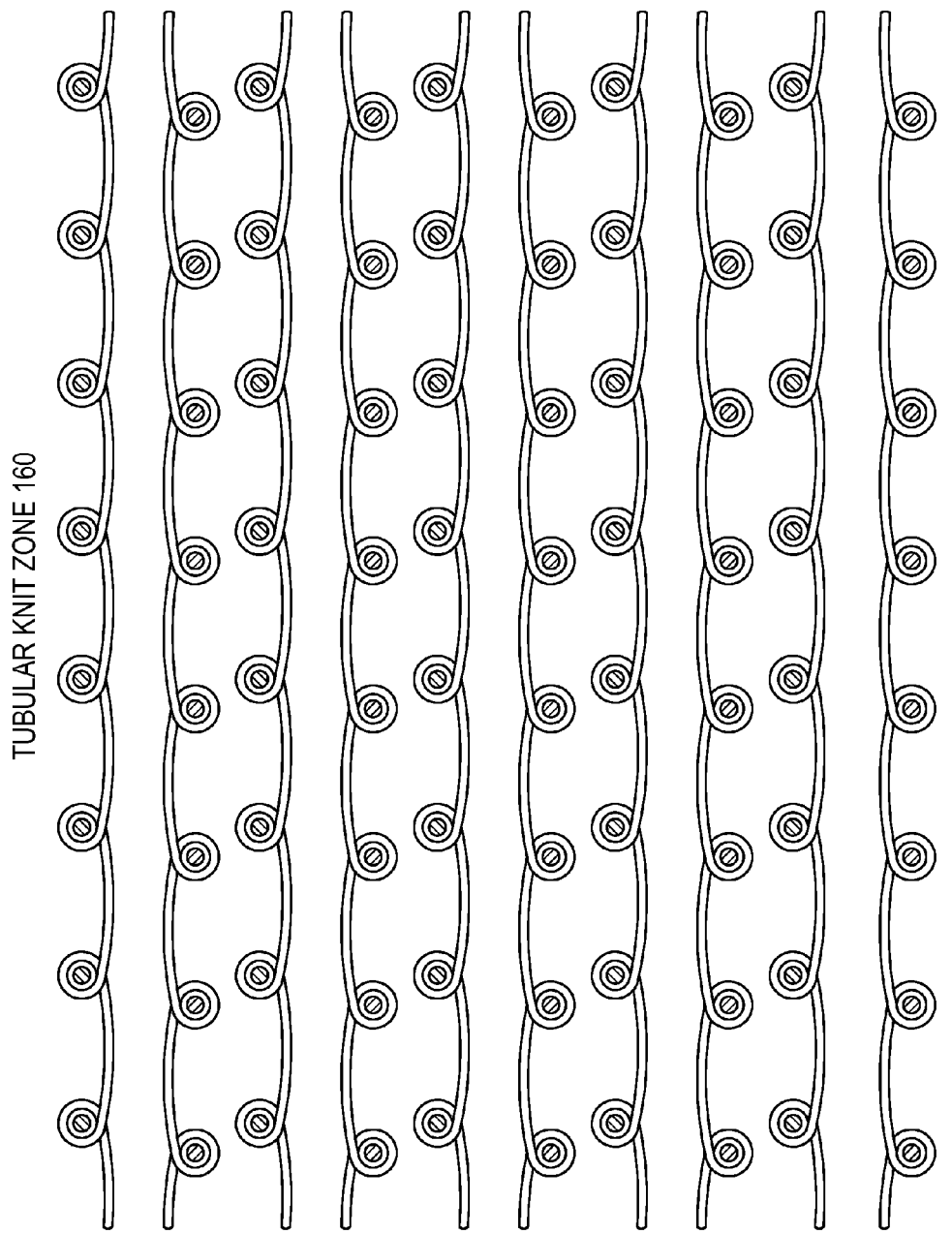
FIGS. 13A-13H are loop diagrams of the knit zones.

A tubular knit zone 160 extends along a majority of perimeter edge 153 and through each of regions 101-103 on both of sides 104 and 105. Tubular knit zone 160 also extends inward from each of sides 104 and 105 in an area approximately located at an interface regions 101 and 102 to form a forward portion of inner edge 155. Tubular knit zone 160 forms a relatively untextured knit configuration. Referring to FIG. 12A, a cross-section through an area of tubular knit zone 160 is depicted, and surfaces 156 and 157 are substantially parallel to each other. Tubular knit zone 160 imparts various advantages to footwear 100. For example, tubular knit zone 160 has greater durability and wear resistance than some other knit structures, especially when the yarn in tubular knit zone 160 is plated with a fusible yarn. In addition, the relatively untextured aspect of tubular knit zone 160 simplifies the process of joining strobel sock 125 to perimeter edge 153. That is, the portion of tubular knit zone 160 located along perimeter edge 153 facilitates the lasting process of footwear 100. For purposes of reference, FIG. 13A depicts a loop diagram of the manner in which tubular knit zone 160 is formed with a knitting process.

Two stretch knit zones 161 extend inward from perimeter edge 153 and are located to correspond with a location of joints between metatarsals and proximal phalanges of the foot. That is, stretch zones extend inward from perimeter edge in the area approximately located at the interface regions 101 and 102. As with tubular knit zone 160, the knit configuration in stretch knit zones 161 may be a tubular knit structure. In contrast with tubular knit zone 160, however, stretch knit zones 161 are formed from a stretch yarn that imparts stretch and recovery properties to knitted component 150. Although the degree of stretch in the stretch yarn may vary significantly, the stretch yarn may stretch at least one-hundred percent in many configurations of knitted component 150.

Figure 13B:
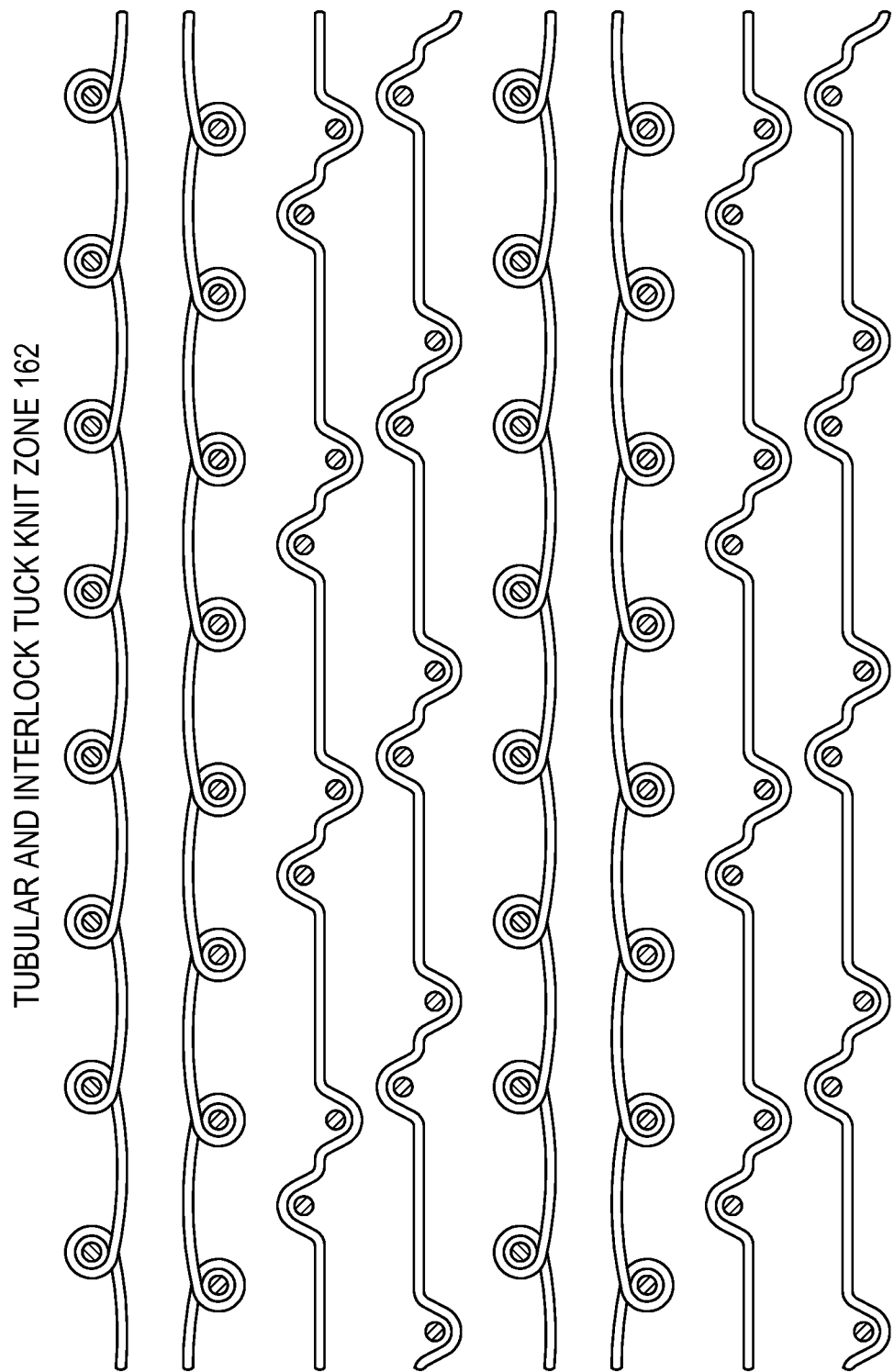

A tubular and interlock tuck knit zone 162 extends along a portion of inner edge 155 in at least midfoot region 102. Tubular and interlock tuck knit zone 162 also forms a relatively untextured knit configuration, but has greater thickness than tubular knit zone 160. In cross-section, tubular and interlock tuck knit zone 162 is similar to FIG. 12A, in which surfaces 156 and 157 are substantially parallel to each other. Tubular and interlock tuck knit zone 162 imparts various advantages to footwear 100. For example, tubular and interlock tuck knit zone 162 has greater stretch resistance than some other knit structures, which is beneficial when lace 122 places tubular and interlock tuck knit zone 162 and inlaid strands 152 in tension. For purposes of reference, FIG. 13B depicts a loop diagram of the manner in which tubular and interlock tuck knit zone 162 is formed with a knitting process.

Figure 13C:
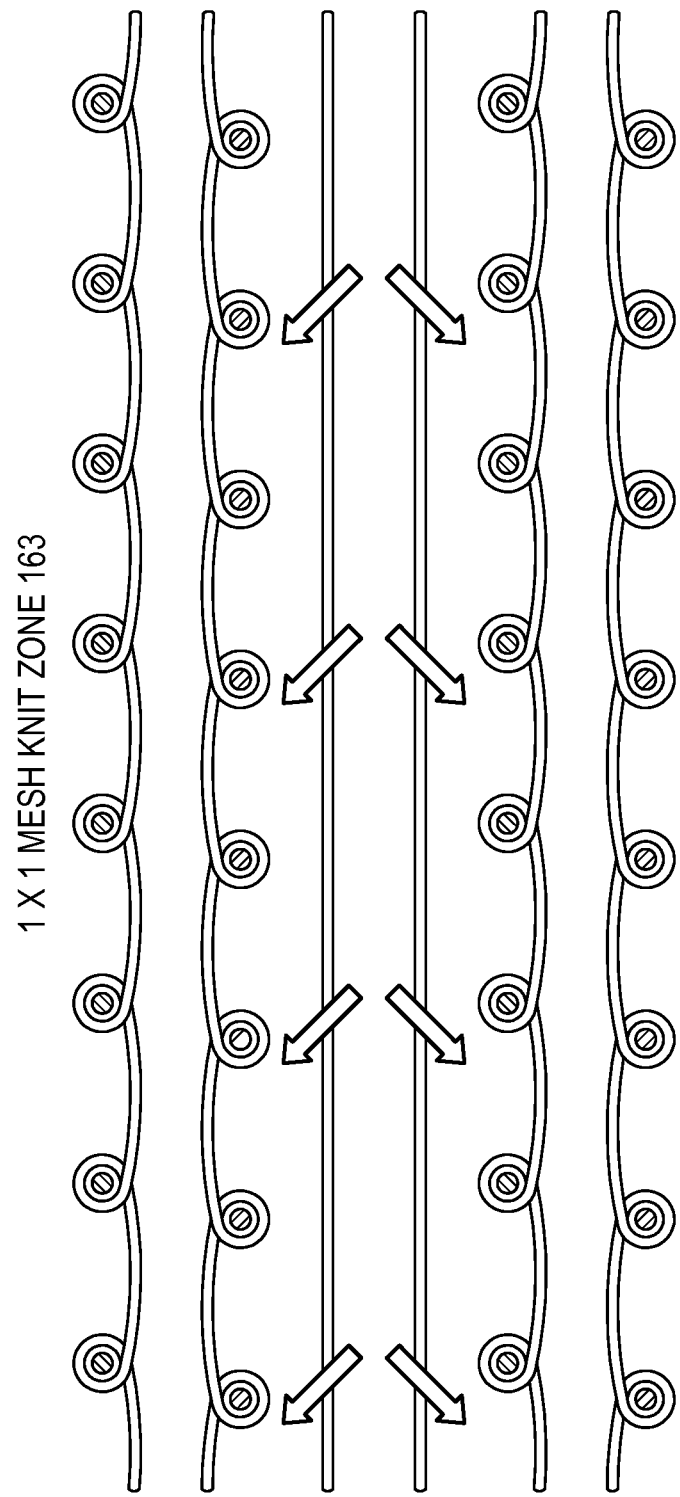

A 1×1 mesh knit zone 163 is located in forefoot region 101 and spaced inward from perimeter edge 153. 1×1 mesh knit zone has a C-shaped configuration and forms a plurality of apertures that extend through knit element 151 and from first surface 156 to second surface 157, as depicted in FIG. 12B. The apertures enhance the permeability of knitted component 150, which allows air to enter upper 120 and moisture to escape from upper 120. For purposes of reference, FIG. 13C depicts a loop diagram of the manner in which 1×1 mesh knit zone 163 is formed with a knitting process.

Figure 13D:
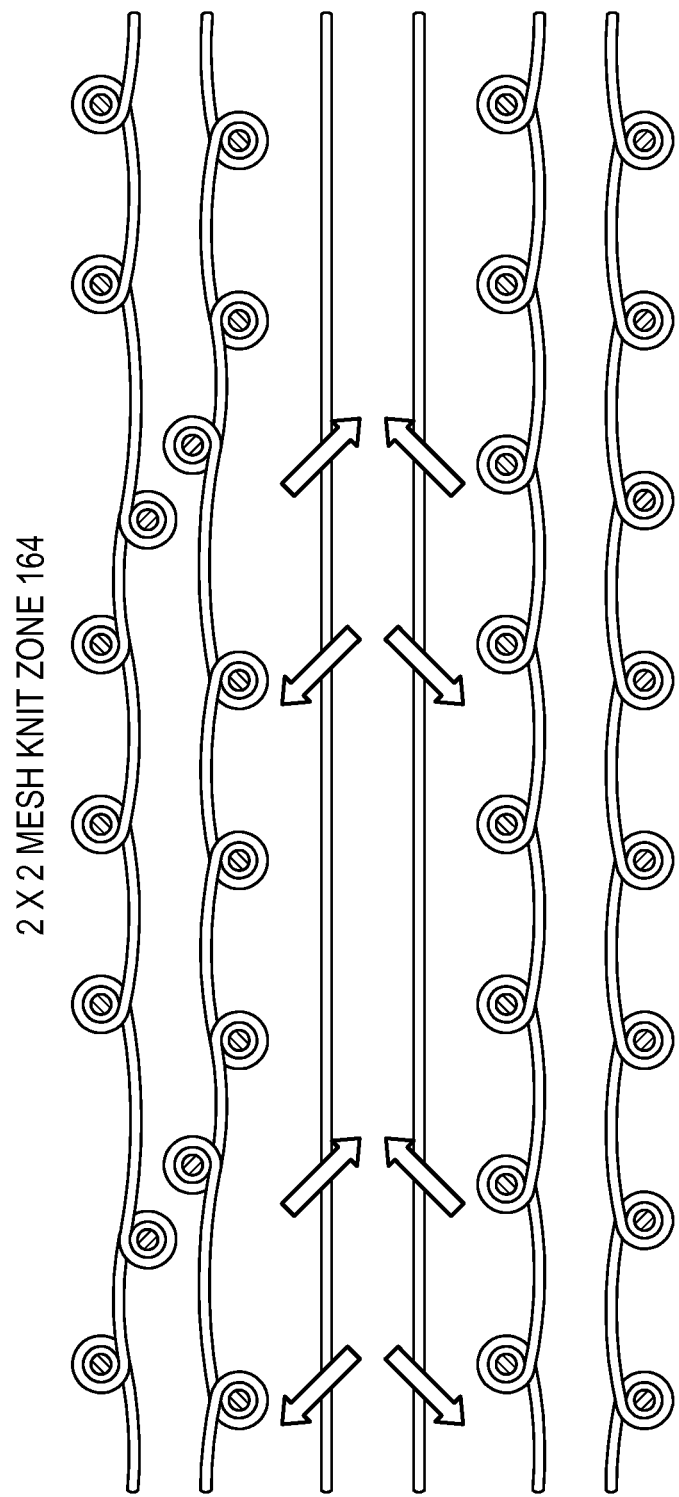

A 2×2 mesh knit zone 164 extends adjacent to 1×1 mesh knit zone 163. In comparison with 1×1 mesh knit zone 163, 2×2 mesh knit zone 164 forms larger apertures, which may further enhance the permeability of knitted component 150. For purposes of reference, FIG. 13D depicts a loop diagram of the manner in which 2×2 mesh knit zone 164 is formed with a knitting process.

Figure 13E:
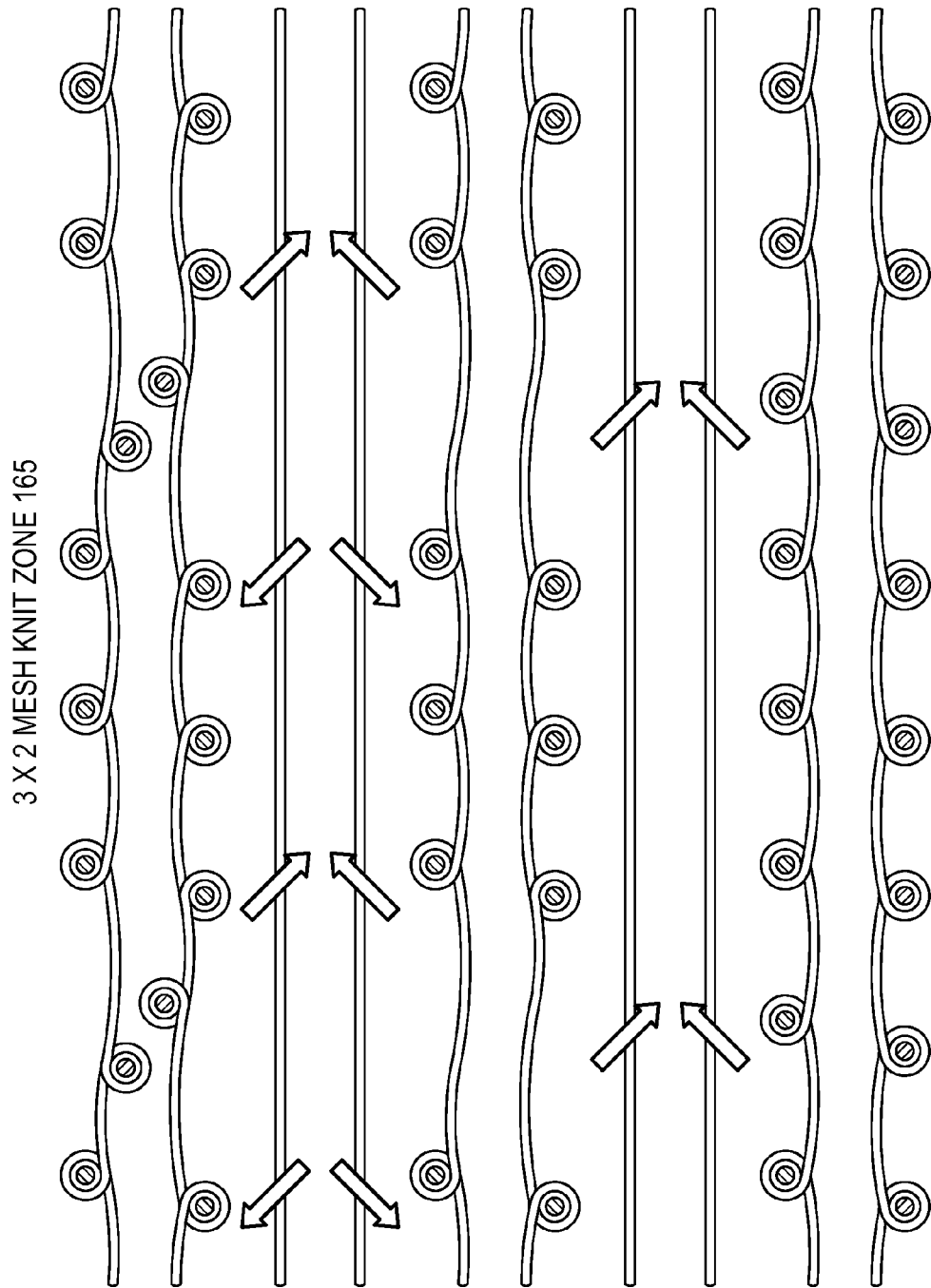

A 3×2 mesh knit zone 165 is located within 2×2 mesh knit zone 164, and another 3×2 mesh knit zone 165 is located adjacent to one of stretch zones 161. In comparison with 1×1 mesh knit zone 163 and 2×2 mesh knit zone 164, 3×2 mesh knit zone 165 forms even larger apertures, which may further enhance the permeability of knitted component 150. For purposes of reference, FIG. 13E depicts a loop diagram of the manner in which 3×2 mesh knit zone 165 is formed with a knitting process.

Figure 13F:
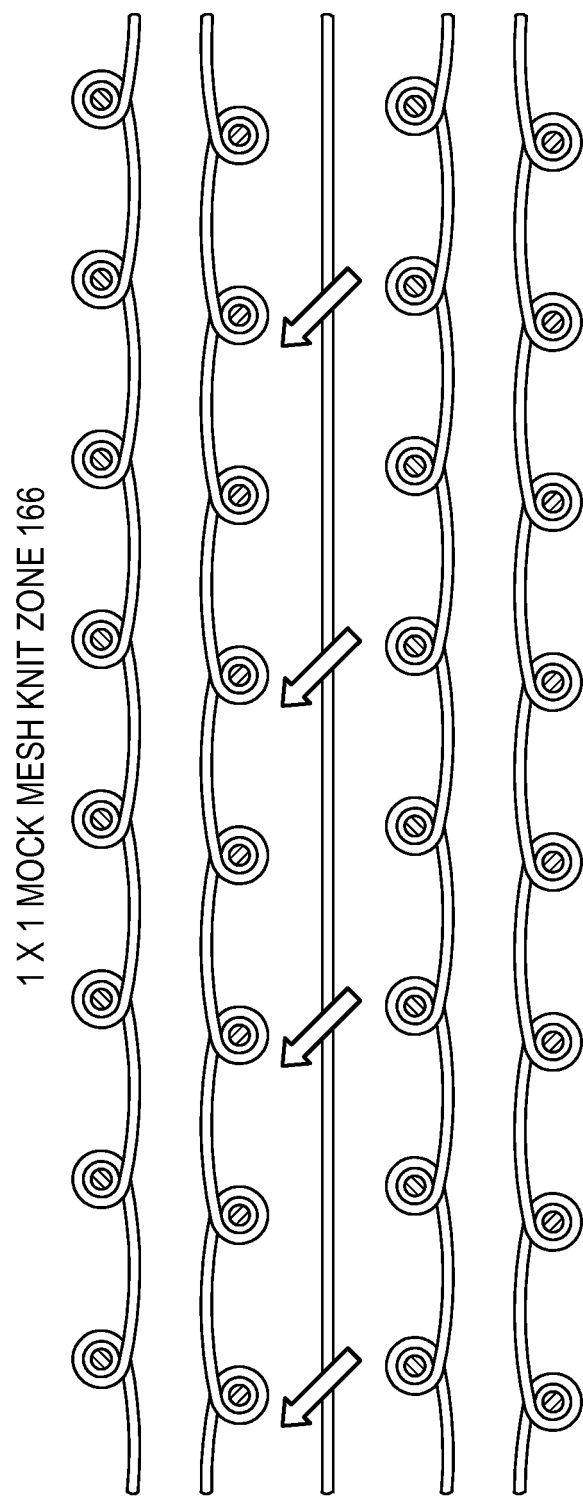

A 1×1 mock mesh knit zone 166 is located in forefoot region 101 and extends around 1×1 mesh knit zone 163. In contrast with mesh knit zones 163-165, which form apertures through knit element 151, 1×1 mock mesh knit zone 166 forms indentations in first surface 156, as depicted in FIG. 12C. In addition to enhancing the aesthetics of footwear 100, 1×1 mock mesh knit zone 166 may enhance flexibility and decrease the overall mass of knitted component 150. For purposes of reference, FIG. 13F depicts a loop diagram of the manner in which 1×1 mock mesh knit zone 166 is formed with a knitting process.

Figure 13G:
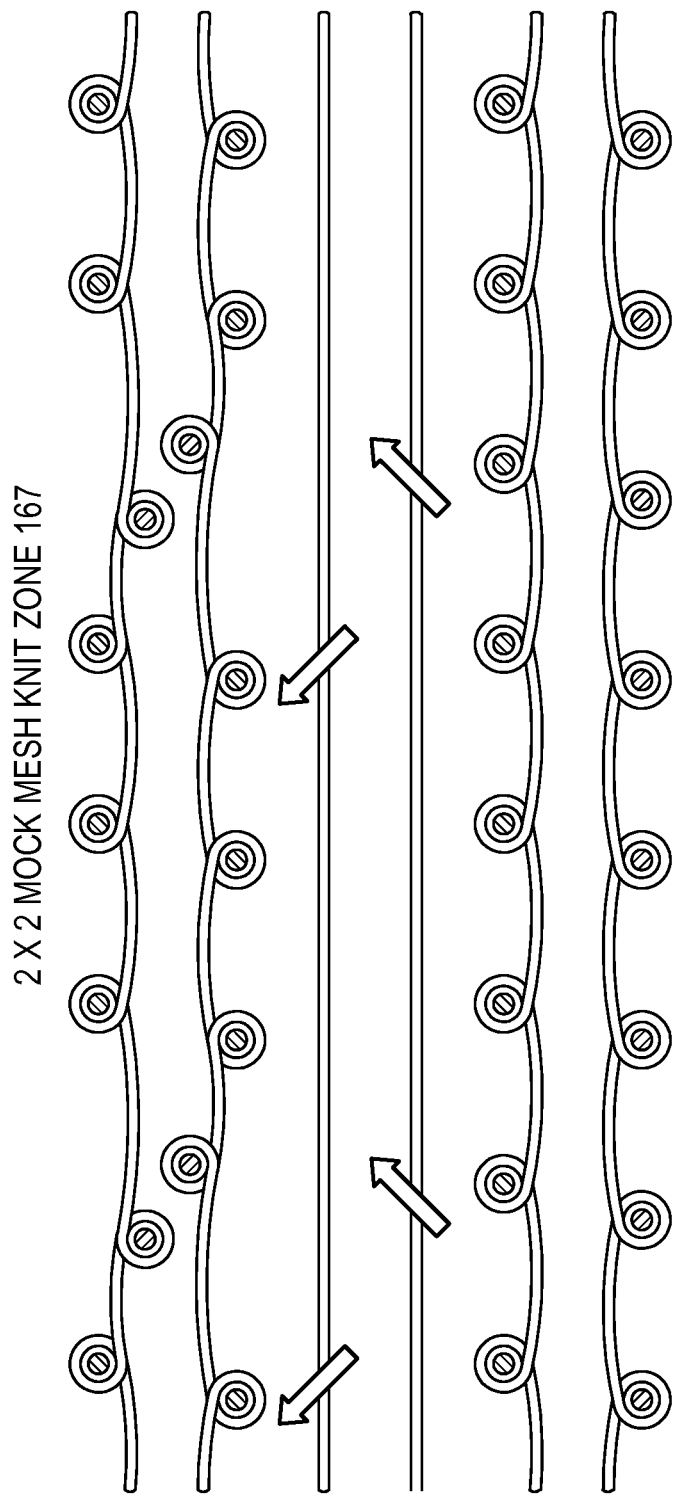

Two 2×2 mock mesh knit zones 167 are located in heel region 103 and adjacent to heel edges 154. In comparison with 1×1 mock mesh knit zone 166, 2×2 mock mesh knit zones 167 forms larger indentations in first surface 156. In areas where inlaid strands 152 extend through indentations in 2×2 mock mesh knit zones 167, as depicted in FIG. 12D, inlaid strands 152 may be visible and exposed in a lower area of the indentations. For purposes of reference, FIG. 13G depicts a loop diagram of the manner in which 2×2 mock mesh knit zones 167 are formed with a knitting process.

Figure 13H:
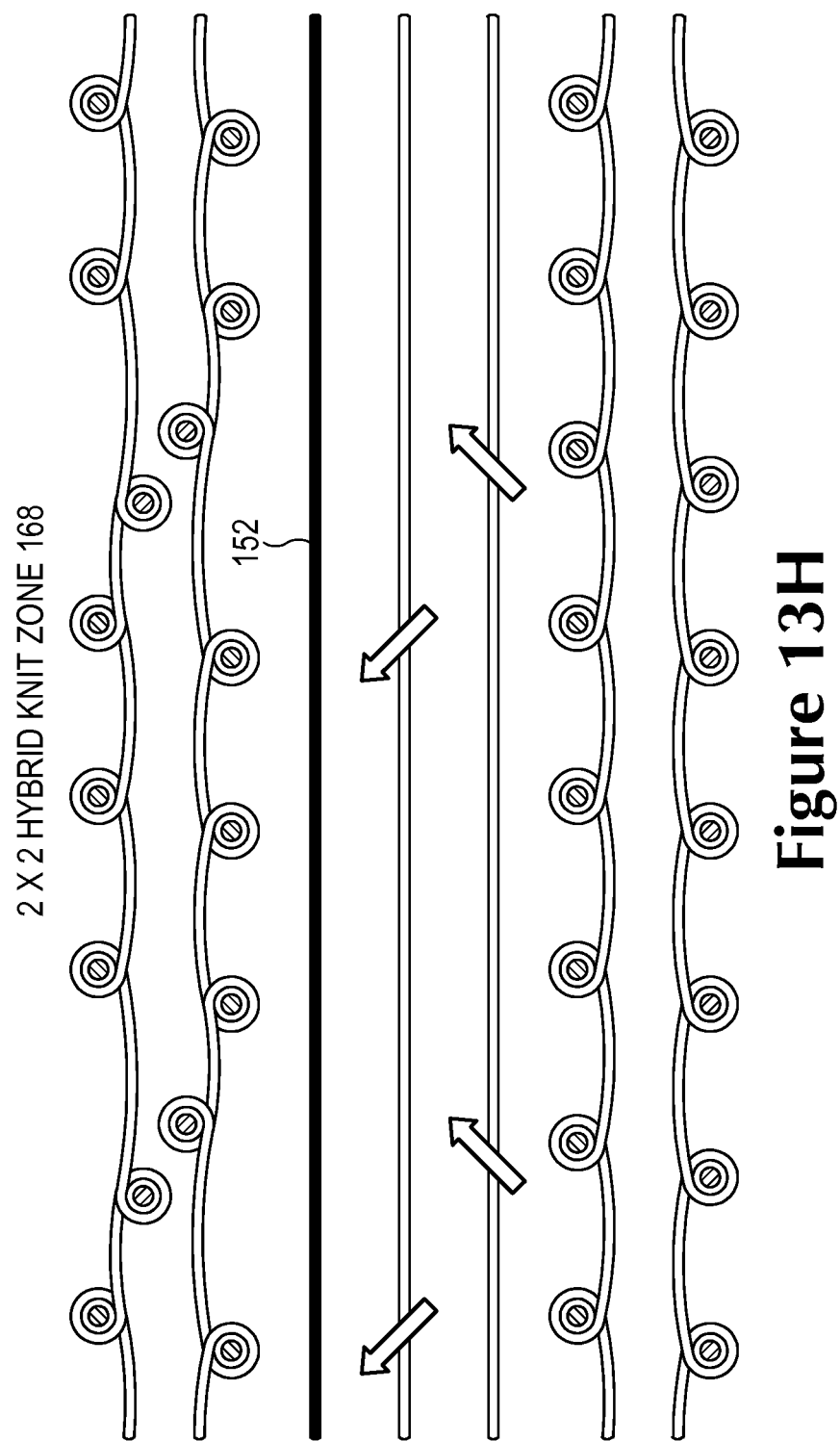

Two 2×2 hybrid knit zones 168 are located in midfoot region 102 and forward of 2×2 mock mesh knit zones 167. 2×2 hybrid knit zones 168 share characteristics of 2×2 mesh knit zone 164 and 2×2 mock mesh knit zones 167. More particularly, 2×2 hybrid knit zones 168 form apertures having the size and configuration of 2×2 mesh knit zone 164, and 2×2 hybrid knit zones 168 form indentations having the size and configuration of 2×2 mock mesh knit zones 167. In areas where inlaid strands 152 extend through indentations in 2×2 hybrid knit zones 168, as depicted in FIG. 12E, inlaid strands 152 are visible and exposed. For purposes of reference, FIG. 13H depicts a loop diagram of the manner in which 2×2 hybrid knit zones 168 are formed with a knitting process.

Knitted component 150 also includes two padded zones 169 having the general configuration of the padded area adjacent to ankle opening 121 and extending at least partially around ankle opening 121, which was discussed above for knitted component 130. As such, padded zones 169 are formed by two overlapping and at least partially coextensive knitted layers, which may be formed of unitary knit construction, and a plurality of floating yarns extending between the knitted layers.

A comparison between FIGS. 9 and 10 reveals that a majority of the texturing in knit element 151 is located on first surface 156, rather than second surface 157. That is, the indentations formed by mock mesh knit zones 166 and 167, as well as the indentations in 2×2 hybrid knit zones 168, are formed in first surface 156. This configuration has an advantage of enhancing the comfort of footwear 100. More particularly, this configuration places the relatively untextured configuration of second surface 157 against the foot. A further comparison between FIGS. 9 and 10 reveals that portions of inlaid strand 152 are exposed on first surface 156, but not on second surface 157. This configuration also has an advantage of enhancing the comfort of footwear 100. More particularly, by spacing inlaid strand 152 from the foot by a portion of knit element 151, inlaid strands 152 will not contact the foot.

Figure 14A:
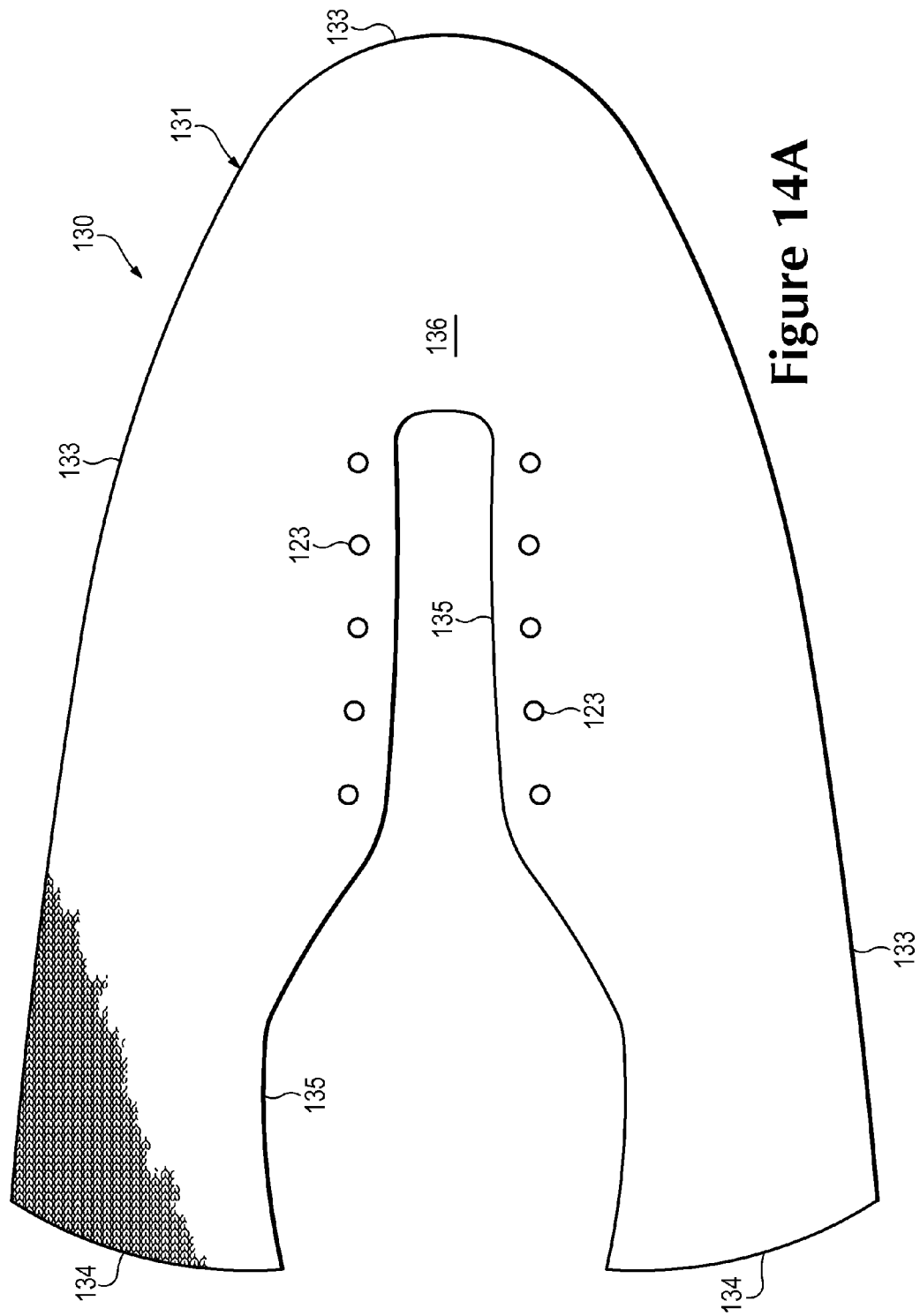
Figure 14C:
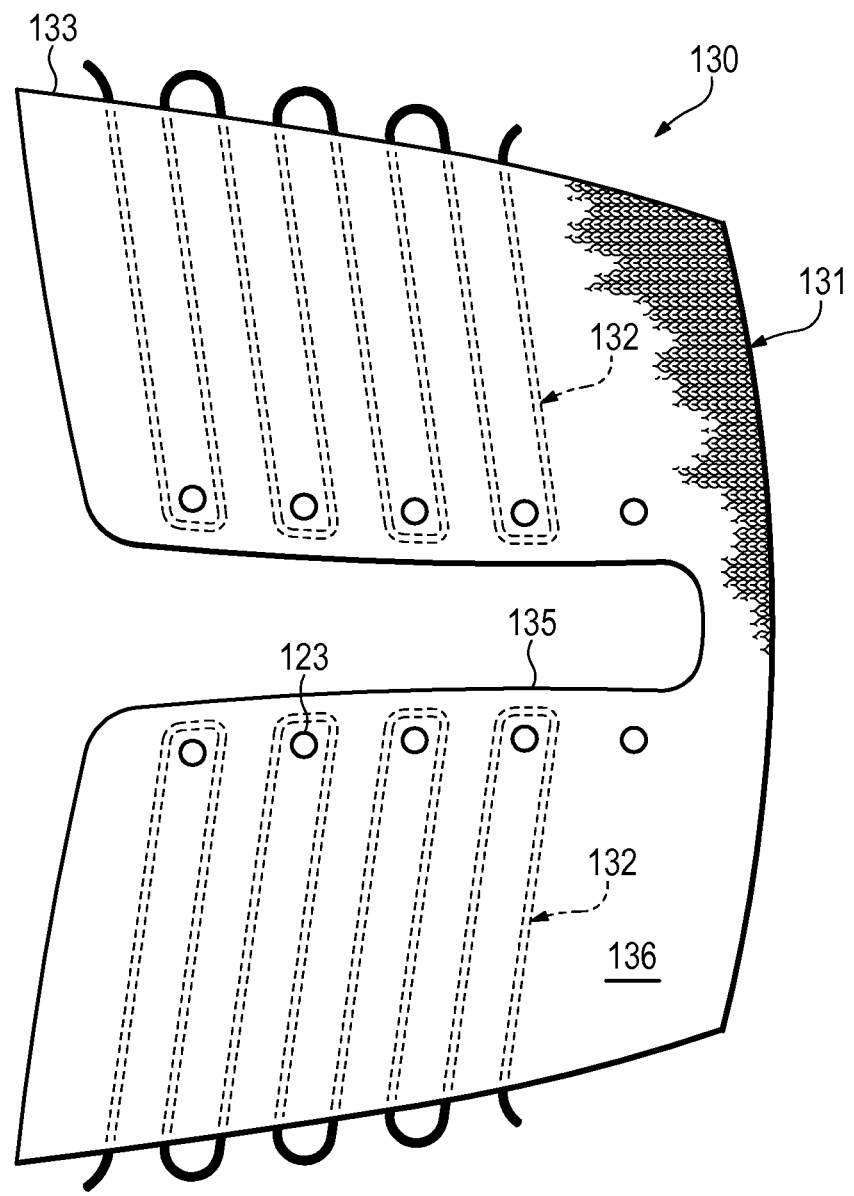

Additional configurations of knitted component 130 are depicted in FIGS. 14A-14C. Although discussed in relation to kitted component 130, concepts associated with each of these configurations may also be utilized with knitted component 150. Referring to FIG. 14A, inlaid strands 132 are absent from knitted component 130. Although inlaid strands 132 impart stretch-resistance to areas of knitted component 130, some configurations may not require the stretch-resistance from inlaid strands 132. Moreover, some configurations may benefit from greater stretch in upper 120. Referring to FIG. 14B, knit element 131 includes two flaps 142 that are formed of unitary knit construction with a remainder of knit element 131 and extend along the length of knitted component 130 at perimeter edge 133. When incorporated into footwear 100, flaps 142 may replace strobel sock 125. That is, flaps 142 may cooperatively form a portion of upper 120 that extends under sockliner 113 and is secured to the upper surface of midsole 111. Referring to FIG. 14C, knitted component 130 has a configuration that is limited to midfoot region 102. In this configuration, other material elements (e.g., textiles, polymer foam, polymer sheets, leather, synthetic leather) may be joined to knitted component 130 through stitching or bonding, for example, to form upper 120.

Based upon the above discussion, each of knit components 130 and 150 may have various configurations that impart features and advantages to upper 120. More particularly, knit elements 131 and 151 may incorporate various knit structures and yarn types that impart specific properties to different areas of upper 120, and inlaid strands 132 and 152 may extend through the knit structures to impart stretch-resistance to areas of upper 120 and operate in connection with lace 122 to enhance the fit of footwear 100.

Knitting Machine And Feeder Configurations

Figure 15:
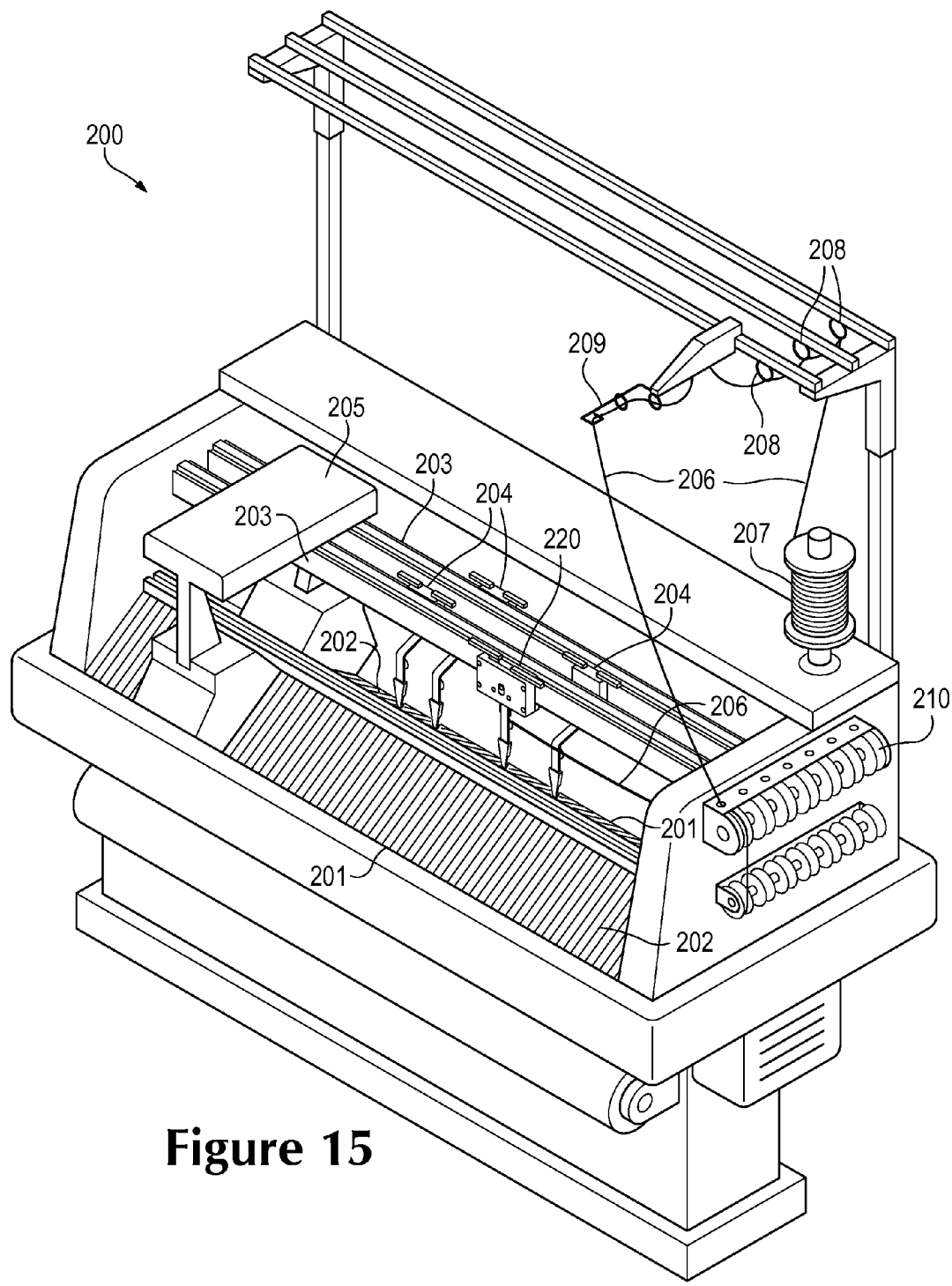
FIG. 15 is a perspective view of a knitting machine.

Although knitting may be performed by hand, the commercial manufacture of knitted components is generally performed by knitting machines. An example of a knitting machine 200 that is suitable for producing either of knitted components 130 and 150 is depicted in FIG. 15. Knitting machine 200 has a configuration of a V-bed flat knitting machine for purposes of example, but either of knitted components 130 and 150 or aspects of knitted components 130 and 150 may be produced on other types of knitting machines.

Knitting machine 200 includes two needle beds 201 that are angled with respect to each other, thereby forming a V-bed. Each of needle beds 201 include a plurality of individual needles 202 that lay on a common plane. That is, needles 202 from one needle bed 201 lay on a first plane, and needles 202 from the other needle bed 201 lay on a second plane. The first plane and the second plane (i.e., the two needle beds 201) are angled relative to each other and meet to form an intersection that extends along a majority of a width of knitting machine 200. As described in greater detail below, needles 202 each have a first position where they are retracted and a second position where they are extended. In the first position, needles 202 are spaced from the intersection where the first plane and the second plane meet. In the second position, however, needles 202 pass through the intersection where the first plane and the second plane meet.

A pair of rails 203 extend above and parallel to the intersection of needle beds 201 and provide attachment points for multiple standard feeders 204 and combination feeders 220. Each rail 203 has two sides, each of which accommodates either one standard feeder 204 or one combination feeder 220. As such, knitting machine 200 may include a total of four feeders 204 and 220. As depicted, the forward-most rail 203 includes one combination feeder 220 and one standard feeder 204 on opposite sides, and the rearward-most rail 203 includes two standard feeders 204 on opposite sides. Although two rails 203 are depicted, further configurations of knitting machine 200 may incorporate additional rails 203 to provide attachment points for more feeders 204 and 220.

Due to the action of a carriage 205, feeders 204 and 220 move along rails 203 and needle beds 201, thereby supplying yarns to needles 202. In FIG. 15, a yarn 206 is provided to combination feeder 220 by a spool 207. More particularly, yarn 206 extends from spool 207 to various yarn guides 208, a yarn take-back spring 209, and a yarn tensioner 210 before entering combination feeder 220. Although not depicted, additional spools 207 may be utilized to provide yarns to feeders 204.

Standard feeders 204 are conventionally-utilized for a V-bed flat knitting machine, such as knitting machine 200. That is, existing knitting machines incorporate standard feeders 204. Each standard feeder 204 has the ability to supply a yarn that needles 202 manipulate to knit, tuck, and float. As a comparison, combination feeder 220 has the ability to supply a yarn (e.g., yarn 206) that needles 202 knit, tuck, and float, and combination feeder 220 has the ability to inlay the yarn. Moreover, combination feeder 220 has the ability to inlay a variety of different strands (e.g., filament, thread, rope, webbing, cable, chain, or yarn). Accordingly, combination feeder 220 exhibits greater versatility than each standard feeder 204.

As noted above, combination feeder 220 may be utilized when inlaying a yarn or other strand, in addition to knitting, tucking, and floating the yarn. Conventional knitting machines, which do not incorporate combination feeder 220, may also inlay a yarn. More particularly, conventional knitting machines that are supplied with an inlay feeder may also inlay a yarn. A conventional inlay feeder for a V-bed flat knitting machine includes two components that operate in conjunction to inlay the yarn. Each of the components of the inlay feeder are secured to separate attachment points on two adjacent rails, thereby occupying two attachment points. Whereas an individual standard feeder 204 only occupies one attachment point, two attachment points are generally occupied when an inlay feeder is utilized to inlay a yarn into a knitted component. Moreover, whereas combination feeder 220 only occupies one attachment point, a conventional inlay feeder occupies two attachment points.

Given that knitting machine 200 includes two rails 203, four attachment points are available in knitting machine 200. If a conventional inlay feeder were utilized with knitting machine 200, only two attachment points would be available for standard feeders 204. When using combination feeder 220 in knitting machine 200, however, three attachment points are available for standard feeders 204. Accordingly, combination feeder 220 may be utilized when inlaying a yarn or other strand, and combination feeder 220 has an advantage of only occupying one attachment point.

Figure 16:
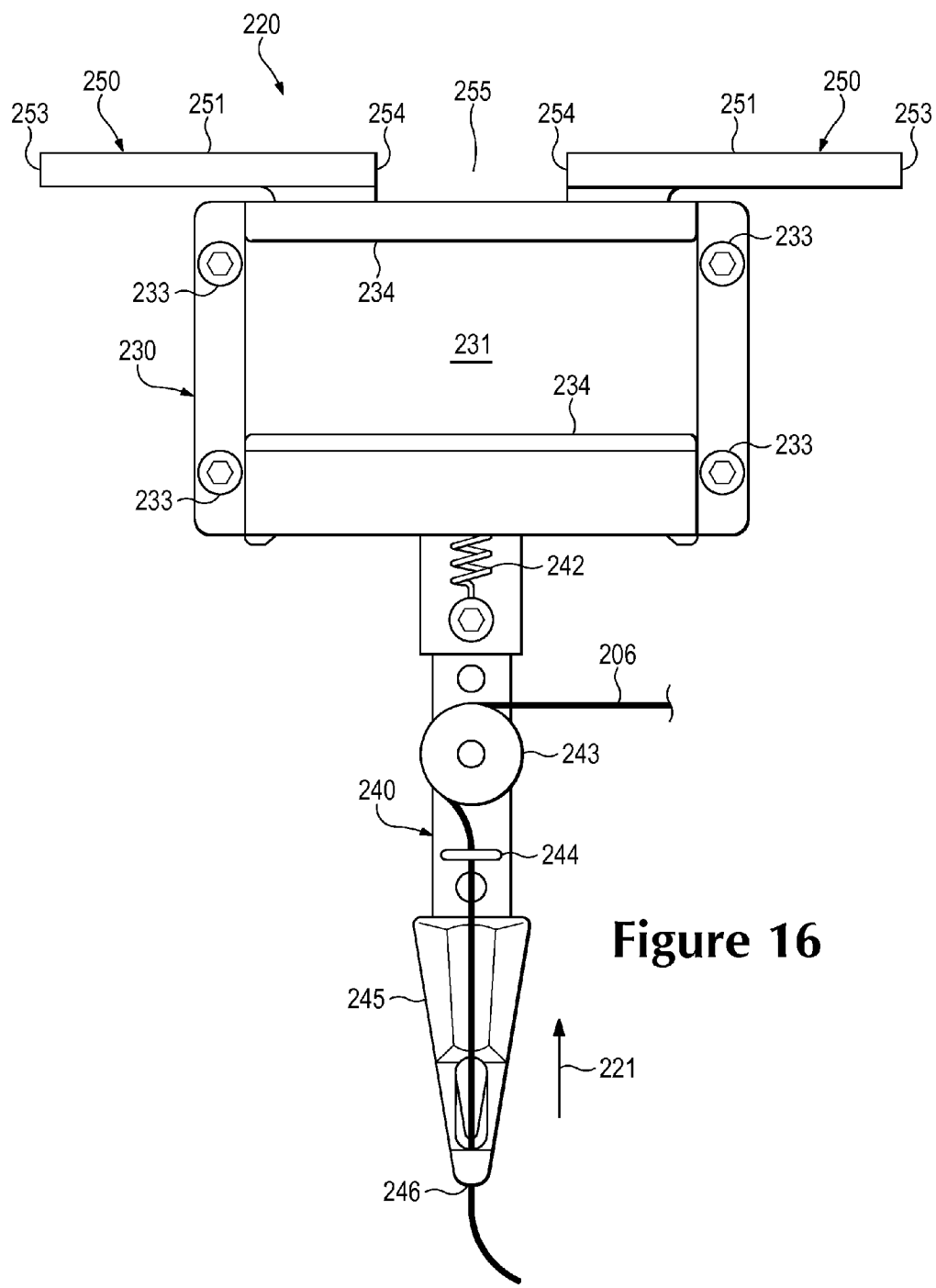
FIGS. 16-18 are elevational views of a combination feeder from the knitting machine.

Combination feeder 220 is depicted individually in FIGS. 16-19 as including a carrier 230, a feeder arm 240, and a pair of actuation members 250. Although a majority of combination feeder 220 may be formed from metal materials (e.g., steel, aluminum, titanium), portions of carrier 230, feeder arm 240, and actuation members 250 may be formed from polymer, ceramic, or composite materials, for example. As discussed above, combination feeder 220 may be utilized when inlaying a yarn or other strand, in addition to knitting, tucking, and floating a yarn. Referring to FIG. 16 specifically, a portion of yarn 206 is depicted to illustrate the manner in which a strand interfaces with combination feeder 220.

Figure 17:
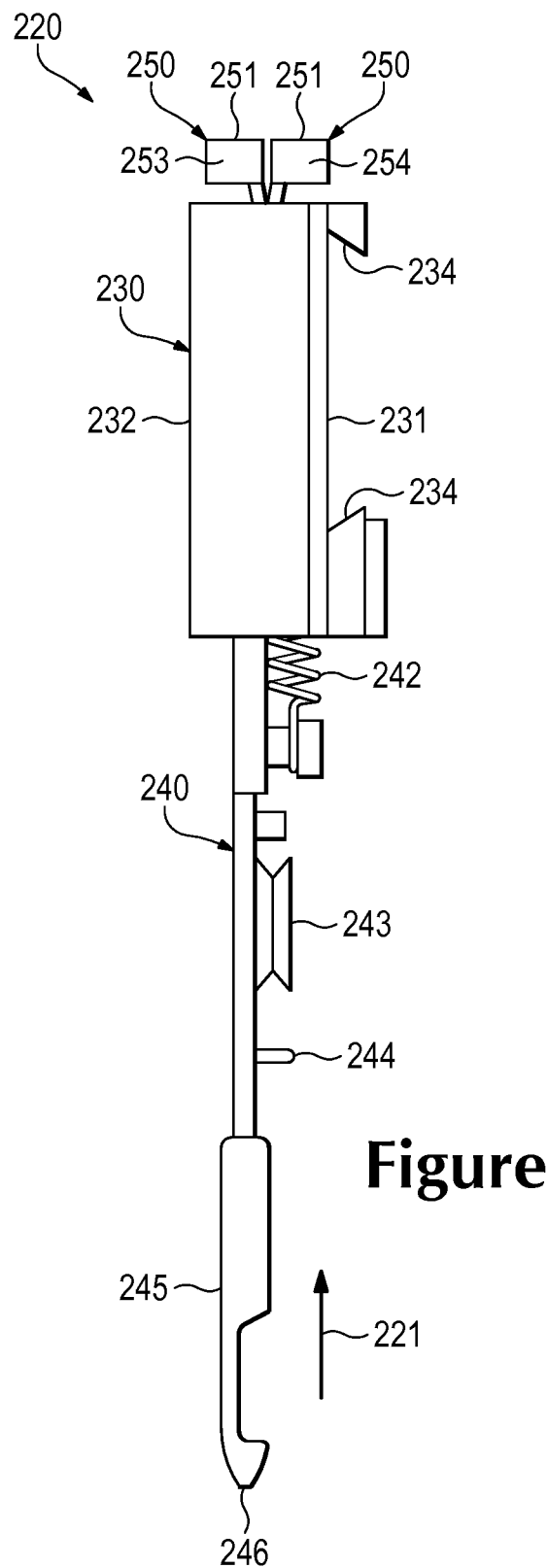
Figure 18:
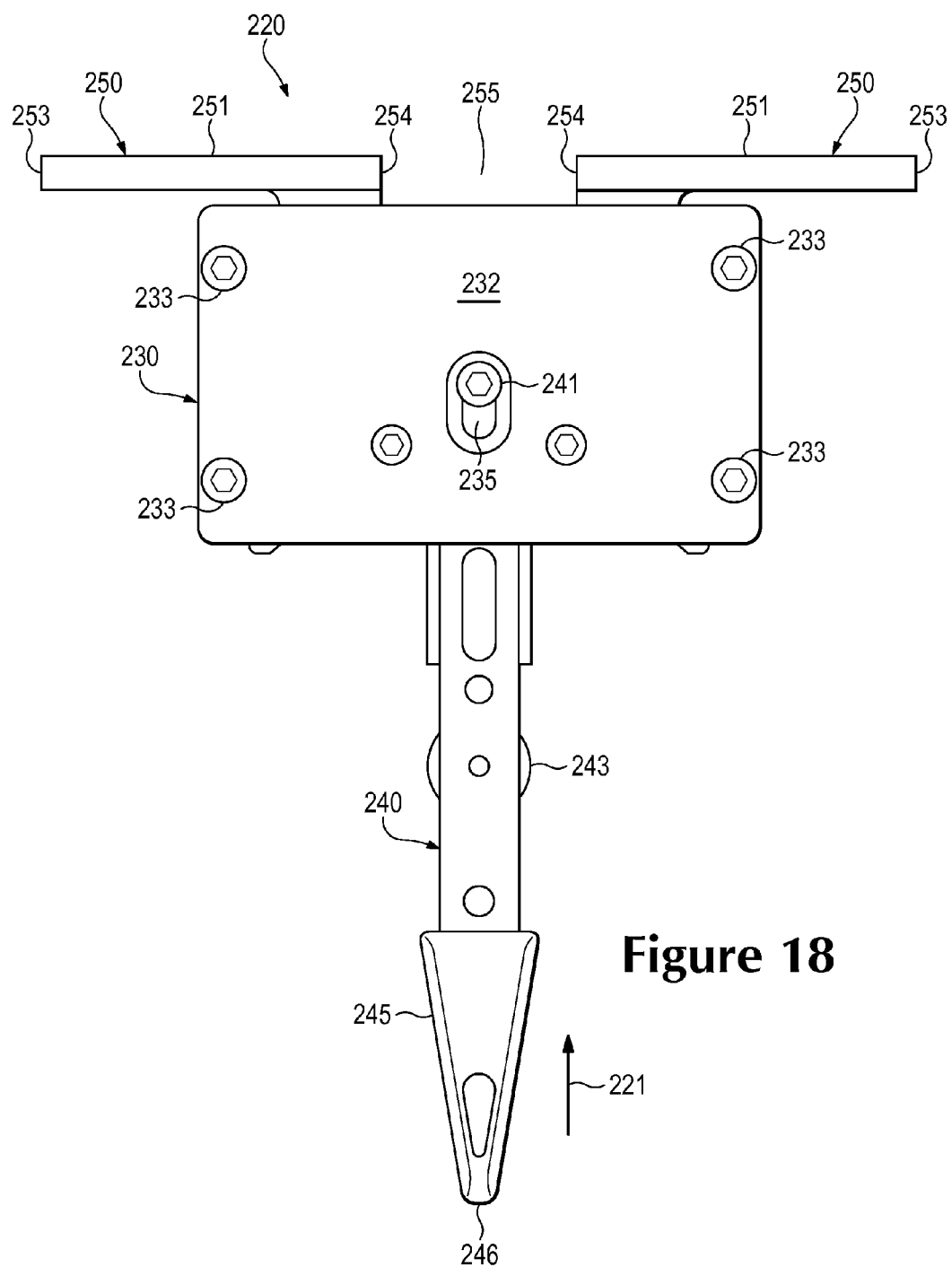

Carrier 230 has a generally rectangular configuration and includes a first cover member 231 and a second cover member 232 that are joined by four bolts 233. Cover members 231 and 232 define an interior cavity in which portions of feeder arm 240 and actuation members 250 are located. Carrier 230 also includes an attachment element 234 that extends outward from first cover member 231 for securing feeder 220 to one of rails 203. Although the configuration of attachment element 234 may vary, attachment element 234 is depicted as including two spaced protruding areas that form a dovetail shape, as depicted in FIG. 17. A reverse dovetail configuration on one of rails 203 may extend into the dovetail shape of attachment element 234 to effectively join combination feeder 220 to knitting machine 200. It should also be noted that second cover member 234 forms a centrally-located and elongate slot 235, as depicted in FIG. 18.

Feeder arm 240 has a generally elongate configuration that extends through carrier 230 (i.e., the cavity between cover members 231 and 232) and outward from a lower side of carrier 230. In addition to other elements, feeder arm 240 includes an actuation bolt 241, a spring 242, a pulley 243, a loop 244, and a dispensing area 245. Actuation bolt 241 extends outward from feeder arm 240 and is located within the cavity between cover members 231 and 232. One side of actuation bolt 241 is also located within slot 235 in second cover member 232, as depicted in FIG. 18. Spring 242 is secured to carrier 230 and feeder arm 240. More particularly, one end of spring 242 is secured to carrier 230, and an opposite end of spring 242 is secured to feeder arm 240. Pulley 243, loop 244, and dispensing area 245 are present on feeder arm 240 to interface with yarn 206 or another strand. Moreover, pulley 243, loop 244, and dispensing area 245 are configured to ensure that yarn 206 or another strand smoothly passes through combination feeder 220, thereby being reliably-supplied to needles 202. Referring again to FIG. 16, yarn 206 extends around pulley 243, through loop 244, and into dispensing area 245. In addition, yarn 206 extends out of a dispensing tip 246, which is an end region of feeder arm 240, to then supply needles 202.

Figure 19:
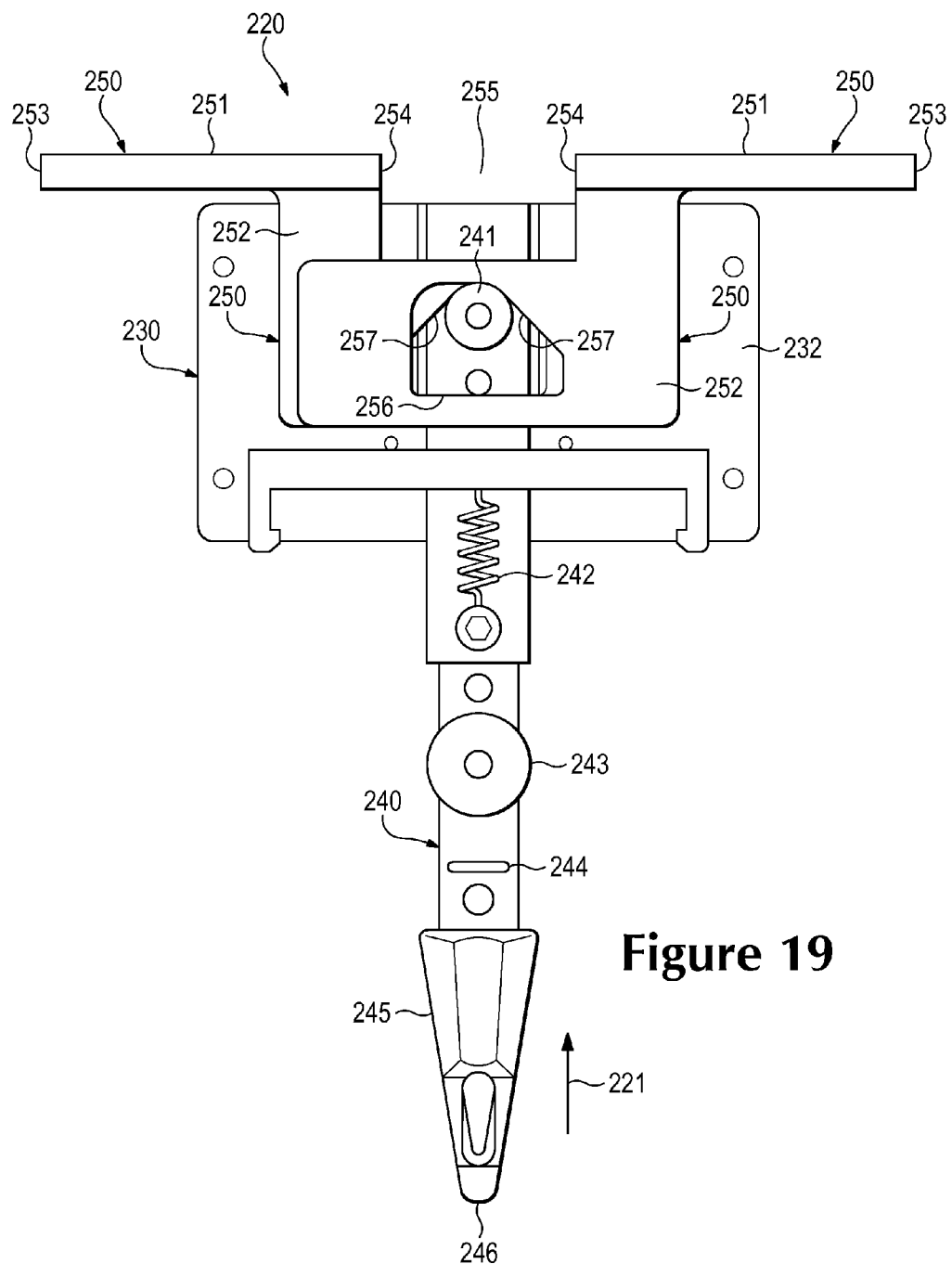
FIG. 19 is an elevational view corresponding with FIG. 16 and showing internal components of the combination feeder.

Each of actuation members 250 includes an arm 251 and a plate 252. In many configurations of actuation members 250, each arm 251 is formed as a one-piece element with one of plates 252. Whereas arms 251 are located outside of carrier 230 and at an upper side of carrier 230, plates 252 are located within carrier 250. Each of arms 251 has an elongate configuration that defines an outside end 253 and an opposite inside end 254, and arms 251 are positioned to define a space 255 between both of inside ends 254. That is, arms 251 are spaced from each other. Plates 252 have a generally planar configuration. Referring to FIG. 19, each of plates 252 define an aperture 256 with an inclined edge 257. Moreover, actuation bolt 241 of feeder arm 240 extends into each aperture 256.

The configuration of combination feeder 220 discussed above provides a structure that facilitates a translating movement of feeder arm 240. As discussed in greater detail below, the translating movement of feeder arm 240 selectively positions dispensing tip 246 at a location that is above or below the intersection of needle beds 201. That is, dispensing tip 246 has the ability to reciprocate through the intersection of needle beds 201. An advantage to the translating movement of feeder arm 240 is that combination feeder 220 (a) supplies yarn 206 for knitting, tucking, and floating when dispensing tip 246 is positioned above the intersection of needle beds 201 and (b) supplies yarn 206 or another strand for inlaying when dispensing tip 246 is positioned below the intersection of needle beds 201. Moreover, feeder arm 240 reciprocates between the two positions depending upon the manner in which combination feeder 220 is being utilized.

In reciprocating through the intersection of needle beds 201, feeder arm 240 translates from a retracted position to an extended position. When in the retracted position, dispensing tip 246 is positioned above the intersection of needle beds 201. When in the extended position, dispensing tip 246 is positioned below the intersection of needle beds 201. Dispensing tip 246 is closer to carrier 230 when feeder arm 240 is in the retracted position than when feeder arm 240 is in the extended position. Similarly, dispensing tip 246 is further from carrier 230 when feeder arm 240 is in the extended position than when feeder arm 240 is in the retracted position. In other words, dispensing tip 246 moves away from carrier 230 when in the extended position, and dispensing tip 246 moves closer to carrier 230 when in the retracted position.

For purposes of reference in FIGS. 16-20C, as well as further figures discussed later, an arrow 221 is positioned adjacent to dispensing area 245. When arrow 221 points upward or toward carrier 230, feeder arm 240 is in the retracted position. When arrow 221 points downward or away from carrier 230, feeder arm 240 is in the extended position. Accordingly, by referencing the position of arrow 221, the position of feeder arm 240 may be readily ascertained.

Figure 20A:
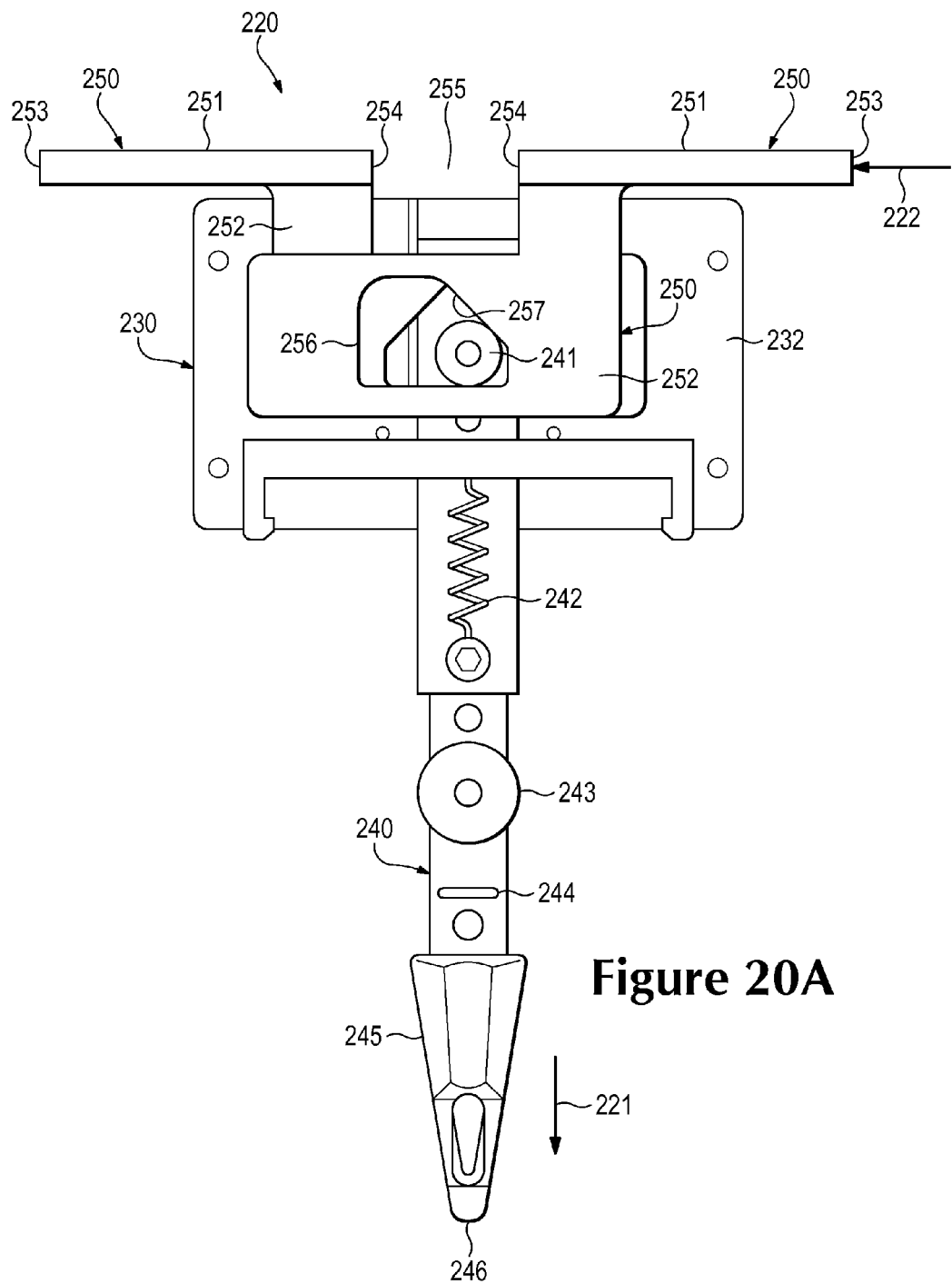
FIGS. 20A-20C are elevational views corresponding with FIG. 19 and showing the operation of the combination feeder.
Figure 20B:
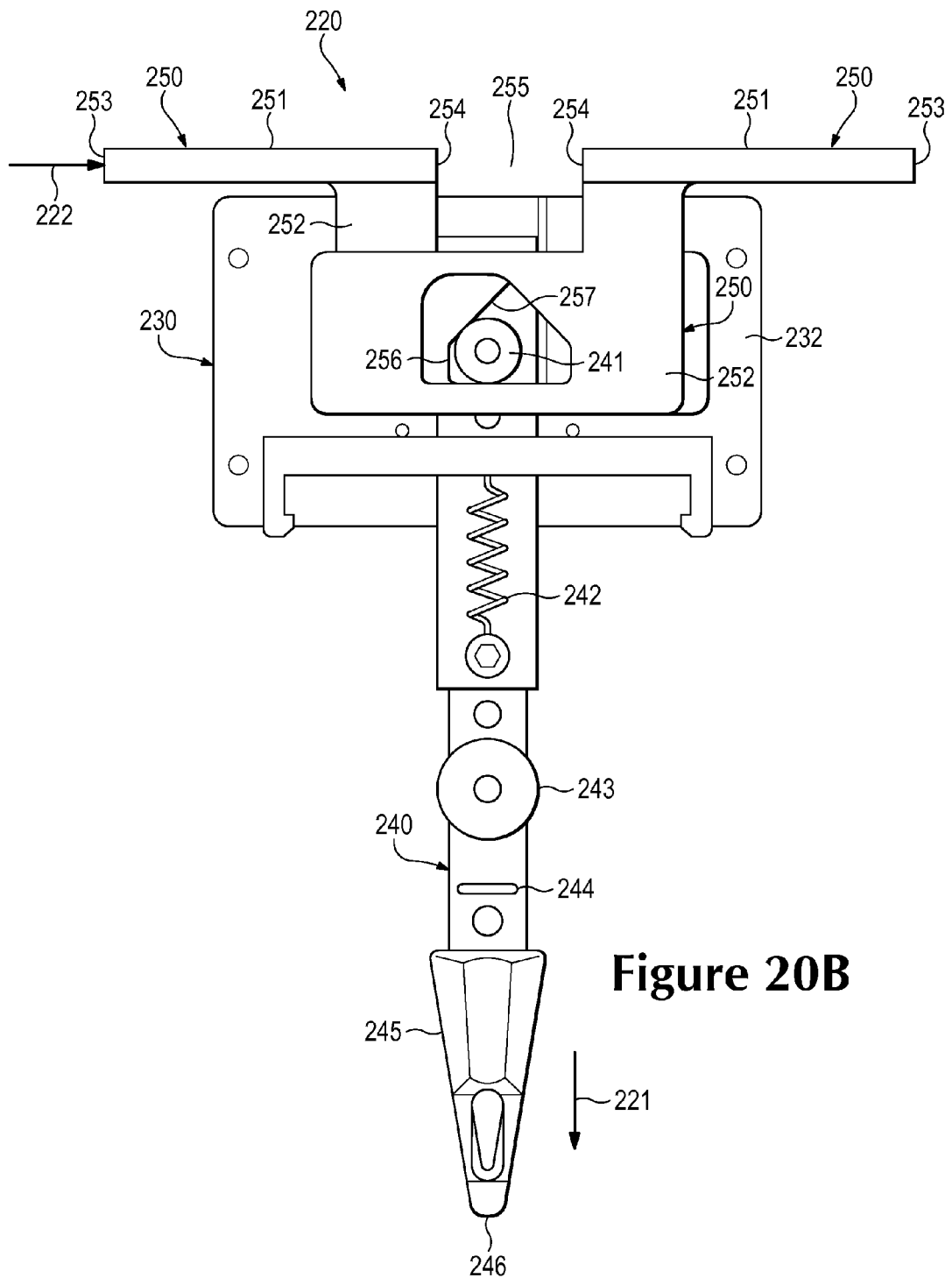
Figure 20C:
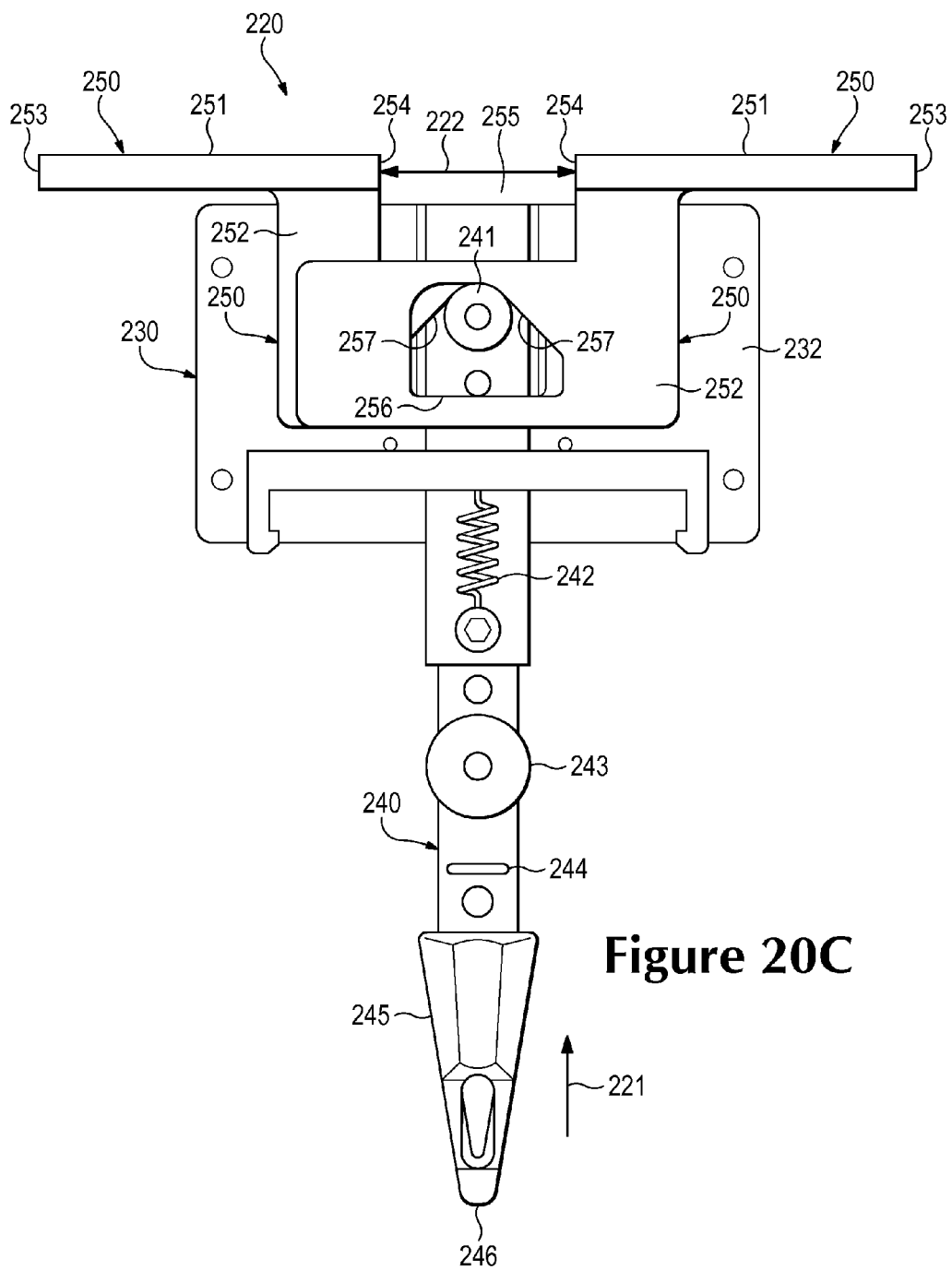

The natural state of feeder arm 240 is the retracted position. That is, when no significant forces are applied to areas of combination feeder 220, feeder arm remains in the retracted position. Referring to FIGS. 16-19, for example, no forces or other influences are shown as interacting with combination feeder 220, and feeder arm 240 is in the retracted position. The translating movement of feeder arm 240 may occur, however, when a sufficient force is applied to one of arms 251. More particularly, the translating movement of feeder arm 240 occurs when a sufficient force is applied to one of outside ends 253 and is directed toward space 255. Referring to FIGS. 20A and 20B, a force 222 is acting upon one of outside ends 253 and is directed toward space 255, and feeder arm 240 is shown as having translated to the extended position. Upon removal of force 222, however, feeder arm 240 will return to the retracted position. It should also be noted that FIG. 20C depicts force 222 as acting upon inside ends 254 and being directed outward, and feeder arm 240 remains in the retracted position.

As discussed above, feeders 204 and 220 move along rails 203 and needle beds 201 due to the action of carriage 205. More particularly, a drive bolt within carriage 205 contacts feeders 204 and 220 to push feeders 204 and 220 along needle beds 201. With respect to combination feeder 220, the drive bolt may either contact one of outside ends 253 or one of inside ends 254 to push combination feeder 220 along needle beds 201. When the drive bolt contacts one of outside ends 253, feeder arm 240 translates to the extended position and dispensing tip 246 passes below the intersection of needle beds 201. When the drive bolt contacts one of inside ends 254 and is located within space 255, feeder arm 240 remains in the retracted position and dispensing tip 246 is above the intersection of needle beds 201. Accordingly, the area where carriage 205 contacts combination feeder 220 determines whether feeder arm 240 is in the retracted position or the extended position.

The mechanical action of combination feeder 220 will now be discussed. FIGS. 19-20B depict combination feeder 220 with first cover member 231 removed, thereby exposing the elements within the cavity in carrier 230. By comparing FIG. 19 with FIGS. 20A and 20B, the manner in which force 222 induces feeder arm 240 to translate may be apparent. When force 222 acts upon one of outside ends 253, one of actuation members 250 slides in a direction that is perpendicular to the length of feeder arm 240. That is, one of actuation members 250 slides horizontally in FIGS. 19-20B. The movement of one of actuation members 250 causes actuation bolt 241 to engage one of inclined edges 257. Given that the movement of actuation members 250 is constrained to the direction that is perpendicular to the length of feeder arm 240, actuation bolt 241 rolls or slides against inclined edge 257 and induces feeder arm 240 to translate to the extended position. Upon removal of force 222, spring 242 pulls feeder arm 240 from the extended position to the retracted position.

Based upon the above discussion, combination feeder 220 reciprocates between the retracted position and the extended position depending upon whether a yarn or other strand is being utilized for knitting, tucking, or floating or being utilized for inlaying. Combination feeder 220 has a configuration wherein the application of force 222 induces feeder arm 240 to translate from the retracted position to the extended position, and removal of force 222 induces feeder arm 240 to translate from the extended position to the retracted position. That is, combination feeder 220 has a configuration wherein the application and removal of force 222 causes feeder arm 240 to reciprocate between opposite sides of needle beds 201. In general, outside ends 253 may be considered actuation areas, which induce movement in feeder arm 240. In further configurations of combination feeder 220, the actuation areas may be in other locations or may respond to other stimuli to induce movement in feeder arm 240. For example, the actuation areas may be electrical inputs coupled to servomechanisms that control movement of feeder arm 240. Accordingly, combination feeder 220 may have a variety of structures that operate in the same general manner as the configuration discussed above.

Knitting Process

The manner in which knitting machine 200 operates to manufacture a knitted component will now be discussed in detail. Moreover, the following discussion will demonstrate the operation of combination feeder 220 during a knitting process. Referring to FIG. 21A, a portion of knitting machine 200 that includes various needles 202, rail 203, standard feeder 204, and combination feeder 220 is depicted. Whereas combination feeder 220 is secured to a front side of rail 203, standard feeder 204 is secured to a rear side of rail 203. Yarn 206 passes through combination feeder 220, and an end of yarn 206 extends outward from dispensing tip 246. Although yarn 206 is depicted, any other strand (e.g., filament, thread, rope, webbing, cable, chain, or yarn) may pass through combination feeder 220. Another yarn 211 passes through standard feeder 204 and forms a portion of a knitted component 260, and loops of yarn 211 forming an uppermost course in knitted component 260 are held by hooks located on ends of needles 202.

The knitting process discussed herein relates to the formation of knitted component 260, which may be any knitted component, including knitted components that are similar to knitted components 130 and 150. For purposes of the discussion, only a relatively small section of knitted component 260 is shown in the figures in order to permit the knit structure to be illustrated. Moreover, the scale or proportions of the various elements of knitting machine 200 and knitted component 260 may be enhanced to better illustrate the knitting process.

Figure 22A:
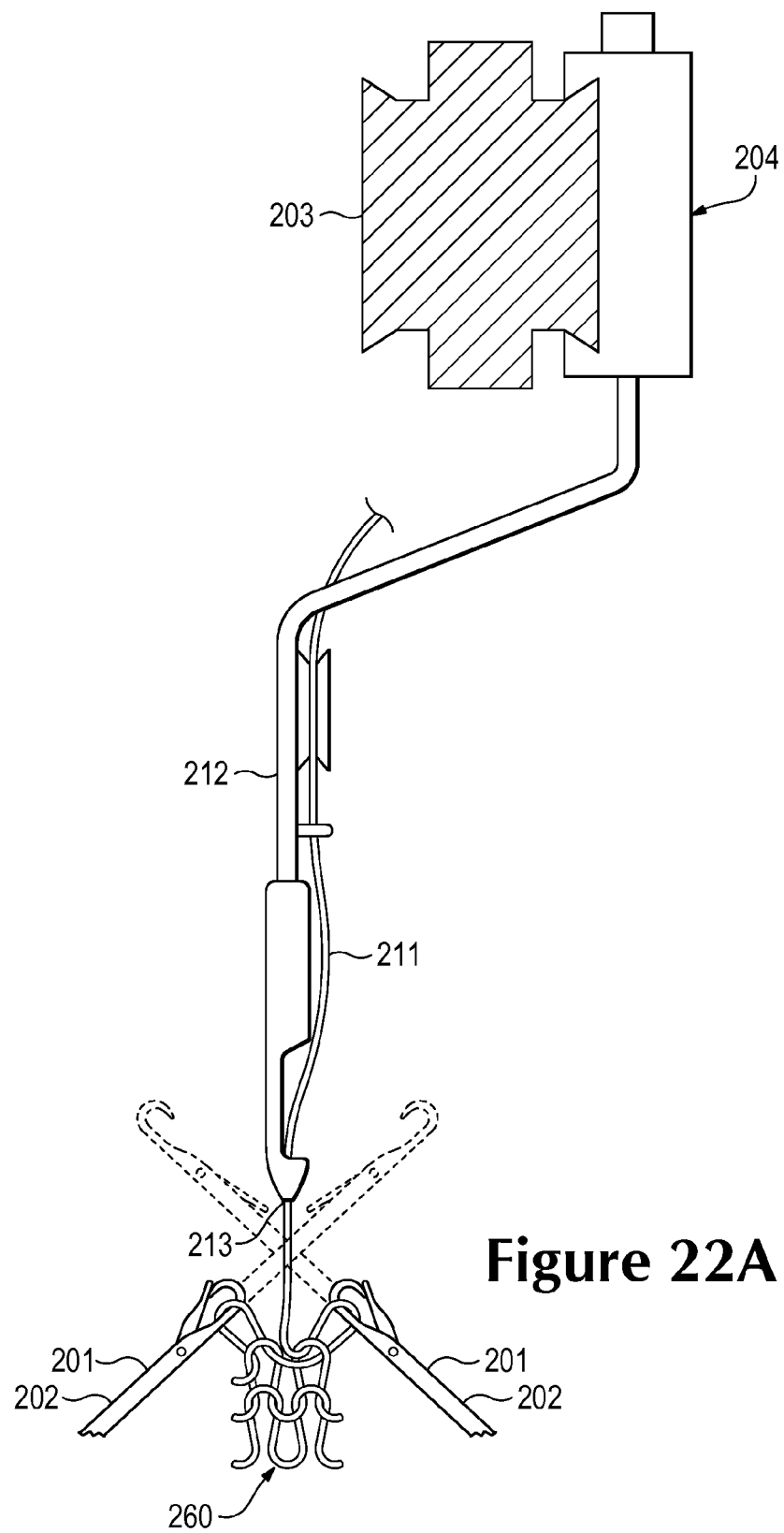
FIGS. 22A-22C are schematic cross-sectional views of the knitting process showing positions of the combination feeder and the conventional feeder.

Standard feeder 204 includes a feeder arm 212 with a dispensing tip 213. Feeder arm 212 is angled to position dispensing tip 213 in a location that is (a) centered between needles 202 and (b) above an intersection of needle beds 201. FIG. 22A depicts a schematic cross-sectional view of this configuration. Note that needles 202 lay on different planes, which are angled relative to each other. That is, needles 202 from needle beds 201 lay on the different planes. Needles 202 each have a first position and a second position. In the first position, which is shown in solid line, needles 202 are retracted. In the second position, which is shown in dashed line, needles 202 are extended. In the first position, needles 202 are spaced from the intersection where the planes upon which needle beds 201 lay meet. In the second position, however, needles 202 are extended and pass through the intersection where the planes upon which needle beds 201 meet. That is, needles 202 cross each other when extended to the second position. It should be noted that dispensing tip 213 is located above the intersection of the planes. In this position, dispensing tip 213 supplies yarn 211 to needles 202 for purposes of knitting, tucking, and floating.

Figure 22B:
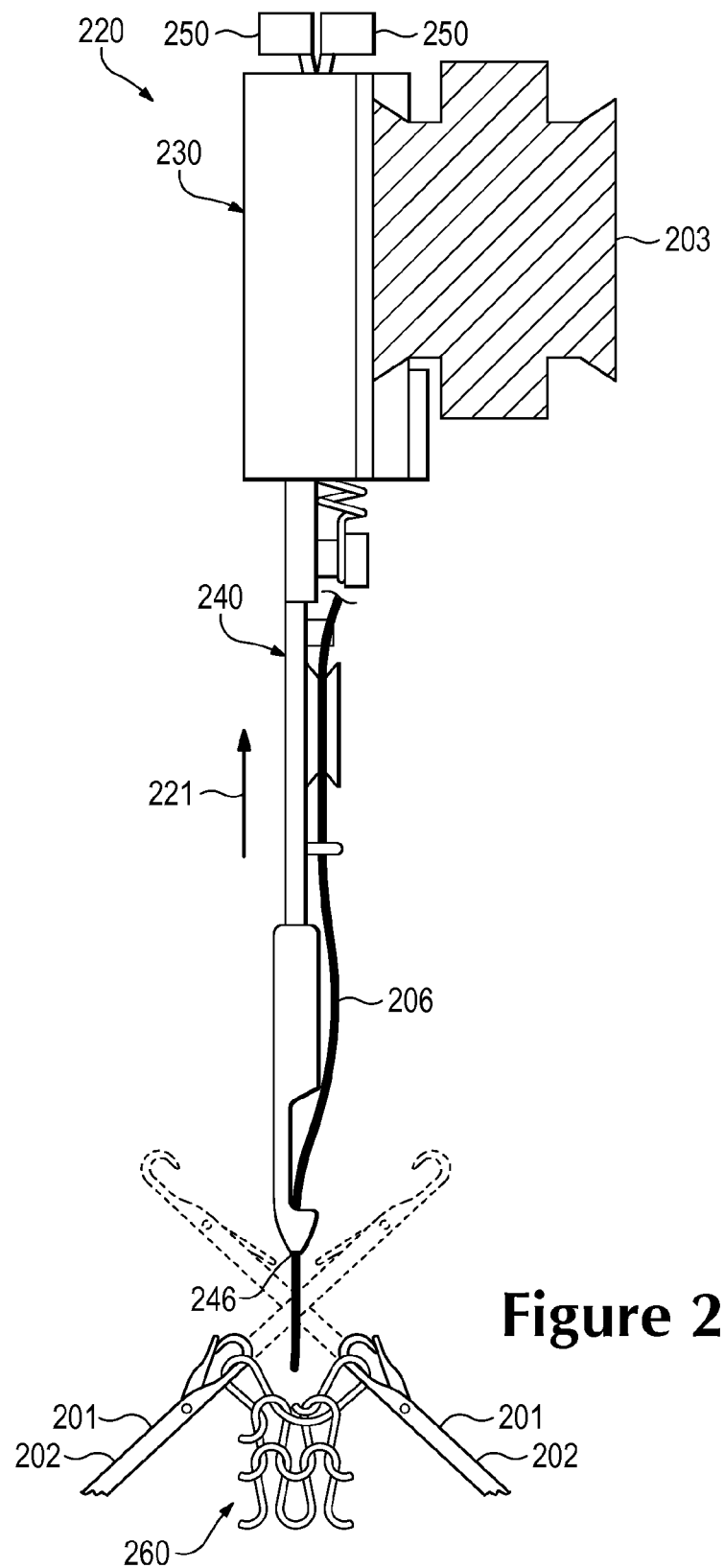

Combination feeder 220 is in the retracted position, as evidenced by the orientation of arrow 221. Feeder arm 240 extends downward from carrier 230 to position dispensing tip 246 in a location that is (a) centered between needles 202 and (b) above the intersection of needle beds 201. FIG. 22B depicts a schematic cross-sectional view of this configuration. Note that dispensing tip 246 is positioned in the same relative location as dispensing tip 213 in FIG. 22A.

Referring now to FIG. 21B, standard feeder 204 moves along rail 203 and a new course is formed in knitted component 260 from yarn 211. More particularly, needles 202 pulled sections of yarn 211 through the loops of the prior course, thereby forming the new course. Accordingly, courses may be added to knitted component 260 by moving standard feeder 204 along needles 202, thereby permitting needles 202 to manipulate yarn 211 and form additional loops from yarn 211.

Figure 21C:
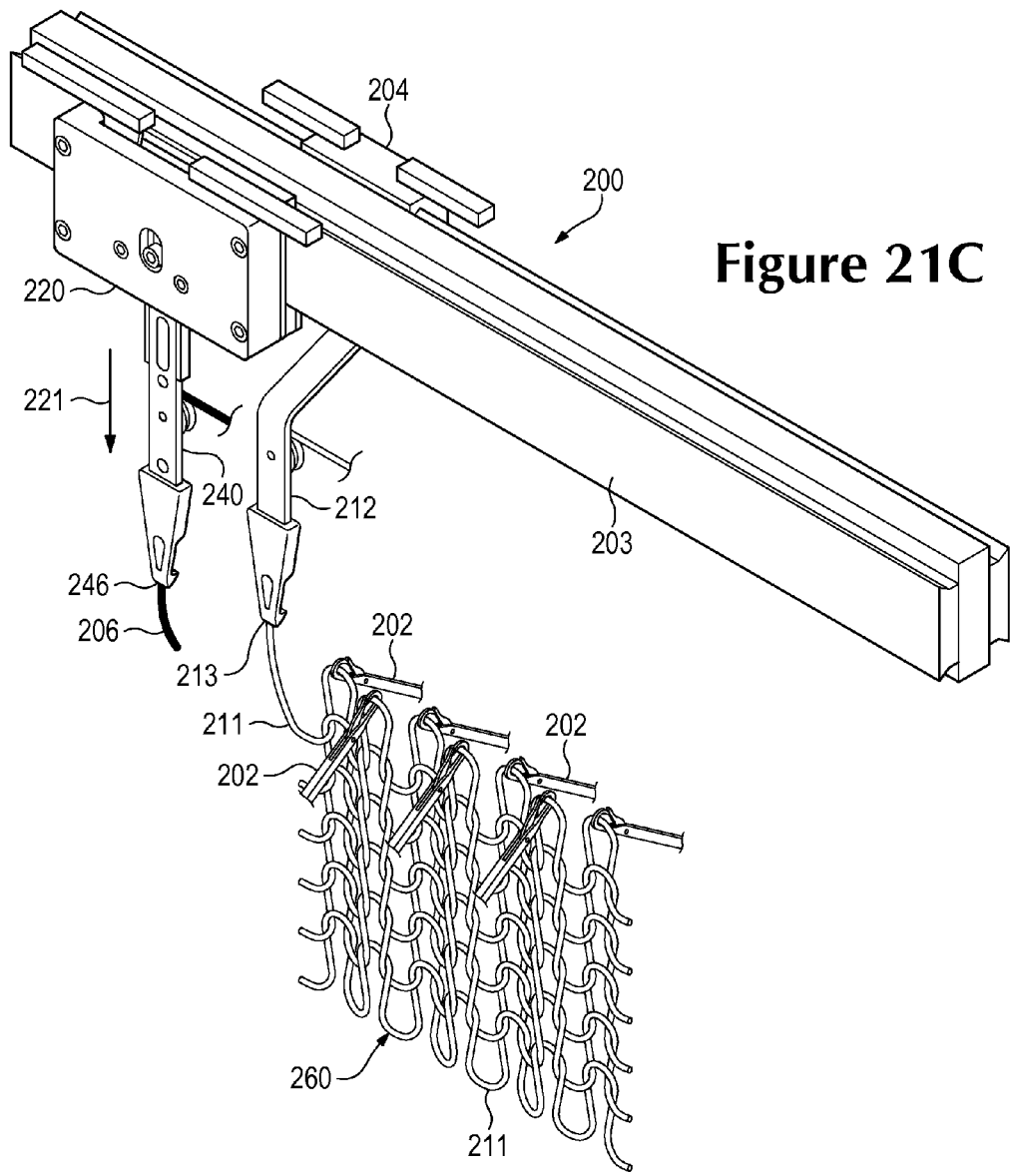
Figure 22C:
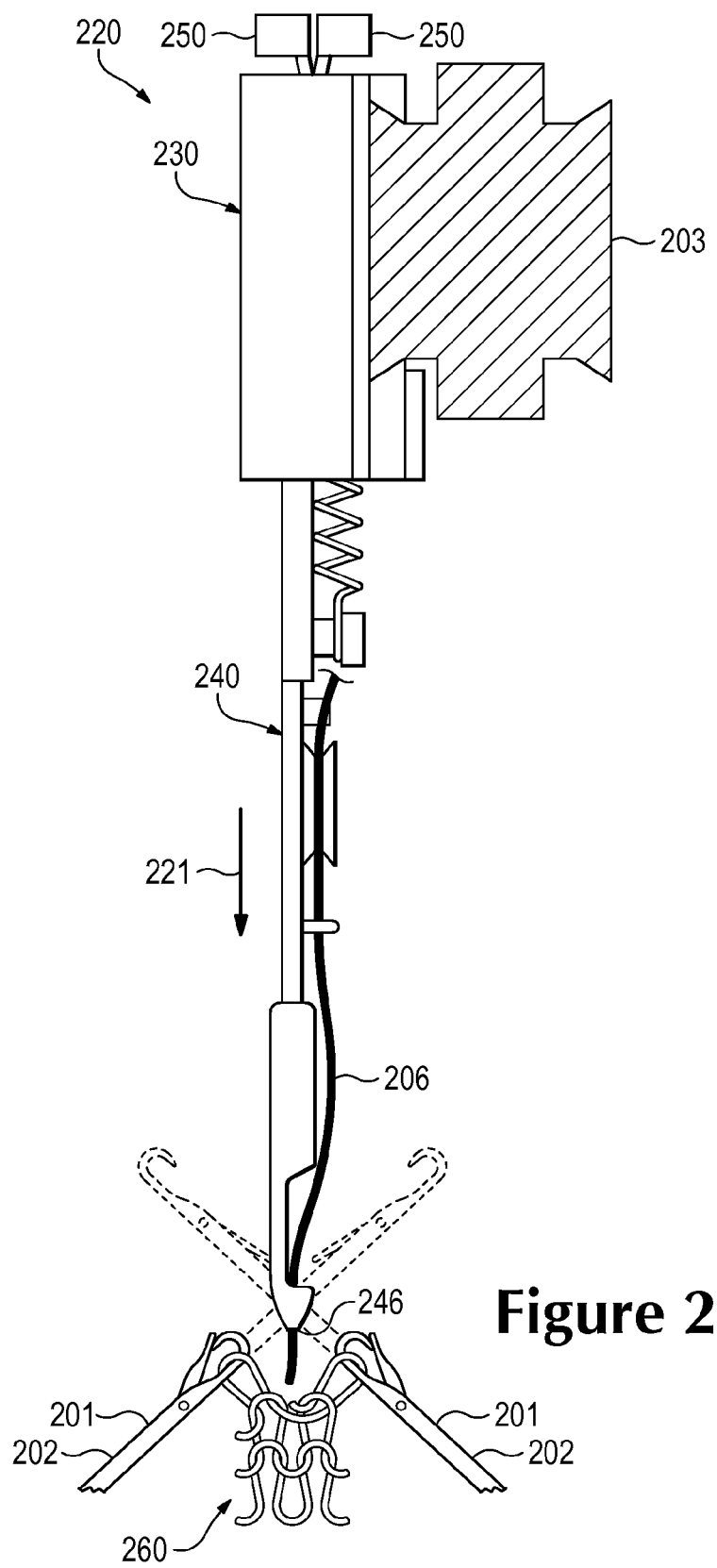

Continuing with the knitting process, feeder arm 240 now translates from the retracted position to the extended position, as depicted in FIG. 21C. In the extended position, feeder arm 240 extends downward from carrier 230 to position dispensing tip 246 in a location that is (a) centered between needles 202 and (b) below the intersection of needle beds 201. FIG. 22C depicts a schematic cross-sectional view of this configuration. Note that dispensing tip 246 is positioned below the location of dispensing tip 246 in FIG. 22B due to the translating movement of feeder arm 240.

Figure 21D:
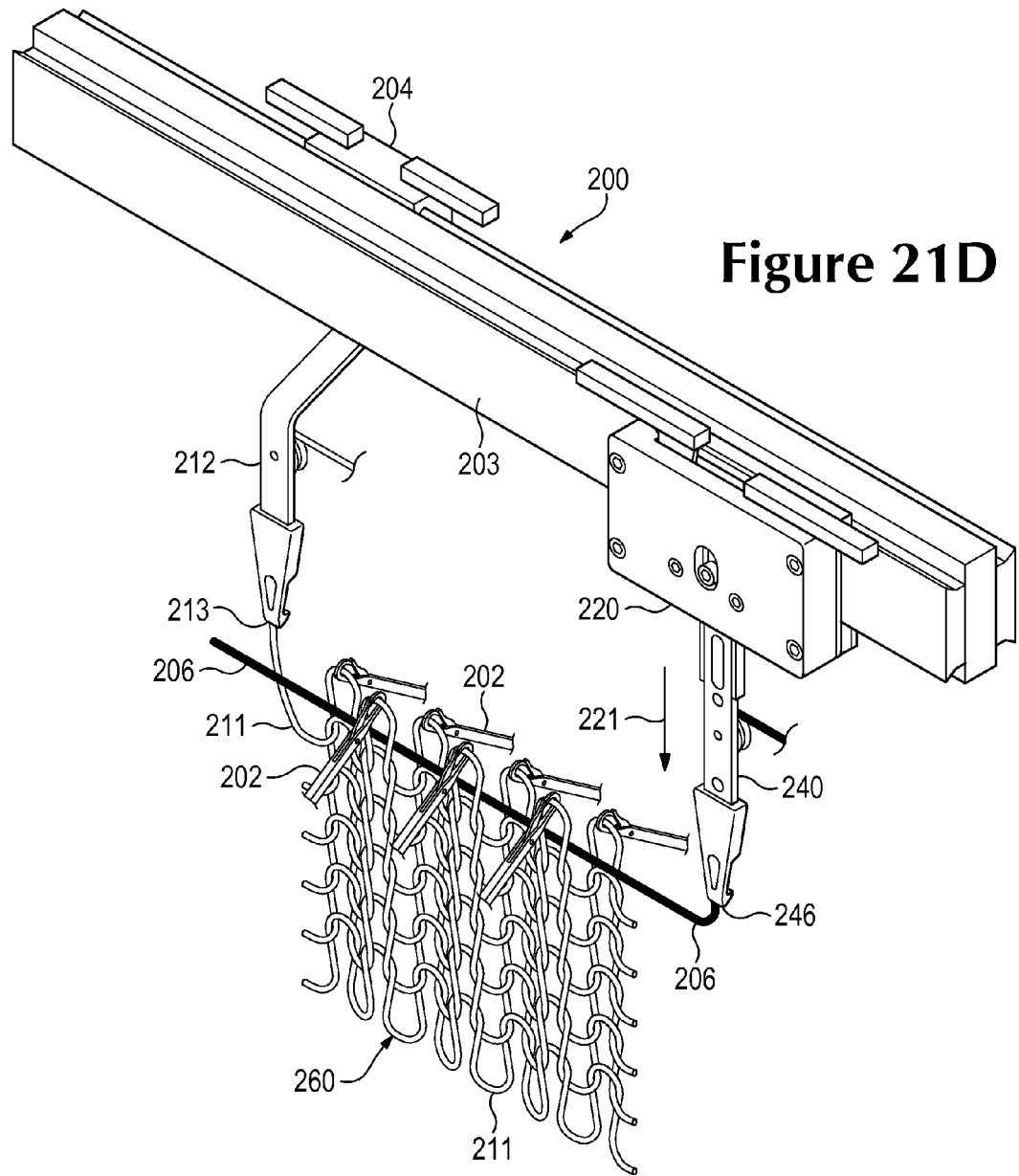

Referring now to FIG. 21D, combination feeder 220 moves along rail 203 and yarn 206 is placed between loops of knitted component 260. That is, yarn 206 is located in front of some loops and behind other loops in an alternating pattern. Moreover, yarn 206 is placed in front of loops being held by needles 202 from one needle bed 201, and yarn 206 is placed behind loops being held by needles 202 from the other needle bed 201. Note that feeder arm 240 remains in the extended position in order to lay yarn 206 in the area below the intersection of needle beds 201. This effectively places yarn 206 within the course recently formed by standard feeder 204 in FIG. 21B. In order to complete inlaying yarn 206 into knitted component 260, standard feeder 204 moves along rail 203 to form a new course from yarn 211, as depicted in FIG. 21E. By forming the new course, yarn 206 is effectively knit within or otherwise integrated into the structure of knitted component 260. At this stage, feeder arm 240 may also translate from the extended position to the retracted position.

FIGS. 21D and 21E show separate movements of feeders 204 and 220 along rail 203. That is, FIG. 21D shows a first movement of combination feeder 220 along rail 203, and FIG. 21E shows a second and subsequent movement of standard feeder 204 along rail 203. In many knitting processes, feeders 204 and 220 may effectively move simultaneously to inlay yarn 206 and form a new course from yarn 211. Combination feeder 220, however, moves ahead or in front of standard feeder 204 in order to position yarn 206 prior to the formation of the new course from yarn 211.

The general knitting process outlined in the above discussion provides an example of the manner in which inlaid strands 132 and 152 may be located in knit elements 131 and 151. More particularly, knitted components 130 and 150 may be formed by utilizing combination feeder 220 to effectively insert inlaid strands 132 and 152 into knit elements 131. Given the reciprocating action of feeder arm 240, inlaid strands may be located within a previously formed course prior to the formation of a new course.

Figure 21G:
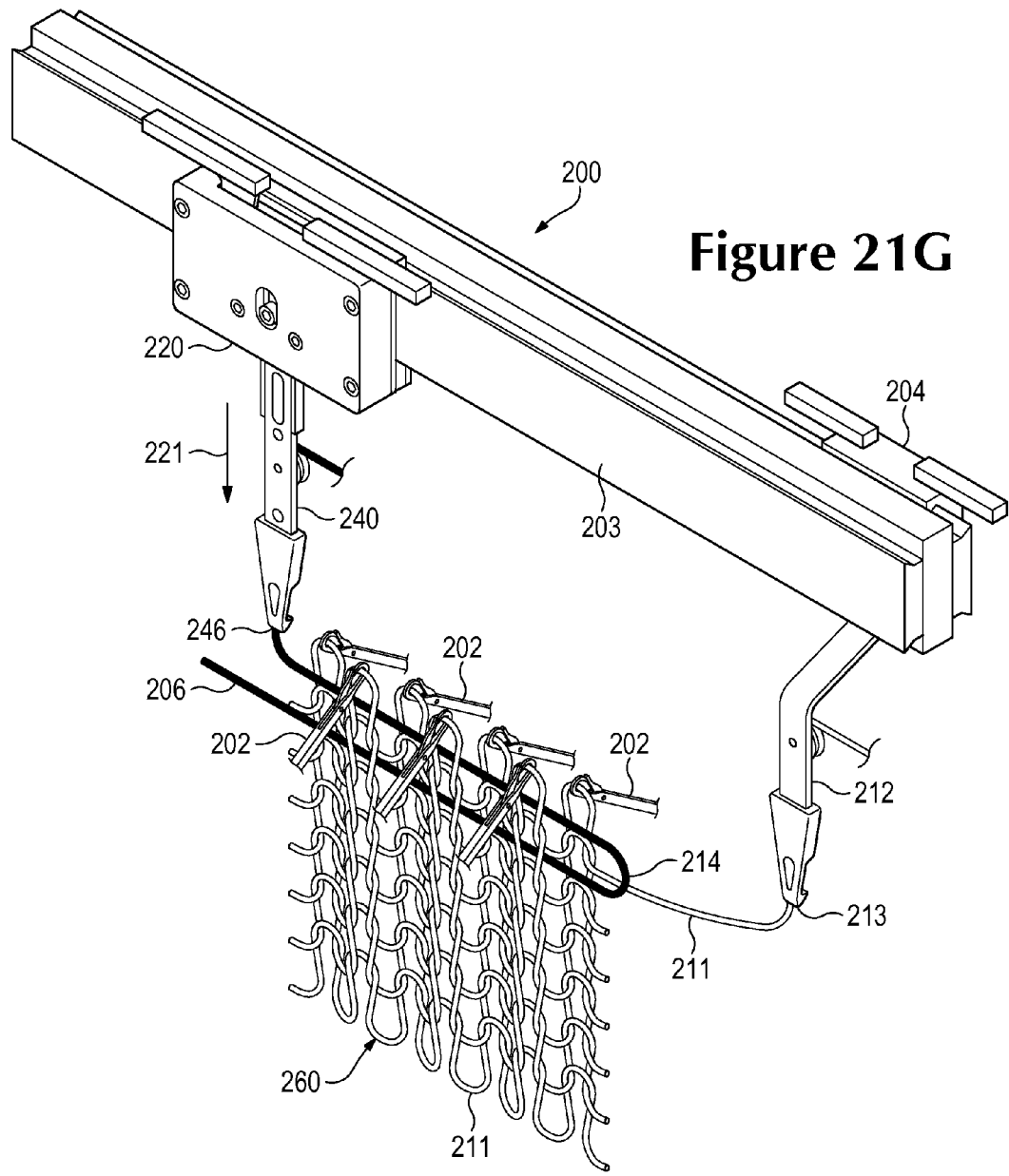
Figure 21H:
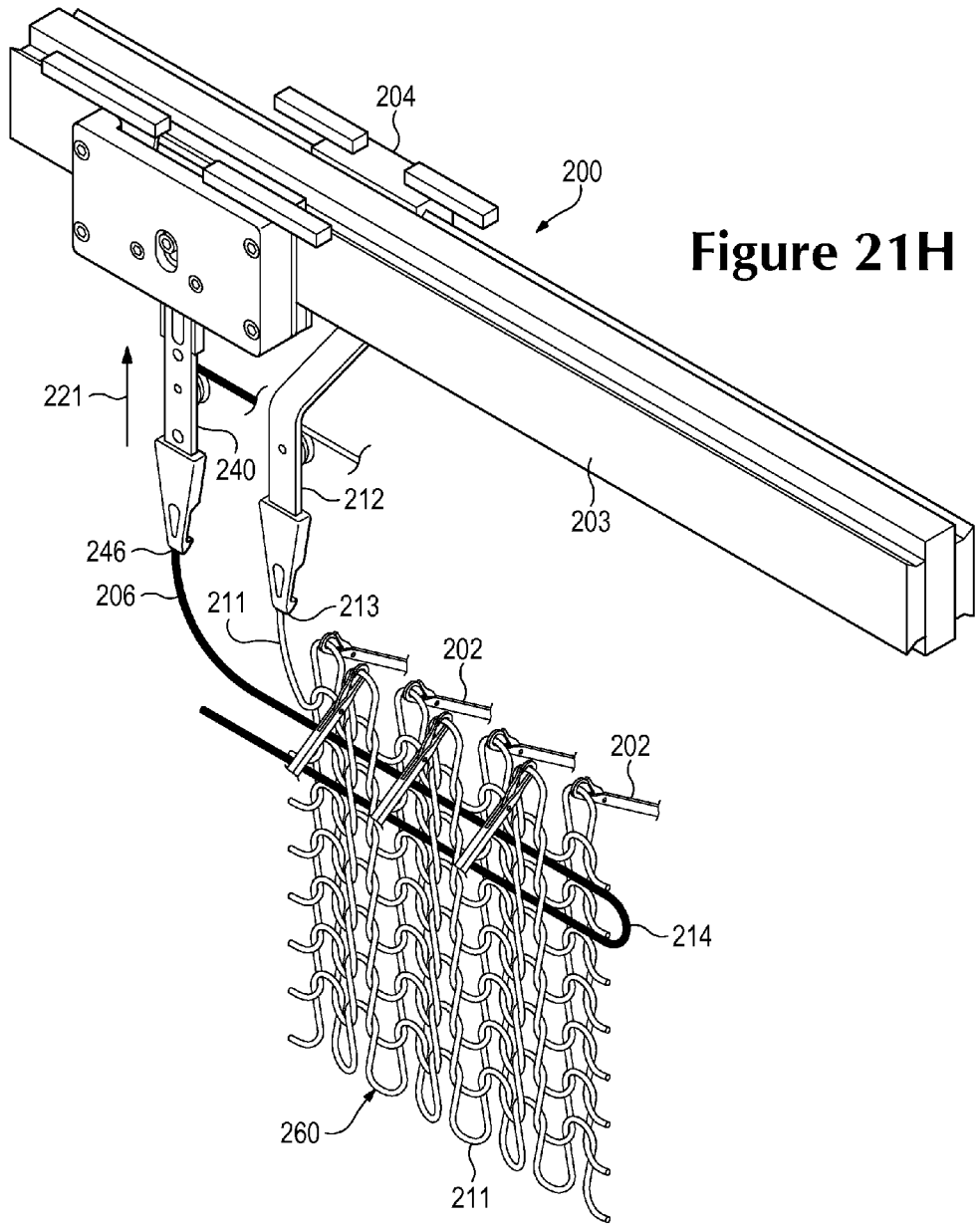

Continuing with the knitting process, feeder arm 240 now translates from the retracted position to the extended position, as depicted in FIG. 21F. Combination feeder 220 then moves along rail 203 and yarn 206 is placed between loops of knitted component 260, as depicted in FIG. 21G. This effectively places yarn 206 within the course formed by standard feeder 204 in FIG. 21E. In order to complete inlaying yarn 206 into knitted component 260, standard feeder 204 moves along rail 203 to form a new course from yarn 211, as depicted in FIG. 21H. By forming the new course, yarn 206 is effectively knit within or otherwise integrated into the structure of knitted component 260. At this stage, feeder arm 240 may also translate from the extended position to the retracted position.

Referring to FIG. 21H, yarn 206 forms a loop 214 between the two inlaid sections. In the discussion of knitted component 130 above, it was noted that inlaid strand 132 repeatedly exits knit element 131 at perimeter edge 133 and then re-enters knit element 131 at another location of perimeter edge 133, thereby forming loops along perimeter edge 133, as seen in FIGS. 5 and 6. Loop 214 is formed in a similar manner. That is, loop 214 is formed where yarn 206 exits the knit structure of knitted component 260 and then re-enters the knit structure.

Figure 21I:
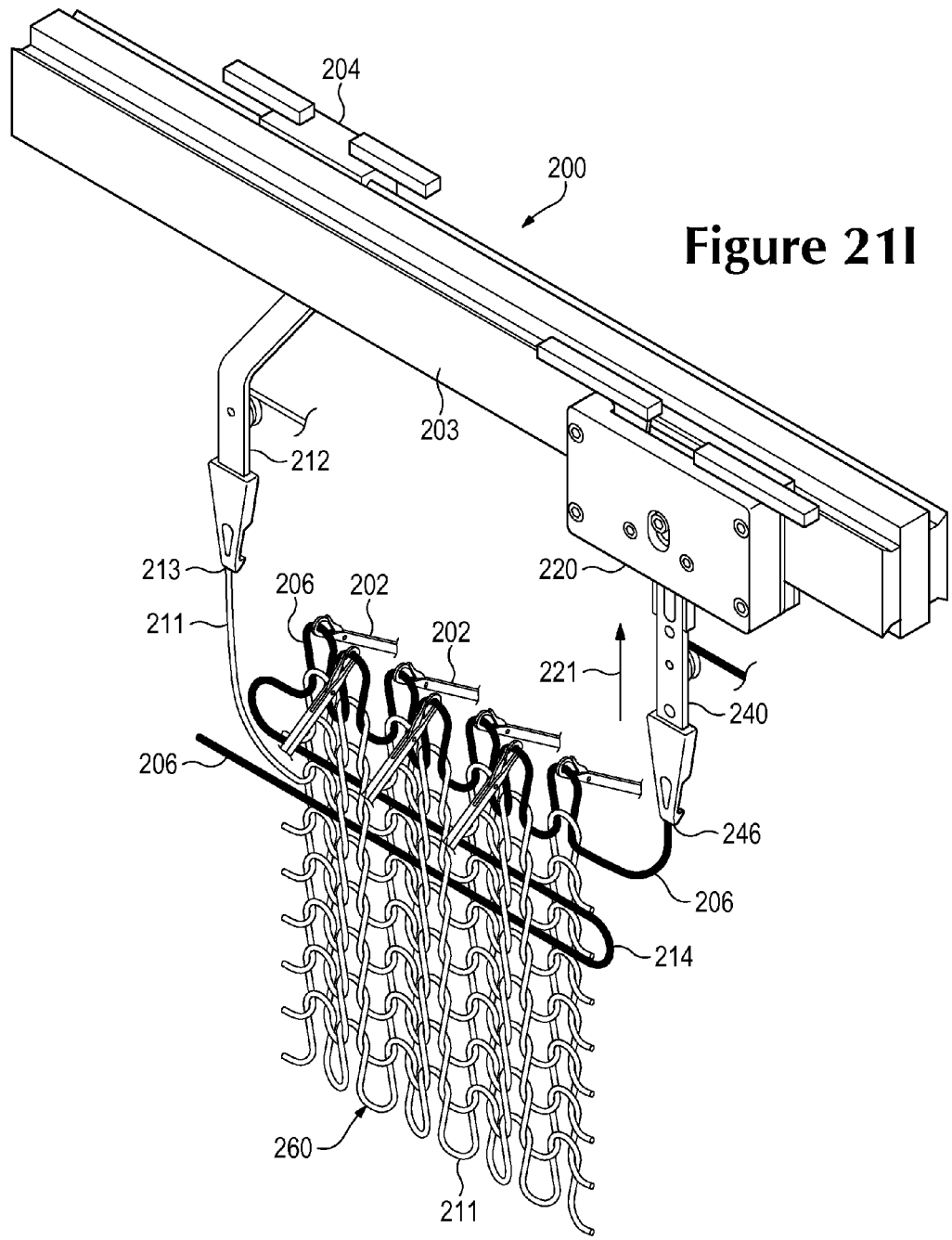

As discussed above, standard feeder 204 has the ability to supply a yarn (e.g., yarn 211) that needles 202 manipulate to knit, tuck, and float. Combination feeder 220, however, has the ability to supply a yarn (e.g., yarn 206) that needles 202 knit, tuck, or float, as well as inlaying the yarn. The above discussion of the knitting process describes the manner in which combination feeder 220 inlays a yarn while in the extended position. Combination feeder 220 may also supply the yarn for knitting, tucking, and floating while in the retracted position. Referring to FIG. 21I, for example, combination feeder 220 moves along rail 203 while in the retracted position and forms a course of knitted component 260 while in the retracted position. Accordingly, by reciprocating feeder arm 240 between the retracted position and the extended position, combination feeder 220 may supply yarn 206 for purposes of knitting, tucking, floating, and inlaying. An advantage to combination feeder 220 relates, therefore, to its versatility in supplying a yarn that may be utilized for a greater number of functions than standard feeder 204

The ability of combination feeder 220 to supply yarn for knitting, tucking, floating, and inlaying is based upon the reciprocating action of feeder arm 240. Referring to FIGS. 22A and 22B, dispensing tips 213 and 246 are at identical positions relative to needles 220. As such, both feeders 204 and 220 may supply a yarn for knitting, tucking, and floating. Referring to FIG. 22C, dispensing tip 246 is at a different position. As such, combination feeder 220 may supply a yarn or other strand for inlaying. An advantage to combination feeder 220 relates, therefore, to its versatility in supplying a yarn that may be utilized for knitting, tucking, floating, and inlaying.

Further Knitting Process Considerations

Figure 23:
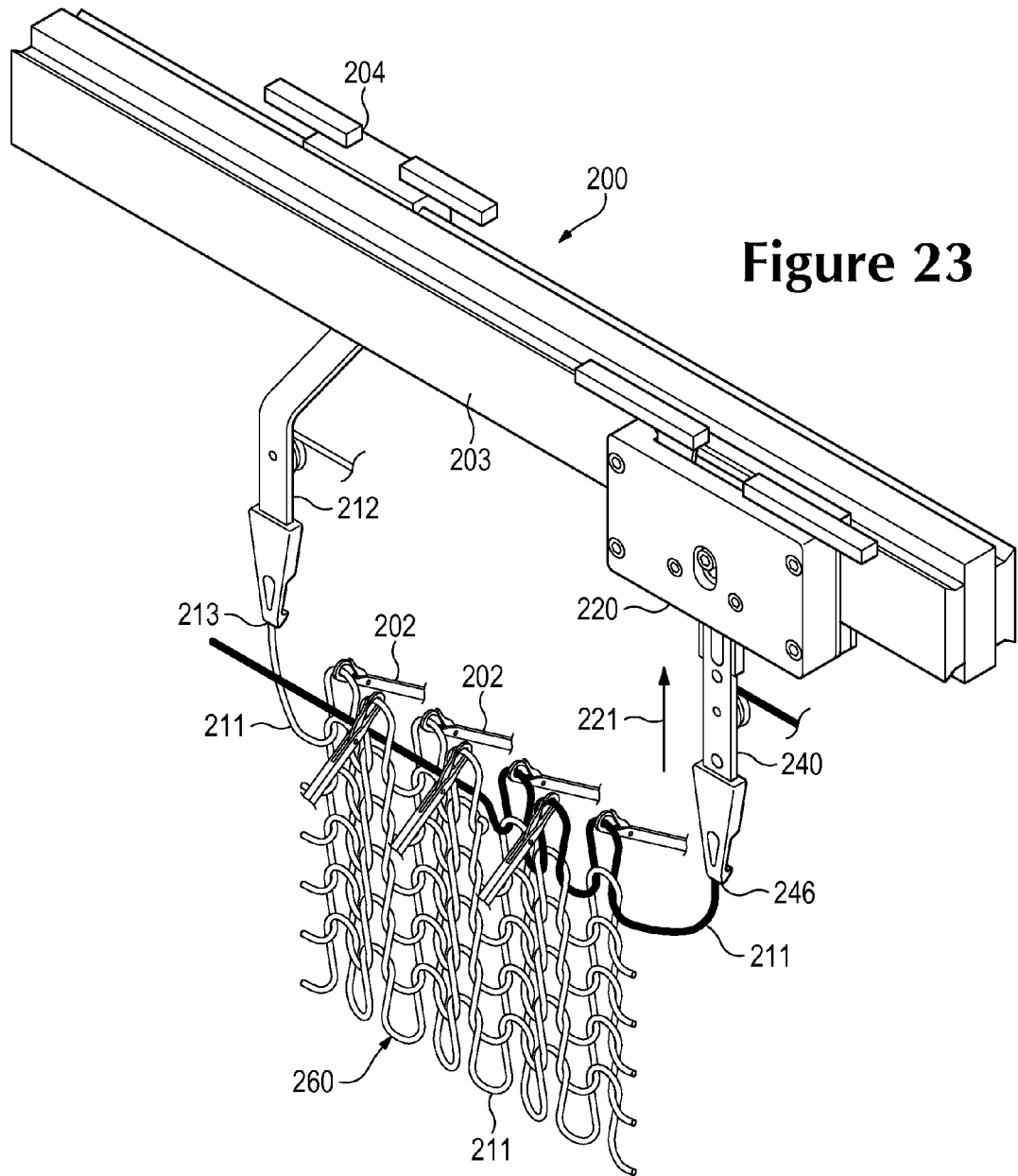
FIG. 23 is a schematic perspective view showing another aspect of the knitting process.

Additional aspects relating to the knitting process will now be discussed. Referring to FIG. 23, the upper course of knitted component 260 is formed from both of yarns 206 and 211. More particularly, a left side of the course is formed from yarn 211, whereas a right side of the course is formed from yarn 206. Additionally, yarn 206 is inlaid into the left side of the course. In order to form this configuration, standard feeder 204 may initially form the left side of the course from yarn 211. Combination feeder 220 then lays yarn 206 into the right side of the course while feeder arm 240 is in the extended position. Subsequently, feeder arm 240 moves from the extended position to the retracted position and forms the right side of the course. Accordingly, combination feeder may inlay a yarn into one portion of a course and then supply the yarn for purposes of knitting a remainder of the course.

Figure 24:
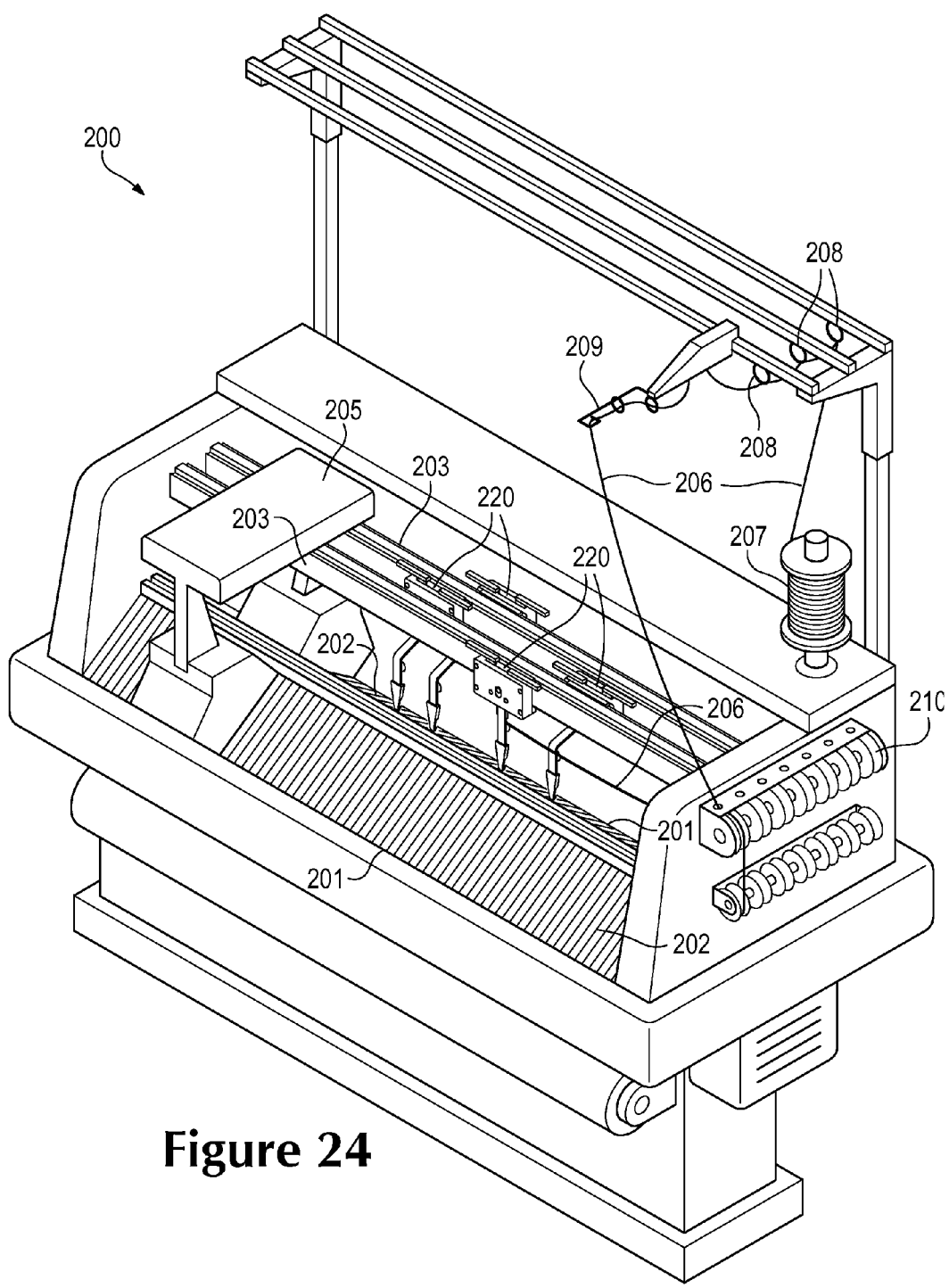
FIG. 24 is a perspective view of another configuration of the knitting machine.

FIG. 24 depicts a configuration of knitting machine 200 that includes four combination feeders 220. As discussed above, combination feeder 220 has the ability to supply a yarn (e.g., yarn 206) for knitting, tucking, floating, and inlaying. Given this versatility, standard feeders 204 may be replaced by multiple combination feeders 220 in knitting machine 200 or in various conventional knitting machines.

FIG. 8B depicts a configuration of knitted component 130 where two yarns 138 and 139 are plated to form knit element 131, and inlaid strand 132 extends through knit element 131. The general knitting process discussed above may also be utilized to form this configuration. As depicted in FIG. 15, knitting machine 200 includes multiple standard feeders 204, and two of standard feeders 204 may be utilized to form knit element 131, with combination feeder 220 depositing inlaid strand 132. Accordingly, the knitting process discussed above in FIGS. 21A-21I may be modified by adding another standard feeder 204 to supply an additional yarn. In configurations where yarn 138 is a non-fusible yarn and yarn 139 is a fusible yarn, knitted component 130 may be heated following the knitting process to fuse knitted component 130. The portion of knitted component 260 depicted in FIGS. 21A-21I has the configuration of a rib knit textile with regular and uninterrupted courses and wales. That is, the portion of knitted component 260 does not have, for example, any mesh areas similar to mesh knit zones 163-165 or mock mesh areas similar to mock mesh knit zones 166 and 167. In order to form mesh knit zones 163-165 in either of knitted components 150 and 260, a combination of a racked needle bed 201 and a transfer of stitch loops from front to back needle beds 201 and back to front needle beds 201 in different racked positions is utilized. In order to form mock mesh areas similar to mock mesh knit zones 166 and 167, a combination of a racked needle bed and a transfer of stitch loops from front to back needle beds 201 is utilized.

Courses within a knitted component are generally parallel to each other. Given that a majority of inlaid strand 152 follows courses within knit element 151, it may be suggested that the various sections of inlaid strand 152 should be parallel to each other. Referring to FIG. 9, for example, some sections of inlaid strand 152 extend between edges 153 and 155 and other sections extend between edges 153 and 154. Various sections of inlaid strand 152 are, therefore, not parallel. The concept of forming darts may be utilized to impart this non-parallel configuration to inlaid strand 152. More particularly, courses of varying length may be formed to effectively insert wedge-shaped structures between sections of inlaid strand 152. The structure formed in knitted component 150, therefore, where various sections of inlaid strand 152 are not parallel, may be accomplished through the process of darting.

Although a majority of inlaid strands 152 follow courses within knit element 151, some sections of inlaid strand 152 follow wales. For example, sections of inlaid strand 152 that are adjacent to and parallel to inner edge 155 follow wales. This may be accomplished by first inserting a section of inlaid strand 152 along a portion of a course and to a point where inlaid strand 152 is intended to follow a wale. Inlaid strand 152 is then kicked back to move inlaid strand 152 out of the way, and the course is finished. As the subsequent course is being formed, inlay strand 152 is again kicked back to move inlaid strand 152 out of the way at the point where inlaid strand 152 is intended to follow the wale, and the course is finished. This process is repeated until inlaid strand 152 extends a desired distance along the wale. Similar concepts may be utilized for portions of inlaid strand 132 in knitted component 130.

A variety of procedures may be utilized to reduce relative movement between (a) knit element 131 and inlaid strand 132 or (b) knit element 151 and inlaid strand 152. That is, various procedures may be utilized to prevent inlaid strands 132 and 152 from slipping, moving through, pulling out, or otherwise becoming displaced from knit elements 131 and 151. For example, fusing one or more yarns that are formed from thermoplastic polymer materials to inlaid strands 132 and 152 may prevent movement between inlaid strands 132 and 152 and knit elements 131 and 151. Additionally, inlaid strands 132 and 152 may be fixed to knit elements 131 and 151 when periodically fed to knitting needles as a tuck element. That is, inlaid strands 132 and 152 may be formed into tuck stitches at points along their lengths (e.g., once per centimeter) in order to secure inlaid strands 132 and 152 to knit elements 131 and 151 and prevent movement of inlaid strands 132 and 152.

Following the knitting process described above, various operations may be performed to enhance the properties of either of knitted components 130 and 150. For example, a water-repellant coating or other water-resisting treatment may be applied to limit the ability of the knit structures to absorb and retain water. As another example, knitted components 130 and 150 may be steamed to improve loft and induce fusing of the yarns. As discussed above with respect to FIG. 8B, yarn 138 may be a non-fusible yarn and yarn 139 may be a fusible yarn. When steamed, yarn 139 may melt or otherwise soften so as to transition from a solid state to a softened or liquid state, and then transition from the softened or liquid state to the solid state when sufficiently cooled. As such, yarn 139 may be utilized to join (a) one portion of yarn 138 to another portion of yarn 138, (b) yarn 138 and inlaid strand 132 to each other, or (c) another element (e.g., logos, trademarks, and placards with care instructions and material information) to knitted component 130, for example. Accordingly, a steaming process may be utilized to induce fusing of yarns in knitted components 130 and 150.

Although procedures associated with the steaming process may vary greatly, one method involves pinning one of knitted components 130 and 150 to a jig during steaming. An advantage of pinning one of knitted components 130 and 150 to a jig is that the resulting dimensions of specific areas of knitted components 130 and 150 may be controlled. For example, pins on the jig may be located to hold areas corresponding to perimeter edge 133 of knitted component 130. By retaining specific dimensions for perimeter edge 133, perimeter edge 133 will have the correct length for a portion of the lasting process that joins upper 120 to sole structure 110. Accordingly, pinning areas of knitted components 130 and 150 may be utilized to control the resulting dimensions of knitted components 130 and 150 following the steaming process.

The knitting process described above for forming knitted component 260 may be applied to the manufacture of knitted components 130 and 150 for footwear 100. The knitting process may also be applied to the manufacture of a variety of other knitted components. That is, knitting processes utilizing one or more combination feeders or other reciprocating feeders may be utilized to form a variety of knitted components. As such, knitted components formed through the knitting process described above, or a similar process, may also be utilized in other types of apparel (e.g., shirts, pants, socks, jackets, undergarments), athletic equipment (e.g., golf bags, baseball and football gloves, soccer ball restriction structures), containers (e.g., backpacks, bags), and upholstery for furniture (e.g., chairs, couches, car seats). The knitted components may also be utilized in bed coverings (e.g., sheets, blankets), table coverings, towels, flags, tents, sails, and parachutes. The knitted components may be utilized as technical textiles for industrial purposes, including structures for automotive and aerospace applications, filter materials, medical textiles (e.g. bandages, swabs, implants), geotextiles for reinforcing embankments, agrotextiles for crop protection, and industrial apparel that protects or insulates against heat and radiation. Accordingly, knitted components formed through the knitting process described above, or a similar process, may be incorporated into a variety of products for both personal and industrial purposes.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear having an upper and a sole structure secured to the upper, the upper including a knitted component comprising:
a first yarn and a second yarn that are knitted together to form an area of the knitted component corresponding to at least one of a medial side and a lateral side of the upper, the first yarn being at least partially formed from a thermoplastic polymer material, and the second yarn being entirely formed from at least one of a thermoset polymer material and natural fibers;
an inlaid strand extending continuously through at least two courses formed by the first yarn and the second yarn of said area of the knitted component on the at least one of the medial side and the lateral side of the upper;
the at least one of the medial side and the lateral side of the upper including a plurality of apertures for receiving a lace, the plurality of apertures being disposed in a throat area of the upper, and the inlaid strand extending through said at least two courses further extending around at least two apertures of the plurality of apertures within the knitted component; and
wherein the inlaid strand and the first yarn are fused to each other by the thermoplastic polymer material forming the first yarn.

2. The article of footwear recited in claim 1, wherein the first yarn is further fused to the second yarn by the thermoplastic polymer material forming the first yarn.

3. The article of footwear recited in claim 1, wherein the fused together inlaid strand and first yarn lock the position of the inlaid strand within said area of the knitted component.

4. The article of footwear recited in claim 1, wherein the inlaid strand extends from the throat area of the upper to a lower area of the upper adjacent to the sole structure on the at least one of the medial side and the lateral side of the upper.

5. The article of footwear recited in claim 4, wherein the knitted component includes a peripheral edge disposed at the lower area of the upper along the at least one of the medial side and the lateral side; and
wherein the inlaid strand exits a first course of the knitted component at a first location along the peripheral edge and enters a second course of the knitted component at a second location along the peripheral edge.

6. The article of footwear recited in claim 1, further including a third yarn that is incorporated into another area of the knitted component, the third yarn stretching at least one-hundred percent.

7. The article of footwear recited in claim 6, wherein the knitted component includes a pair of at least partially coextensive knitted layers formed of unitary knit construction, the third yarn being incorporated into at least one of the layers, and the knitted component includes a plurality of floating yarns located between the knitted layers and extending in a direction that is substantially parallel to the knitted layers.

8. The article of footwear recited in claim 7, wherein the knitted layers and the floating yarns are located adjacent to an ankle opening of the upper.

9. The article of footwear recited in claim 1, wherein the inlaid strand has a greater thickness than the first yarn and the second yarn.

10. The article of footwear recited in claim 1, wherein the knitted component is formed of unitary knit construction and extends along the lateral side of the upper, along the medial side of the upper, over a forefoot region of the upper, and around a heel region of the upper.

11. The article of footwear recited in claim 1, wherein the knitted component has the configuration of a single textile layer that forms a portion of an exterior surface and an opposite interior surface of the upper; and
wherein the inlaid strand is located within the single textile layer between the exterior surface and the interior surface of the knitted component.

12. An article of footwear having an upper and a sole structure secured to the upper, the upper including a knitted component comprising:
a fusible yarn and a non-fusible yarn that are knitted together to form a plurality of intermeshed loops defining courses and wales that form the knitted component, the knitted component being disposed on at least one of a medial side and a lateral side of the upper, the fusible yarn being at least partially formed from a thermoplastic polymer material;
the knitted component extending from a throat area of the upper to a lower area of the upper adjacent to the sole structure, the throat area of the upper includinq a plurality of apertures for receivinq a lace;
an inlaid strand extending along at least two of the courses;
wherein the inlaid strand extends continuously between a first course and a second course within the knitted component; and
wherein the inlaid strand further extends around at least two of the plurality of apertures in the throat area of the upper while disposed within courses of the knitted component.

13. The article of footwear recited in claim 12, wherein the fusible yarn is fused to the non-fusible yarn by the thermoplastic polymer material in the fusible yarn.

14. The article of footwear recited in claim 12, wherein the fusible yarn is fused to the inlaid strand by the thermoplastic polymer material in the fusible yarn.

15. The article of footwear recited in claim 12, wherein the non-fusible yarn is substantially formed from at least one of a thermoset polymer material and natural fibers.

16. The article of footwear recited in claim 12, wherein the thermoplastic polymer material at least partially forming the fusible yarn includes a thermoplastic polyester, and the non-fusible yarn is substantially formed from a thermoset polyester.

17. The article of footwear recited in claim 12, wherein the knitted component includes a peripheral edge disposed along the at least one of the medial side and the lateral side; and
wherein the inlaid strand exits the first course of the knitted component at a first location along the peripheral edge and enters the second course of the knitted component at a second location along the peripheral edge.

18. An article of footwear having an upper and a sole structure secured to the upper, the upper comprising:
a knit element defining a portion of an exterior surface of the upper and an opposite interior surface of the upper, the interior surface defining a void for receiving a foot, the knit element extending from a throat area of the upper to a lower area of the upper adjacent to the sole structure on at least one of a medial side and a lateral side of the upper, and the knit element defining a plurality of apertures located within the throat area;
an inlaid strand extending through courses forming the knit element from the throat area to the lower area, the inlaid strand extending at least partially around the apertures in the throat area, and the inlaid strand being located between the exterior surface and the interior surface of the knit element in the throat area of the upper;

wherein the inlaid strand extends at least partially around two or more apertures in the throat area of the upper while remaining between the exterior surface and the interior surface of the knit element; and a lace extending through the apertures.

19. The article of footwear recited in claim 18, wherein the inlaid strand repeatedly extends from the throat area to the lower area.

20. The article of footwear recited in claim 18, wherein one section of the inlaid strand extends upward from the lower area to a first side of one of the apertures, the inlaid strand extends partially around the one of the apertures to an opposite second side of the one of the apertures, and the inlaid strand extends downward from the second side of the one of the apertures to the lower area.

21. The article of footwear recited in claim 18, wherein a portion of the inlaid strand extends through the knit element from the throat area to a heel region of the footwear.

22. The article of footwear recited in claim 21, wherein the portion of the inlaid strand extends to an edge in the heel region.

23. The article of footwear recited in claim 18, wherein the knit element is formed of unitary knit construction and extends along the lateral side of the upper, along the medial side of the upper, over a forefoot region of the upper, and around a heel region of the upper.

24. The article of footwear recited in claim 18, wherein the inlaid strand extends from the throat area to the lower area in the lateral side and the medial side.

25. The article of footwear recited in claim 18, wherein a portion of the knit element forming the exterior surface exposes multiple sections of the inlaid strand between the throat area and the lower area.

26. The article of footwear recited in claim 25, wherein a portion of the knit element forming the interior surface covers substantially all of the inlaid strand between the throat area and the lower area.

27. The article of footwear recited in claim 18, wherein the knit element has the configuration of a single textile layer that forms a portion of the exterior surface and the interior surface of the upper; and wherein the inlaid strand is located within the single textile layer between the exterior surface and the interior surface of the knit element.

28. An article of footwear having an upper and a sole structure secured to the upper, the upper comprising:

a knit element forming a portion of an exterior surface of the upper and an opposite interior surface of the upper, the interior surface defining a void for receiving a foot, the knit element extending from a throat area of the upper to a lower area of the upper adjacent to the sole structure, the throat area of the upper including a plurality of apertures for receiving a lace; and an inlaid strand extending through a plurality of courses of yarns forming the knit element from the throat area to the lower area between the exterior surface and the interior surface along at least one of a medial side and a lateral side of the upper, the inlaid strand extending at least partially around two or more of the plurality of apertures in the throat area while being located within the knit element between the exterior surface and the interior surface of the knit element in the throat area of the upper;

wherein a portion of the knit element forming the exterior surface exposes multiple sections of the inlaid strand in an area between the throat area and the lower area of the upper, and a portion of the knit element forming the interior surface covers substantially all of the inlaid strand between the throat area and the lower area of the upper; and wherein the inlaid strand extends continuously between a first course and a second course of the knit element between the exterior surface and the interior surface.

29. The article of footwear recited in claim 28, wherein a lace extends through the plurality of apertures.

30. The article of footwear recited in claim 28, wherein the inlaid strand extends at least partially around the two or more of the plurality of apertures in the throat area on a medial side of the upper, and another inlaid strand is located between the exterior surface and the interior surface of the knit element in the throat area on the lateral side of the upper and extends around at least two apertures in the throat area on the lateral side of the upper.

31. The article of footwear recited in claim 28, wherein the inlaid strand extends from the lower area to a first side of one aperture of the plurality of apertures along the first course, the inlaid strand extends partially around the one aperture to an opposite second side of the one aperture, and the inlaid strand extends from the second side of the one aperture to the lower area along the second course.

32. The article of footwear recited in claim 28, wherein the knit element includes a yarn that is at least partially formed from a thermoplastic polymer material, the yarn being fused to the inlaid strand to join the yarn to the inlaid strand.

33. The article of footwear recited in claim 28, wherein the lower area of the upper includes a peripheral edge disposed along the at least one of the medial side and the lateral side; and wherein the inlaid strand exits the first course of the knit element at a first location along the peripheral edge and enters the second course of the knit element at a second location along the peripheral edge.

34. An article of footwear having an upper and a sole structure secured to the upper, the upper comprising:

a knit element including at least one yarn that forms a plurality of intermeshed loops, the knit element defining a portion of an exterior surface of the upper and an opposite interior surface of the upper along at least one of a medial side and a lateral side of the upper, the interior surface defining a void for receiving a foot, the knit element having a configuration of a single textile layer that forms a portion of the exterior surface and the interior surface;

a plurality of apertures disposed in the knit element at a throat area of the upper, the plurality of apertures configured for receiving a lace;

an inlaid strand extending through the plurality of intermeshed loops of the knit element and located within the single textile layer between the exterior surface and the interior surface of the knit element;

wherein the plurality of intermeshed loops form a plurality of courses of the knit element and the inlaid strand extends continuously between at least two courses of the knit element; and wherein the inlaid strand extends at least partially around two or more of the plurality of apertures in the throat area of the upper while remaining between the exterior surface and the interior surface of the knit element.

35. The article of footwear recited in claim 34, wherein the knit element includes a peripheral edge disposed along the at least one of the medial side and the lateral side; and wherein the inlaid strand exits a first course of the knit element at a first location along the peripheral edge and enters a second course of the knit element at a second location along the peripheral edge.

36. The article of footwear recited in claim 34, wherein the knit element extends from the throat area of the upper to a lower area of the upper adjacent to the sole structure on the at least one of the medial side and the lateral side, and the inlaid strand extends from the throat area to the lower area of the upper.

37. The article of footwear recited in claim 36, wherein a portion of the knit element forming the exterior surface exposes multiple sections of the inlaid strand between the throat area and the lower area of the upper.

38. The article of footwear recited in claim 37, wherein a portion of the knit element forming the interior surface covers substantially all of the inlaid strand between the throat area and the lower area of the upper.

39. The article of footwear recited in claim 34, wherein a portion of the inlaid strand extends through the knit element from the throat area to a heel region of the footwear within the knit element between the exterior surface and the interior surface; and wherein the portion of the inlaid strand is disposed below an ankle opening of the upper on at least one of the medial side and the lateral side of the upper.

\* \* \* \* \*